(12) United States Patent
Tsutsumi et al.

(10) Patent No.: US 8,112,773 B2
(45) Date of Patent: Feb. 7, 2012

(54) DISK TRANSFER MECHANISM, AND DISK DRIVE DEVICE

(75) Inventors: Hideaki Tsutsumi, Tokyo (JP); Shigeru Tamura, Tokyo (JP); Kiyoshi Omori, Tokyo (JP); Manabu Obata, Kanagawa (JP); Yoichiro Mitsumoto, Tokyo (JP)

(73) Assignee: Sony Corporation, Tokyo (JP)

( * ) Notice: Subject to any disclaimer, the term of this patent is extended or adjusted under 35 U.S.C. 154(b) by 1085 days.

(21) Appl. No.: 11/592,394

(22) Filed: Nov. 3, 2006

(65) Prior Publication Data
US 2007/0107002 A1    May 10, 2007

(30) Foreign Application Priority Data
Nov. 9, 2005   (JP) .................................. 2005-325359

(51) Int. Cl.
*G11B 17/04*    (2006.01)
(52) U.S. Cl. ........................................ 720/623; 720/626
(58) Field of Classification Search .......... 720/619–624, 720/626, 625
See application file for complete search history.

(56) References Cited

U.S. PATENT DOCUMENTS

| 6,512,730 | B1 * | 1/2003 | Lee et al. ....................... 720/622 |
| 6,839,898 | B2 * | 1/2005 | Saji et al. ....................... 720/619 |
| 2003/0021669 | A1 * | 1/2003 | Sichera et al. ............. 414/796.5 |
| 2004/0212927 | A1 * | 10/2004 | Aoishi et al. .................. 360/133 |
| 2005/0086674 | A1 * | 4/2005 | Makisaka et al. ............. 720/626 |
| 2005/0235299 | A1 * | 10/2005 | Kido ............................. 720/619 |

FOREIGN PATENT DOCUMENTS

JP    05-100595    4/1993

* cited by examiner

*Primary Examiner* — Nathan Danielsen
(74) *Attorney, Agent, or Firm* — Robert J. Depke; Rockey, Depke & Lyons, LLC

(57) ABSTRACT

A recording medium drive device includes: a holding unit configured to hold a recording medium inserted from a slot; a link mechanism including a plurality of arms turnably connected to each other; an eject lever activated in response to the turning motions of the link mechanism for pushing the recording medium to eject the recording medium from the slot; a drive source configured to supply a drive force for the turning operations of the link mechanism; an urging spring disposed in the link mechanism for applying an urging force in the ejecting direction to the recording medium when the recording medium is inserted from the slot; and position regulating means disposed at a position to suppress the urging spring for the recording medium, for regulating the arms of the link mechanism at the ejecting time.

15 Claims, 36 Drawing Sheets

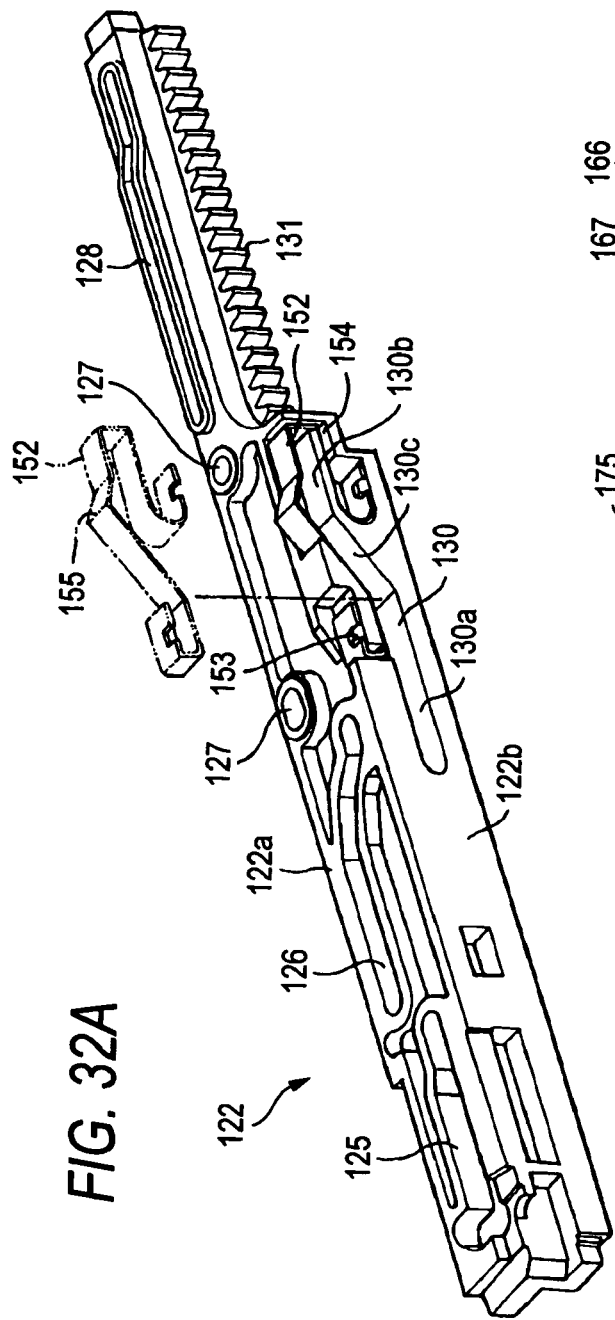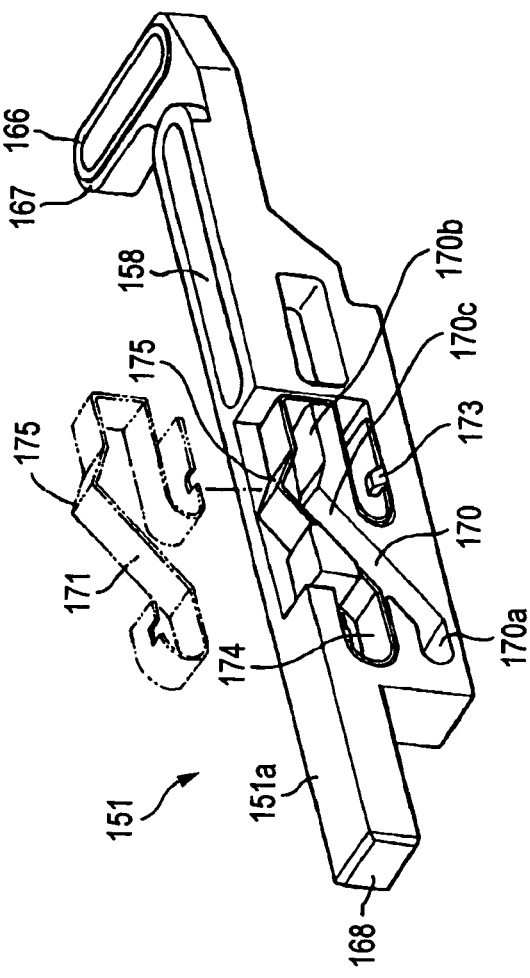
FIG. 32A
FIG. 32B

DISK TRANSFER MECHANISM, AND DISK DRIVE DEVICE

CROSS REFERENCES TO RELATED APPLICATION

The present invention contains subject matter related to Japanese Patent Application JP 2005-325359 filed in the Japanese Patent Office on Nov. 9, 2005, the entire contents of which being incorporated herein by reference.

BACKGROUND OF THE INVENTION

1. Field of the Invention

The invention relates to a disk drive device for recording and/or playing information signals with respect to an optical disk and, more particularly, to a disk drive device and a disk transfer mechanism of the so-called slot-in type, in which the optical disk is directly inserted into the device body.

2. Background Art

As the optical disk, there have been widely known in the related art a variety of optical disks such as the CD (Compact Disk), the DVD (Digital Versatile Disk) or the BD (Blue-ray Disk), and the magneto-optical disks such as the MO (magneto Optical) or the MD (Mini Disk). A variety of disk drive devices have appeared for those disks or disk cartridges.

The disk drive devices are divided into: the type, in which a cover or door at a casing is opened so that a disk is directly loaded on a turntable seen from the opening; the type, in which the disk can be automatically loaded by placing it on a disk tray to be horizontally let into and out of a casing so that the disk is automatically loaded on the inside turntable when the disk tray is let in; or the type, in which the disk is directly loaded on the turntable disposed on the disk tray. However, any type requests the operator to open/close the cover or door, to let the disk tray in and out or to load the disk on the turntable.

There is also a disk drive device of the so-called "slot-in type", in which the disk is automatically loaded on the turntable merely by inserting the disk from a disk slot formed in the front face of the casing. This slot-in type disk drive device is equipped with a pair of opposed guide rollers for clamping the disk inserted from the disk slot. By turning the paired guide rollers in the opposite directions, the disk drive device performs the loading operation to pull the disk inserted from the disk slot into the inside of the casing, and the ejecting operation to eject the disk from the disk slot to the outside of the casing.

On the other hand, a mobile device such as a note type personal computer having the disk drive device mounted thereon is desired to reduce its size, weight and thickness, and the disk drive device is accordingly desired to reduce its own size, weight and thickness. From this background, the slot-in type disk drive device is provided, at its leading end portion, with an abutting portion to abut against the outer circumference of a disk inserted from the disk slot of a front panel, and has a plurality of turning arms turnably supported at their root end portions. The disk drive device (as referred to JP-A-05-100595 (Patent Document 1)) performs a loading operation to pull the disk from the disk slot into the inside of the casing while turning those turning arms in a plane parallel to the disk, and an ejecting operation to eject the disk from the disk slot to the outside of the casing. Of the disk drive devices thus thinned, the ultra-thin type disk drive device to be mounted on the note-type personal computer has standard sizes of a thickness of 12.7 mm. There is also proposed a disk drive device, which is so thinned to 9.5 mm as to equal to that of the hard disk drive (HDD).

In the disk drive device thus performing the disk loading operation and the ejecting operation by arranging those turning arms and by turning the arms in a plane parallel to the disk, the optical disk is ejected by turning the arms by an urging member such as the torsion coil spring urging the optical disk in the ejecting direction. When the optical disk is to be ejected to the outside of the device, the opening formed at the center of the optical disk has to be exposed to the outside, and the optical disk has to be so stopped at a position as will not drop by its own weight. By thus stopping the optical disk at that position, the user is enabled to grip the center hole or the side face of the optical disk so that the user can handle the optical disk without touching the signal-recorded face.

In the disk drive device thus far described, however, the driving force to eject the optical disk is only the force of the spring elasticity, and the stopped position of the optical disk ejected to the outside of the device is liable to disperse. This dispersion of the stop position of the optical disk may also be caused by the change of the elastic force due to the aging of the urging member. Moreover, the disk slot for inserting or ejecting the optical disk may be equipped with a panel curtain or the like of a nonwoven fabric so as to stabilize the stop position of the optical disk or to clear the signal recording face of dust or the like. If the quality of the panel curtain disperses, however, it is difficult to stabilize the stop position of the optical disk.

SUMMARY OF THE INVENTION

It is desirable to provide a disk drive device for transferring a disk by using a turning arm and for discharging an optical disk stably to a predetermined stationary position at the time of ejecting the optical disk.

According to an embodiment of the invention, there is provided a recording medium drive device including: a holding unit configured to hold a recording medium inserted from a slot; a link mechanism including a plurality of arms turnably connected to each other; an eject lever activated in response to the turning motions of the link mechanism for pushing the recording medium to eject the recording medium from the slot; a drive source configured to supply a drive force for the turning operations of the link mechanism; an urging spring disposed in the link mechanism for applying an urging force in the ejecting direction to the recording medium when the recording medium is inserted from the slot; and position regulating means for regulating the arms of the link mechanism at the ejecting time at a position to suppress the urging spring for the recording medium.

According to another embodiment of the invention, there is provided an electronic device having a recording medium drive device for recording and/or playing information signals in and from a recording medium, including: a holding unit configured to hold a recording medium inserted from a slot; a link mechanism including a plurality of arms turnably connected to each other; an eject lever activated in response to the turning motions of the link mechanism for pushing the recording medium to eject the recording medium from the slot; a drive source configured to supply a drive force for the turning operations of the link mechanism; an urging spring disposed in the link mechanism for applying an urging force in the ejecting direction to the recording medium when the recording medium is inserted from the slot; and position regulating means for regulating the arms of the link mechanism at the ejecting time at a position to suppress the urging spring for the recording medium.

According to still another embodiment of the invention, there is provided a recording medium drive device including: an eject arm turnably supported on a device body having a loadable/unloadable recording medium, for ejecting the recording medium; a first link arm turnably supported at its one end portion by the eject arm; a second link arm turnably engaging with the other end portion of the first link arm and adapted to be moved according to the movement of the first link arm; an elastic member retained at its one end by the first link arm and at its other end by the second link arm and extended when its portions retained by the first and second link arms move apart from each other, for urging the first link arm in the direction where the eject arm turns in the eject direction of the recording medium; a loop cam which includes a loading guide wall for guiding the guide projection projected from the second link arm, to bring the second link arm away from the first link arm against the urging force of the elastic member, at the time of loading the recording medium, and an eject guide wall for bringing the second link arm toward the first link arm at the time of ejecting the recording medium, and forms a guide groove, in which the guide projection moves, continuously in an annular shape, with the loading guide wall and the eject guide wall; and an operation arm engaging with the first link arm for moving the eject arm through the first link arm in the loading direction and the ejecting direction of the recording medium; and a drive mechanism for driving the operation arm.

According to a further embodiment of the invention, there is provided an electronic device having a recording medium drive device for recording and/or playing information signals in and from a recording medium, including: an eject arm turnably supported on a device body having a loadable/unloadable recording medium, for ejecting the recording medium; a first link arm turnably supported at its one end portion by the eject arm; a second link arm turnably engaging with the other end portion of the first link arm and adapted to be moved according to the movement of the first link arm; an elastic member retained at its one end by the first link arm and at its other end by the second link arm and extended when its portions retained by the first and second link arms move apart from each other, for urging the first link arm in the direction where the eject arm turns in the eject direction of the recording medium; a loop cam which includes a loading guide wall for guiding the guide projection projected from the second link arm, to bring the second link arm away from the first link arm against the urging force of the elastic member, at the time of loading the recording medium, and an eject guide wall for bringing the second link arm toward the first link arm at the time of ejecting the recording medium, which forms a guide groove, in which the guide projection moves, continuously in an annular shape, with the loading guide wall and the eject guide wall; and an operation arm engaging with the first link arm for moving the eject arm through the first link arm in the loading direction and the ejecting direction of the recording medium; and a drive mechanism for driving the operation arm.

According to the disk transfer mechanism and the disk drive device according to the embodiments of the invention, at the time of inserting the disc-shaped recording medium, in the procedure for the user to insert the disc-shaped to a predetermined position, an urging force in the ejecting direction by an elastic member extended between a first link arm and a second link arm is enabled to act on an eject arm by guiding the first link arm and the second link arm with a loop cam in the direction to leave each other. As a result, it is possible to prevent the situation, in which the disc-shaped recording medium might otherwise be left incompletely inserted into the casing when the insertion of the disc-shaped recording medium is quit by the user. At the time of ejecting the disc-shaped recording medium, moreover, the urging force given in the ejecting direction by the elastic member to the eject arm can be eliminated by moving the first link arm and the second link arm toward each other by the loop cam, so that the eject arm can be turned according to the operation of the operation arm having received the driving force of the drive mechanism. According to the disk transfer mechanism and the disk drive device according to the invention, therefore, the disc-shaped recording medium can be stably ejected to a predetermined position, at which the center hole is ejected to the outside of the casing, by the driving force of the drive mechanism without resorting to the elastic force.

BRIEF DESCRIPTION OF THE DRAWINGS

FIG. 31A is a diagram, in which the eject arm rides on the guide protrusion, and FIG. 31B is a diagram showing the state, in which the eject arm does not ride on the guide protrusion;

FIGS. 32A and 32B are perspective views showing the slider and a sub slider;

DESCRIPTION OF THE PREFERRED EMBODIMENTS

Figure 1:
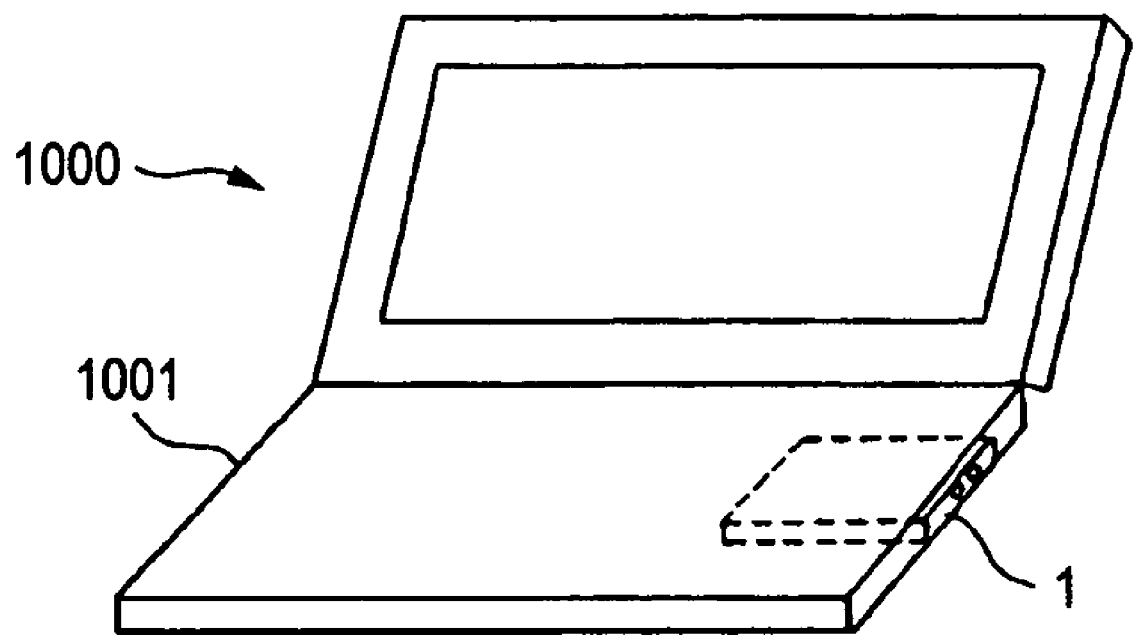
FIG. 1 is a perspective appearance view showing an electronic device, on which a disk drive device according to an embodiment of the invention is mounted.

A disk drive device is described in detail in the following with reference to the accompanying drawings. This disk drive device 1 is that of a slot-in type, which is mounted on the computer body 1001 of a note type personal computer 1000, as shown in FIG. 1. This disk drive device 1 has a constitution, in which its entirety is thinned to about 12.7 mm, as shown in FIG. 2, and can record/play information signals in/from an optical disk 2 such as the CD (Compact Disk), DVD (Digital Versatile Disk) or BD (Blue-ray Disc).

At first, the description is made on the specific constitution of the disk drive device 1. This disk drive device 1 is provided, as shown in FIG. 3 to FIG. 6, with a casing 3 for the housing of the device body. This casing 3 is constituted to include a bottom case 4 of a generally flat box shape for the lower casing, and a top cover 5 or a top plate for covering the upper opening of that bottom case 4. In the casing 3, moreover, there are disposed a later-described upward base unit 22 and a main chassis 6, which covers a drive mechanism 120 for establishing a driving force for the disk transfer, and a disk transfer mechanism 50 for receiving the transmitted drive force of the drive mechanism 120.

Figure 2:
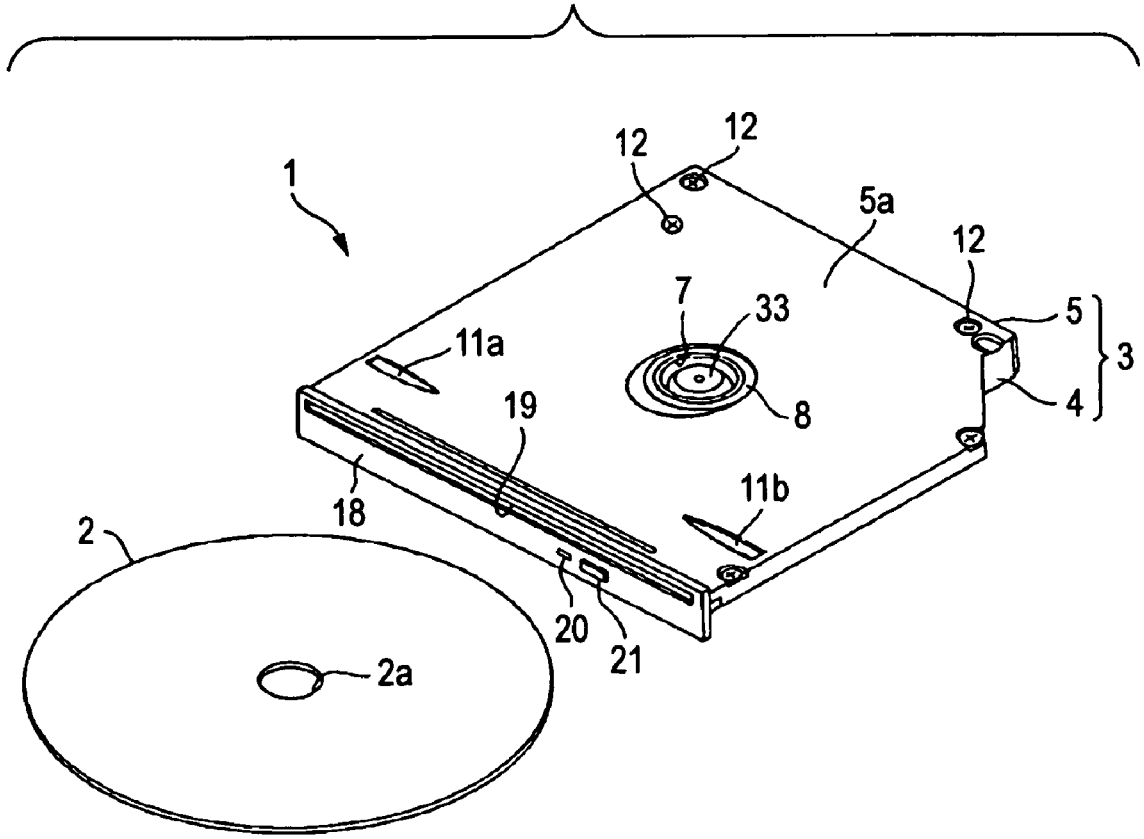
FIG. 2 is a perspective appearance view showing the disk drive device according to the embodiment of the invention.
Figure 5:
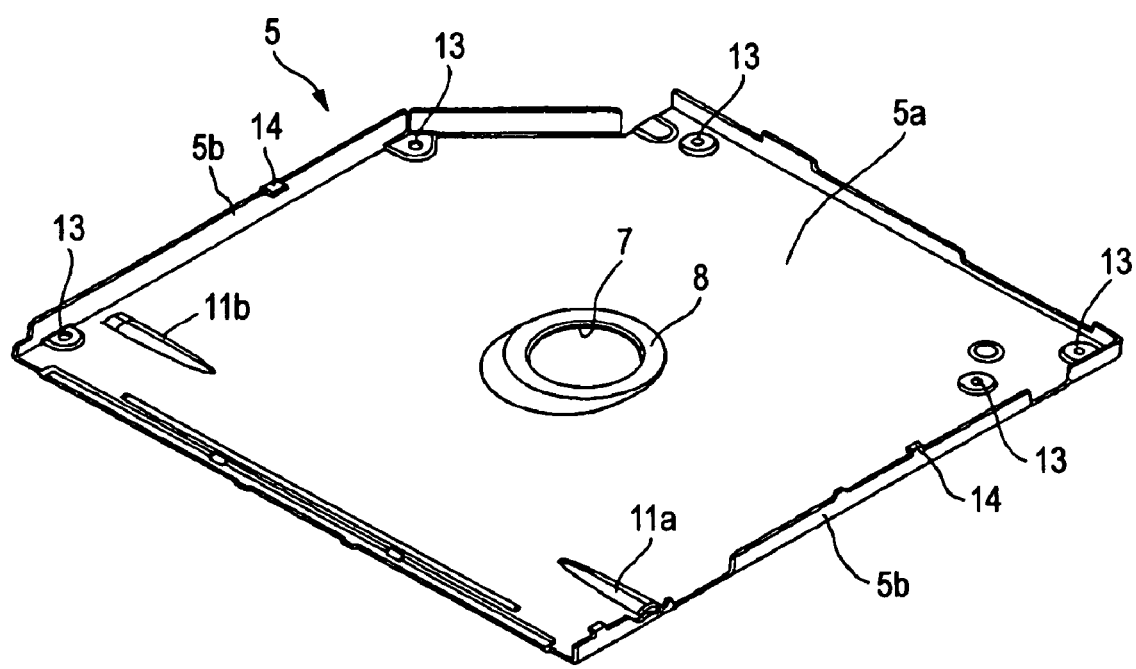
FIG. 5 is a perspective appearance view showing a top cover.

The top cover 5 is made of a thin sheet metal, as shown in FIG. 2 and FIG. 5, and is constituted to include a top plate portion 5a for closing the upper opening of the bottom case 4, and a pair of side plate portions 5b slightly folded from the periphery of the top plate portion 5a along the two side faces of the bottom case 4. Generally at the center portion of the top plate portion 5a, there is formed a generally circular opening 7. This opening 7 is provided for causing such an engaging protrusion 33a of a turntable 23a to confront the outside as comes into engagement with the center hole 2a of the optical disk 2 at the later-described chucking operation. Around the opening 7 of the top plate portion 5a, on the other hand, there is formed an abutting protrusion 8, which is so slightly protruded toward the inner side of the casing 3 at to come into abutment against the circumference of the center hole 2a of the optical disk 2 held on the turntable 23a.

From the front side of the top plate portion 5a, a pair of guide protrusions 11a and 11b are so formed inward of the casing 3 as to guide the optical disk 2, as inserted from the later-described disk slot 19, while regulating the optical disk 2 in the height direction. Those paired guide protrusions 11a and 11b have generally partial conical shapes, in which they are so raised on the generally symmetric positions across the center line in the inserting direction of the optical disk 2 through the opening 7 as to draw arcs in the inserting direction of the optical disk 2, and in which the arcs are continuously radially reduced from the outer side to the inner side over a direction generally perpendicular to the inserting direction of the optical disk 2. In short, those paired guide protrusions 11a and 11b are so formed that a cone is divided along the axial direction and that the divided halves are arranged to have their crests directed inward, so that they become continuously lower and thinner inward from their outer sides.

The paired guide protrusions 11a and 11b thus shaped can guide the optical disk 2, as inserted from the disk slot 19, smoothly into the inside of the casing 3 while correcting its widthwise deviation. With the guide protrusions 11a and 11b thus shaped, the top cover 5 can be enhanced in the rigidity of the top plate portion 5a. Here, the top plate portion 5a has its inner side main face treated to reduce the frictional resistance to the optical disk 2.

The bottom case 4 is formed of a sheet metal into a generally flat box shape, and has a generally rectangular shape. The bottom case 4 is provided on its one side face portion with a deck portion 4a, which is so raised from the bottom face portion as to extend to the outer side. The deck portion 4a supports such a loading arm 51 turnably as to pull the later-described optical disk 2 into the casing 3.

To the bottom face portion of the bottom case 4, there is fastened by means of screws a circuit board 59, which is equipped with electronic parts such as an IC chip for configuring a drive control circuit, connectors for electric connections of individual portions, and detection switches for detecting the operations of individual portions. In portion of the outer peripheral wall of the bottom case 4, moreover, there is formed a connector opening portion 4b, through which the connectors mounted on the circuit board 59 are guided to the outside.

Figure 3:
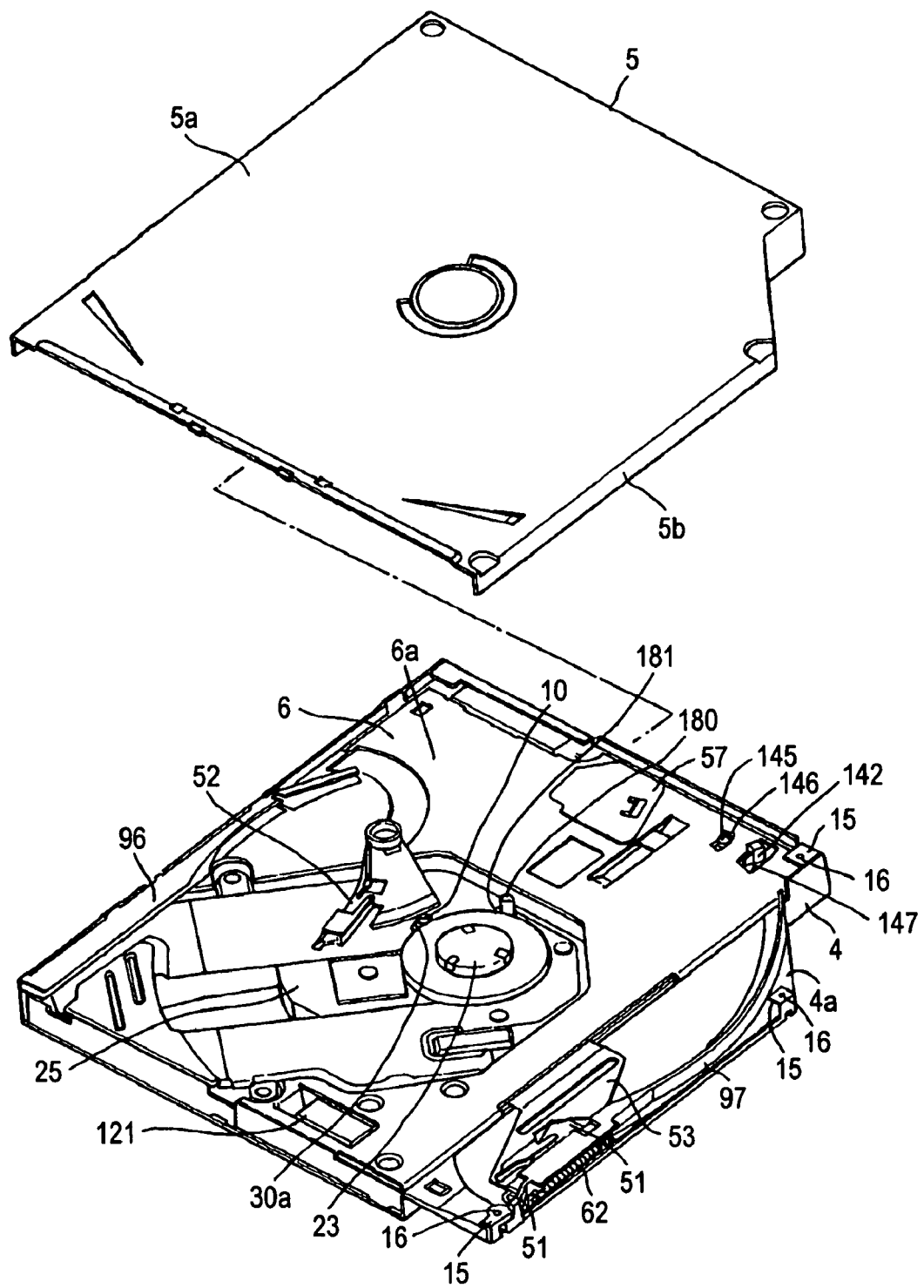
FIG. 3 is a perspective view showing the inside of the disk drive device according to the embodiment of the invention.

Moreover, the aforementioned top cover 5 is crewed to the bottom case 4. Specifically in the outer peripheral edge portion of the top plate portion 5a of the top cover 5, as shown in FIG. 5, there are formed a plurality of through holes 13 for guiding screws 12 therethrough. At the side plate portions 5b of the two sides, moreover, there are formed a plurality of guide members 14, which are folded inward at right angles. On the other hand, the bottom case 4 is equipped at its outer peripheral edge portions with a plurality of fixing members 15, which are folded inward at generally right angles, as shown in FIG. 3. In these fixing members 15, there are formed screw holes 16, which correspond to the through holes 13 of the top cover 5. In the two side face portions of the bottom case 4, moreover, there are formed a plurality of guide slits, although not specified, for stopping the guide members 14 of the top cover 5.

When the top cover 5 is mounted on the bottom case 4, the top cover 5 is slid from the front face side to the back face side while its guide members 14 engaging with the guide slits of the bottom case 4. As a result, the top plate portion 5a of the top cover 5 closes the upper opening of the bottom case 4. In this state, the screws 12 are fitted in the screw holes 16 of the bottom case 4 through the through holes 13 of the top cover 5. Thus, the casing 3 is constituted, as shown in FIG. 2.

To the front face of the casing 3, there is attached a front panel 18 of a generally rectangular flat plate shape, as shown in FIG. 2. In this front panel 18, there is formed the disk slot 19 for inserting and extracting the optical disk 2 in and out in the horizontal directions. In other words, the optical disk 2 can be inserted through the disk slot 19 into the casing 3 and extracted from the disk slit 19 from the casing 3. In the disk slot 19, there are formed the not-shown panel curtains at the two side portions in the direction normal to the longitudinal direction. The panel curtains are made of nonwoven fabric or the like, which is cut long and adhered by an adhesive or the like to the back sides of the front panel 18. As a result, the panel curtains can prevent dust or the like from stealing into the casing 3 and can come into sliding contact, when the optical disk 2 is inserted or extracted, with the disk surface thereby to clear the optical disk 2 of the dust or the like.

Moreover, the front panel 18 is further equipped in its front face with a display portion 20 for lighting and displaying the state of an access to the optical disk 2, and an eject button 21 which is pushed to unload the optical disk 2.

Figure 10:
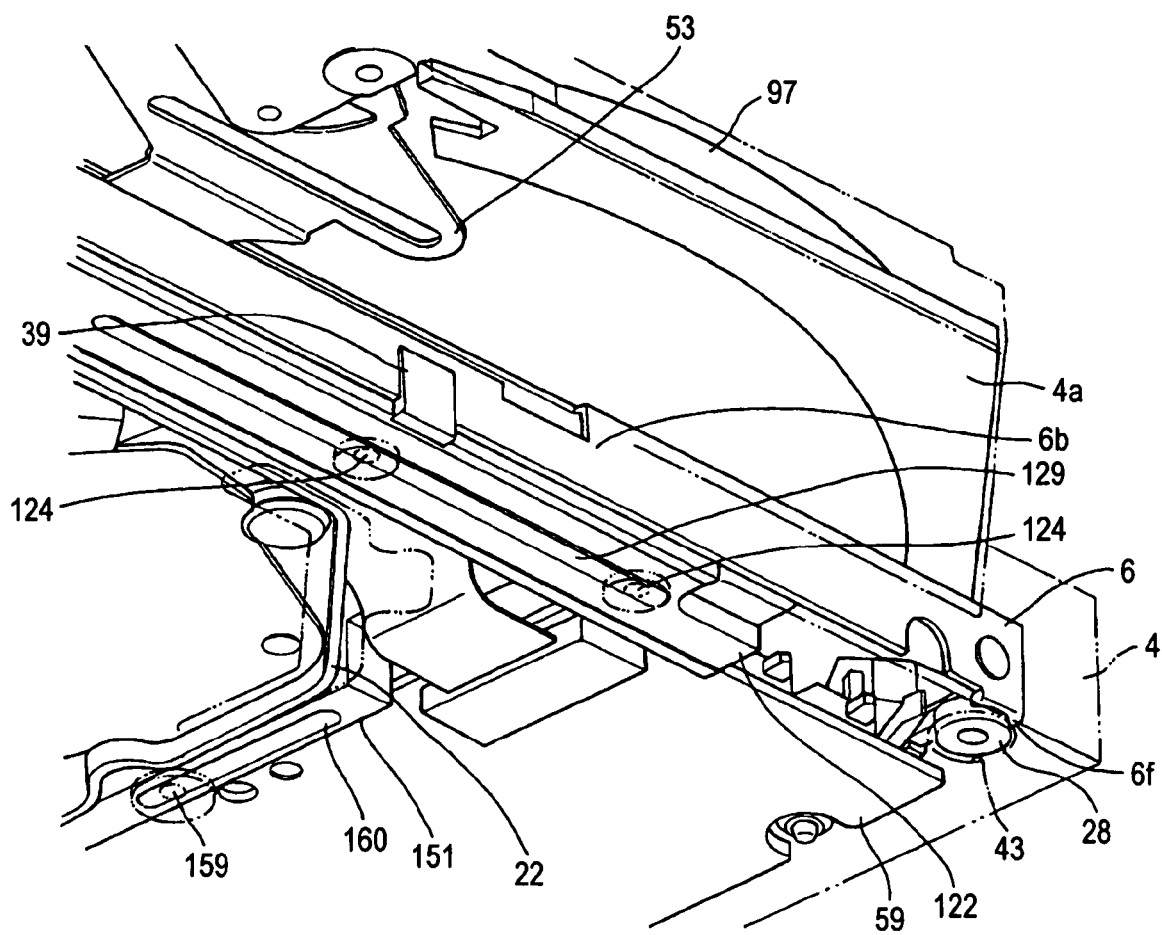
FIG. 10 is a perspective view showing another embodiment of the disk drive device.

Near one side face of the bottom case 4, in which the deck portion 4a is formed, there are projected a pair of guide projections 124 and 124, which are formed at a spacing along one side face thereby to slide a slider 122 of the later-described drive mechanism 120 (as referred to FIG. 10).

Figure 4:
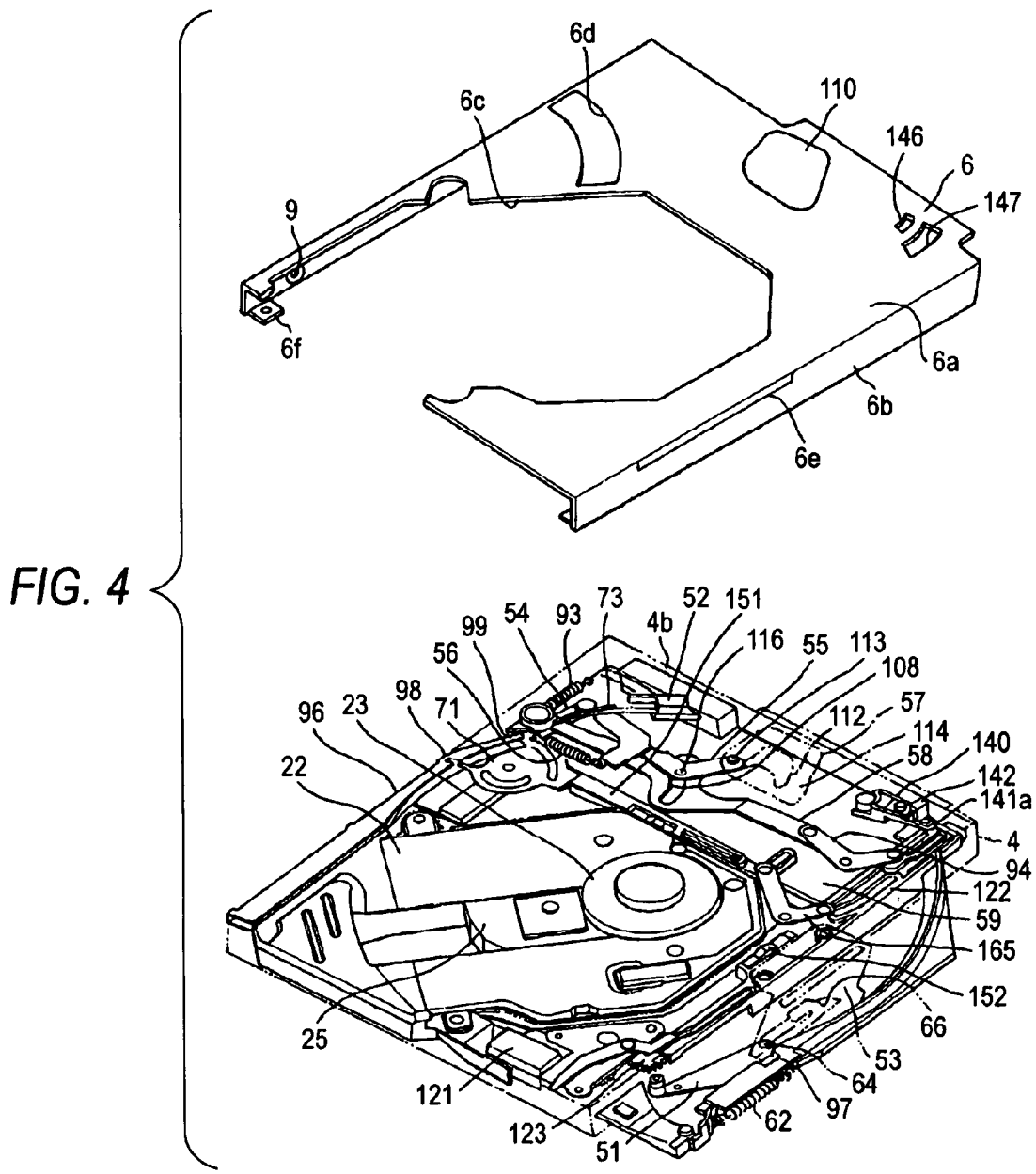
FIG. 4 is a perspective view showing the disk drive device, from which a main chassis is removed.

As shown in FIG. 3 and FIG. 4, on the other hand, the main chassis 6 is mounted by screws on the bottom face portion of the bottom case 4. The main chassis 6 is so arranged over the circuit board 59 as to partition the inside of the bottom case 4 vertically at a level substantially equal to that of the deck portion 4a. In the casing 3, therefore, the side of the top cover 5 above the main chassis 6 is the disk transfer area, in which the loading arm 51 and an eject arm 52 turnably confront each other, and the side of the bottom case 4 below the main chassis 6 is the arrangement area for arranging the drive mechanism 120 having a drive motor 121 and the slider 122, and first and second link arms 54 and 55, an operation arm 58 and a loop cam 57 of the disk transfer mechanism 50 for transmitting the driving force of the drive motor 121 to the eject arm 52.

The main chassis 6 is made of the generally flat sheet metal into a shape having an upper face 6a covering the bottom case 4 from the back face side of the bottom case 4 to one side face having the deck portion 4a, and a pair of side plate portions 6b folded from the periphery of the upper face along the two side faces of the bottom case 4. In the upper face 6a of the main chassis 6, moreover, there are formed a base opening 6c and an eject arm opening 6d, through which the base unit 22 and the eject arm 52 of the disk transfer mechanism 50 confront the transfer area of the optical disk 2. In the side plate portions 6b on the side, where the deck portion is formed, there is formed a side plate opening 6e, through which a loading cam plate 53 connected to the slider 122 to be slid by the drive motor 121 is inserted. On the upper face 6a of the main chassis 6 and on the side of the bottom case 4, there are retained the eject arm 52 of the disk transfer mechanism 50 for transferring the optical disk 2 into and out of the casing 3, the operation arm 58 for transmitting the driving force of the drive mechanism 120 thereby to operate the eject arm 52, and the loop cam 57 for guiding the movement of the second link arm 55.

Moreover, the main chassis 6 is equipped with a plurality of guide members 6f, which are folded inward generally at right angles and which have screw holes 6h for fixing the main chassis 6 to the bottom case 4. In the bottom case 4, on the other hand, there are formed screw holes 4c, which are positioned to correspond to the through holes 6h so that the main chassis 6 is fixed by fastening the screw holes 4c and the through holes 6h by means of the screws.

Figure 7:
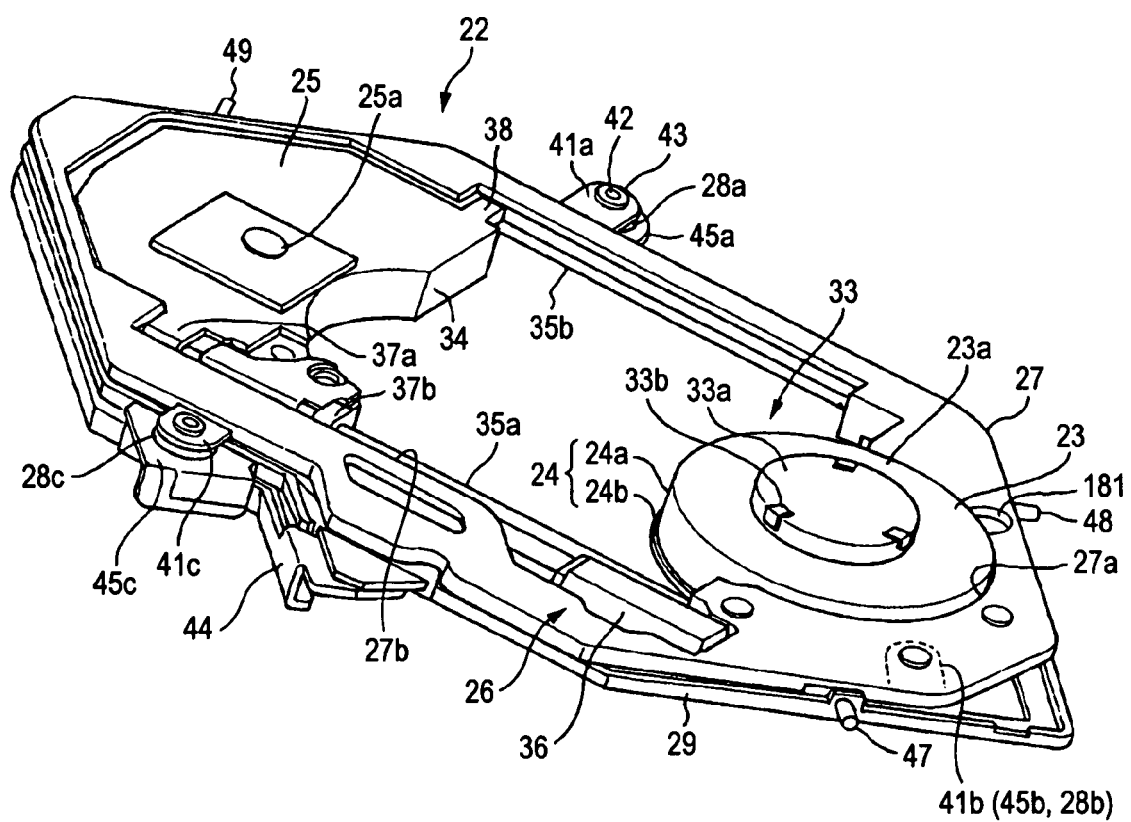
FIG. 7 is a perspective view showing a base unit.

The disk drive device 1 is equipped, at the bottom face portion of the bottom case 4, with the base unit 22 constituting the drive body. As shown in FIG. 7, the base unit 22 is constituted to include a base chassis 27 made of a generally rectangular frame body, and this base chassis 27 is supported by a sub chassis 29 through a plurality of dampers 28a to 28c. Moreover, the base chassis 27 is arranged through the sub chassis 29 in the bottom case 4 so that the base unit 22 has its one longitudinal end side positioned generally at the center of the casing 3. The base unit 22 is equipped, on the longitudinal one end side, with a disk holding unit 23 for holding the optical disk 2 inserted from the disk slot 19 into the casing 3, and a disk rotating drive mechanism 24 for rotating the optical disk 2 held on the disk holding unit 23. The base unit 22 is further equipped with an optical pickup 25 for writing or reading signals in and from the optical disk 2 by the disk rotating drive mechanism 24, and a pickup feed mechanism 26 for transferring the optical pickup 25 longitudinally to feed the optical disk 2 radially. These components are integrally disposed on the base chassis 27. This base chassis 27 is supported by the sub chassis 29 so that the base chassis 22 is moved upward and downward together with the sub chassis 29 by the later-described base lifting mechanism 150.

The base unit 22 is so positioned to confront the disk transfer area from the base opening 6c of the main chassis 6 that the disk holding unit 23 may be positioned generally at the center in the bottom face portion of the bottom case 4. Moreover, the base unit 22 can be moved upward and downward by the later-described base lifting mechanism 150. At the initial state, the base unit 22 is positioned below the optical disk 2 inserted into the casing 3 from the disk slot 19, and is moved upward according to the loading operation of the optical disk 2 so that it engages with the optical disk 2 rotatably. The base unit 22 is moved downward after the recording/playing operation by the base lifting mechanism 150 so that it is disengaged from the optical disk 2 and is retrieved from the transfer area of the optical disk 2.

Figure 6:
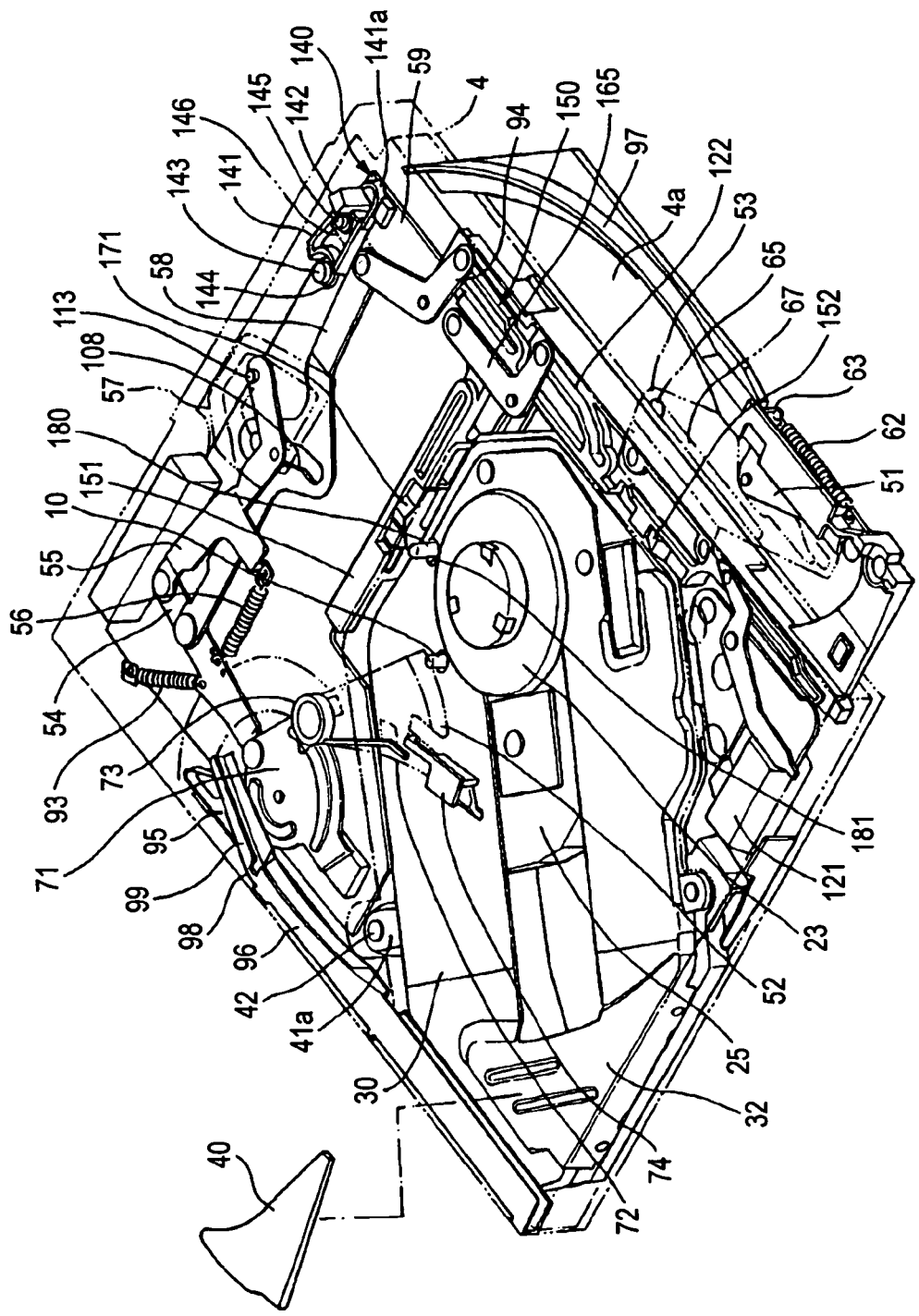
FIG. 6 is a perspective view showing the inside of the disk drive device according to the embodiment of the invention.

The base chassis 27 is prepared by punching a sheet metal into a predetermined shape and by folding its periphery slightly downward. In the main face of the base chassis 27, there are continuously formed a generally semicircular table opening 27a for causing the turntable 23a of the later-described disk holding unit 23 to face upward, and a generally rectangular pickup opening 27b for causing an objective lens 25a of the later-described optical pickup 25 to face upward. To the upper face portion of the base chassis 27, as shown in FIG. 6, there is attached a decorative plate 30, which is opened to correspond to those openings 27a and 27b.

In the base chassis 27 and at the end portion opposite of the disk holding unit 23, there is formed a guide plate 32 which prevents the contact between the optical disk 2 and the base chassis 27 and which guides the optical disk 2 to an abutting member 74 of the eject arm 52. A fiber sheet 40 is adhered to the guide plate 32 so that it can prevent the signal recording face of the optical disk 2 from being damaged.

From the two side faces of the longitudinal direction of the base chassis 27, moreover, there are projected connecting members 41a and 41b, which are connected to the sub chassis 29 through the dampers 28a and 28b. In each of the connecting members 41a and 41b, there is formed a through hole 43, which continues to connecting members 45a and 45b formed at the sub chassis 29, and in which a stepped screw 42 is inserted.

The disk holding unit 23 is equipped with the turntable 23a, which is rotationally driven by the disk rotating drive mechanism 24. The turntable 23a is equipped at its central portion with a chucking mechanism 33 for holding the optical disk 2. This chucking mechanism 33 is equipped with the engaging protrusion 33a for engaging with the center hole 2a of the optical disk 2, and a plurality of retaining pawls 33b for retaining the circumference of the center hole 2a of the optical disk 2 engaging with the engaging protrusion 33a, thereby to hold the optical disk 2 on the turntable 23a.

The disk rotating drive mechanism 24 is equipped with a flattened spindle motor 24a for rotating the optical disk 2 integrally with the turntable 23a. The spindle motor 24a is so attached through a support plate 24b to the lower face of the base chassis 27 by means of screws that the turntable 23a on the upper face may slightly protrude from the table opening 27a of the base chassis 27.

The optical pickup 25 is constituted to include an optical block for condensing an optical beam irradiated from a semiconductor laser acting as a light source, to irradiate the condensed light onto the signal recording face of the optical disk 2, and for detecting the returning optical beam reflected on the signal recording face of the optical disk 2, by an optical detector composed of a light receiving element or the like, so that the signals are written in or read out from the optical disk 2.

Moreover, the optical pickup 25 is constituted to include an objective lens drive mechanism such as a biaxial actuator for displacing and driving the objective lens 25a in the direction of the optical axis (as will be called the "focusing direction") and in the direction (as will be called the "tracking direction) perpendicular to the recording track of the optical disk. The objective lens 25a is displaced by the biaxial actuator in the focusing direction and in the tracking direction on the basis of the detected signals, as detected by the aforementioned optical detector, from the optical disk 2. During these displacements, the drive control is made by the focus servo, in which the objective lens 25a is focused on the signal recording face of the optical disk 2, or by the tracking servo, in which the spot of the optical beam condensed by the objective lens 25a is followed by the recording track. Here, the objective lens drive mechanism may also be exemplified by a triaxial actuator, which is enabled to adjust the inclination (or skew) of the objective lens 25a with respect to the signal recording face of the optical disk 2 so that the signal recording face of the optical disk 2 may be irradiated normally thereon with the optical beam condensed by the objective lens 25.

The pickup feed mechanism 26 is constituted to include a pickup base 34 having the optical pickup 25 mounted thereon, a pair of guide pins 35a and 35b for supporting the pickup base 34 slidably in the radial direction of the optical disk 2, and a displacement drive mechanism 36 for displacing and driving the pickup base 34, as supported by those paired guide pins 35a and 35b, in the radial direction of the optical disk 2.

In the pickup base 34, a pair of guide members 37a and 37b, in which a guide hole extending through one 35a of the paired guide pins 35a and 35b and a guide member 38 having guide grooves sandwiching the other guide pin 35b are formed to protrude from the confronting side faces. As a result, the paired guide pins 35a and 35b are slidably supported on the pickup base 34.

The paired guide pins 35a and 35b are arranged on the lower face of the base chassis 27 and in parallel with the radial direction of the optical disk 2, so that the pickup base 34 confronted by the optical pickup 25 is guided from the pickup opening 27b over the inner and outer circumferences of the optical disk 2.

The displacement drive mechanism 36 converts the rotational drive of a drive motor 31, as mounted on the base chassis 27, to a linear drive through the (not-shown) gear or rack, and displaces and drives the pickup base 34 in the direction along the paired guide pins 35a and 35b, i.e., in the radial direction of the optical disk 2. The displacement drive mechanism 36 is exemplified by a stepping motor having a lead screw.

Here is described the sub chassis 29 for supporting that base chassis 27 through a damper 28. The sub chassis 29 is so moved up and down according to the transfer of the optical disk 2 by the later-described base lifting mechanism 150 as to bring the base chassis 27 close to or apart from the optical disk 2. This sub chassis 29 is made of a generally rectangular frame member which has substantially the same shape as that of the contour of the base chassis 27 and which is slightly larger than the base chassis 27. The sub chassis 29 constitutes, when connected to the base chassis 27, the base unit 22 together with the base chassis 27. The sub chassis 29 is disposed along the side face portion having the guide pin 35a, and has a reinforcing chassis 44 integrated therewith for reinforcing the sub chassis 29. In this sub chassis 29, there are formed the connecting members 45a and 45b, on which the dampers 28a and 28b are mounted, and which are connected to the base chassis 27. The connecting member 45a is disposed on one side extending in the longitudinal direction and at the position corresponding to the connection member 41a of the base chassis 27, and the connecting member 45b is disposed on the other side extending in the longitudinal direction and at the position corresponding to the end portion 41b of the base chassis 27 at the end portion on the side of the disk holding unit 23.

Figure 8:
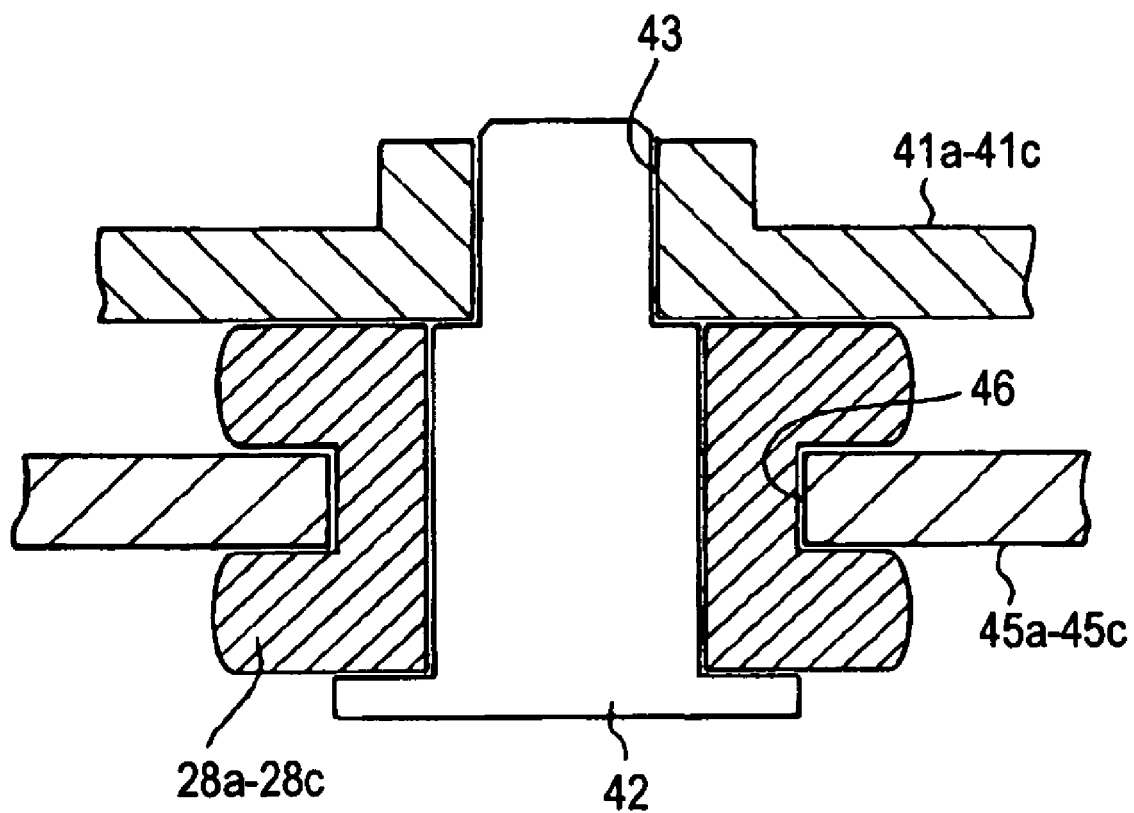
FIG. 8 is a sectional view showing the connected portion of a base chassis and a sub chassis.

Here, the sub chassis 29 is not equipped with the connecting member on the end portion of the other side face in the longitudinal direction and on the other side of the disk holding unit 23, but the reinforcing chassis 44, as fixed on the sub chassis 29, is provided with a connecting member 45c in a manner to correspond to the connecting member 41c of the base chassis 27. In each of the connecting members 45a to 45c, as shown in FIG. 8, there is formed an insert hole 46, which is connected with each insert hole 43 of the connecting members 41a to 41c of the base chassis 27. On each of the connecting members 45a to 45c, moreover, there is mounted each of the dampers 28a to 28c, through which the stepped screw 42 is connected to the connecting members 41a to 41c of the base chassis 27 so that the stepped screw 42 is inserted into each of the insert holes 43 and 46.

As shown in FIG. 7, on the other hand, the sub chassis 29 is constituted to include a first pivot pin 47 positioned on the side of the disk holding unit 23 to confront the later-described slider 122 and supported in engagement with a first cam slit 130 of the slider 122, a second pivot pin 48 positioned on the side of the disk holding unit 23 to confront a sub slider 151 and supported in engagement with a second dam slit 170 of the sub slider 151, and a third pivot pin 49 positioned on the side opposite to the side face to confront the slider 122 and supported rotatably in an axial hole 9 formed in the side plate portion 6b of the main chassis 6.

In this sub chassis 29, therefore, in accordance with the slides of the slider 122 and the sub slider 151, the first pivot pin 47 slides in the first cam slit 130, and the second pivot pin 48 slides in the second cam slit 170, so that the side of the disk holding unit 23 can be turned on the third pivot pin 49 thereby to move the base chassis 27 up and down.

On the bottom face portion of the bottom case 4, as shown in FIG. 3, there is erected a support pin 10 for prevent the later-described eject arm 52 from warping downward, when the eject arm 52 turns near the disk holding unit 23. This support pin 10 is provided for preventing the eject arm 52 from warping downward so that the optical disk 2 may neither collide against the disk holding unit 23 nor be damaged. This support pin 10 is so positioned near the disk holding unit 23 of the base unit 22 as to protrude upward from the bottom face of the bottom case 4 and to confront the disk transfer area through a through hole 30a formed in the decorative plate 30.

Figure 9:
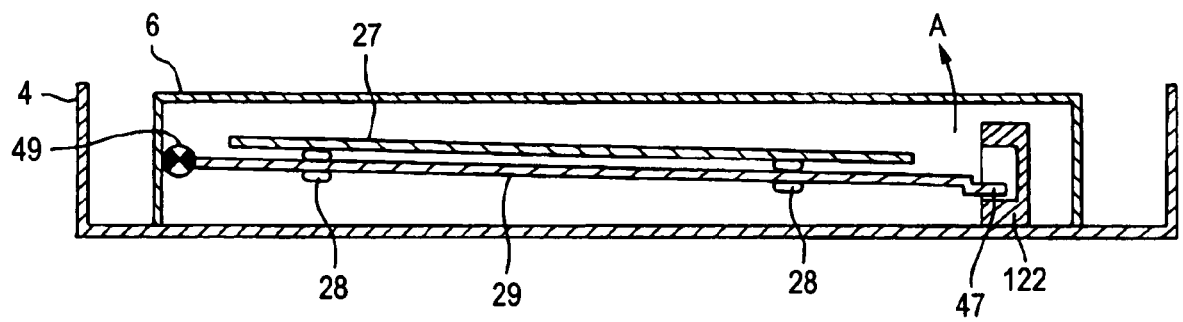
FIG. 9 is a diagram for explaining a support structure by a damper in the base unit between the base chassis and the sub chassis.

The base unit 22 thus constituted is lifted upward in the direction of arrow A and downward in the direction opposed to arrow A, as schematically shown in FIG. 9. At this time, the base chassis 27 is supported through each damper 28 exclusively by the sub chassis 29, so that the vibrations from the outside are entirely transmitted through the sub chassis 29 having the dampers 28 thereby to improve the resistance to impacts. Moreover, no excess weight including the individual dampers 28 is applied to the base chassis 27, that is, the total weight as the target of the impact transmission is reduced because of no damper so that the impact resistance is further improved.

Here, this main chassis 6 may also be fixed on the bottom case 4 through the damper. As shown in FIG. 10, specifically, the main chassis 6 is equipped with the dampers 28 each between the guide member 6f and the screw hole 4c of the bottom case 4, and is fixed by a stepped screw.

Figure 11:
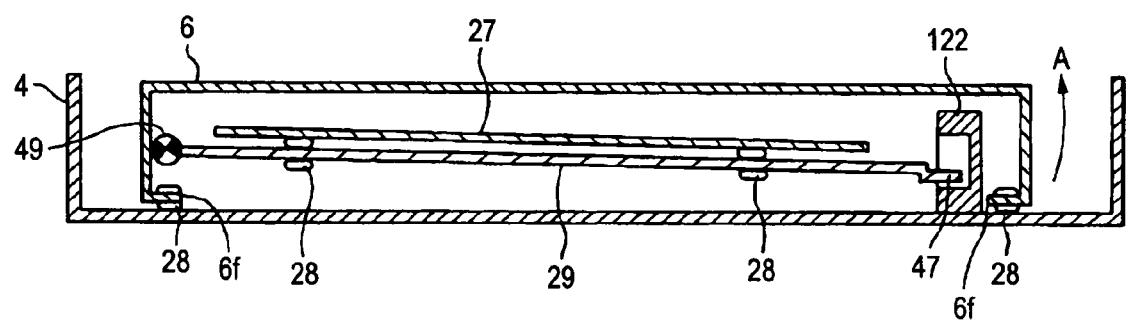
FIG. 11 is a sectional view showing another embodiment of the disk drive device.

In the base unit 22 thus fixed, as schematically shown in FIG. 11, the sub chassis 29 is supported by the main chassis 6, which in turn is fixed through the bottom case 4 and the dampers 28. At this time, the base chassis 27 is supported only by the sub chassis 29 through the dampers 28a to 28c, and the sub chassis 29 is supported by the main chassis 6. This main chassis 6 is fixed by the bottom case 4 through the dampers 28. The vibrations are transmitted from the outside through the main chassis 6 having the dampers 28 and through the sub chassis 29 having the dampers 28a to 28c. Thus, the resistance to the shocks can be better improved because the shocks pass through the dampers arranged at the two steps.

Between the central portion of the side plate portion 6b of the main chassis 6 and the bottom case 4, moreover, there may be sandwiched a shock absorber 39, which is made of an elastic member such as a thin rubber member for shielding the passage, through which the shocks might otherwise be transmitted by the vibration amplitude of the shocks through the direct contact of the side plate portion 6b and the bottom case 4. Moreover, the shock absorber 39 has an adhesive layer on its one face and is adhered through the adhesive layer to the side plate portion 6b of the main chassis 6.

Even in case the clearance between the bottom case 4 and the main chassis 6 is narrowed and in case the main chassis 6 is connected to the inside of the bottom case 4 through the dampers 28, the side plate portion 6b of the main chassis 6 comes into contact with the bottom case 4 so that the disturbances can be prevented from being transmitted through the contacting portion to the main chassis 6 and the base chassis 22.

This disk drive device 1 is provided, as shown in FIG. 12 to FIG. 19, with the disk transfer mechanism 50 for transferring the optical disk 2 between a disk insert/remove position, at which the optical disk 2 is inserted into and removed from the disk slot 19, and a disk holding position, at which the optical disk 2 is held on the turntable 23a of the disk holding unit 23.

This disk transfer mechanism 50 is constituted to include: the loading arm 51 and the eject arm 52 enabled, as support members operated to move between the upper face 6a of the main chassis 6 and the main face confronting the disk holding unit 23 of the top plate portion 5a, to rock in a plane parallel to the principal face of the optical disk 2; the loading cam plate 53 for transmitting the driving force from the later-described drive mechanism 120 to the loading arm 51; the first link arm 54 for turning the eject arm 52 in the direction to eject the optical disk 2; the second link arm 55 connected to the first link arm 54; a tensile coil spring 56 tensed between the first and second link arms 54 and 55; a loop cam 57 engaged by a guide projection 113 of the second link arm 55 for guiding the second link arm 55; and the operation arm 58 connected to the drive mechanism 120 for operating the first link arm 54 so that the eject arm 52 may move in the direction to insert or extract the optical disk 2.

When the optical disk 2 is inserted, the eject arm 52 of the disk transfer mechanism 50 is turned to a predetermined position. During this operation, the first link arm 54 is turned in one direction by the eject arm 52, and the second link arm 55 is moved in a direction different from the turning direction of the first link arm 54 while the guide projection 113 is being guided by the loop cam 57. As a result, the eject arm 52 is turned in the inserting direction while being urged in the ejecting direction by the tensile coil spring 56. At the time of ejecting the optical disk 2, on the other hand, the guide projection 113 of the second link arm 55 is guided by the loop cam 57 so that the first and second link arms 54 and 55 come close to each other. As a result, the tensile coil spring 56 is not extended, but the eject arm 52 is turned through the first link arm 54 by the operation arm 58 without any urging force in the ejecting direction, so that the eject arm 52 is turned to eject the optical disk 2.

At the time of inserting the optical disk 2, therefore, in the procedure that the optical disk 2 is inserted to a predetermined position by the user, the urging force in the ejecting direction by the tensile coil spring 56 can be activated to prevent the situation, in which the optical disk 2 might otherwise be left in a partially inserted state in the casing 3 when the user quits the insertion of the optical disk 2. At the time of ejecting the optical disk 2, on the other hand, the urging force, which has been applied in the ejecting direction to the eject arm 52 by the tensile coil spring 56, does not act to allow the eject arm 52 to turn in accordance with the operation of the operation arm 58 having received the driving force of the drive mechanism 120, so that the optical disk 2 can be stably ejected without any elastic force to the predetermined stop position, at which the center hole 2a of the optical disk 2 is ejected to the outside of the casing 3.

The individual component members of the disk transfer mechanism 50 are described in detail in the following.

The loading arm 51 transfers the optical disk 2 over the disk holding unit 23. In the loading arm 51, the root end portion is so supported over the deck portion 4a of the bottom case 4 as can turn closer to the disk slot 19 than the disk holding unit 23, and the leading end portion can turn in the direction of arrow $a_1$ and in the direction of arrow $a_2$ in FIG. 12. More specifically, the loading arm 51 is made of a flat sheet metal, and is equipped at its one end portion with an insert portion 60, which engages with the deck portion 4a so that the loading arm 51 can turn over the deck portion 4a in the directions of arrows $a_1$ and $a_2$ in FIG. 12.

Moreover, the loading arm 51 is equipped at its leading end portion with an abutting portion 61, which is protruded upward to abut against the outer circumference of the optical disk 2 inserted from the disk slot 19. The abutting portion 61 carries a radially small roller 61a in a rotatable manner. Moreover, the abutting portion 61 is made of a softer resin than that of the optical disk 2. The abutting portion 61 has a generally drum shape, in which the central portion is curved inward to abut against the outer circumference of the optical disk 2 inserted from the disk slot 19, and in which the two end portions regulate as the radially enlarged flange portions the movement of the optical disk 2 in the height direction.

In the loading arm 51, moreover, a retaining member 63 is formed to rise from the vicinity of the insert portion 60. On this retaining member 63, there is retained the other end of a coil spring 62, which has its one end retained on a right guide wall 97 (as referred to FIG. 6). As a result, the loading arm 51 is urged by the force of the coil spring 62 to urge the optical disk 2 always on the insert portion 60 in the direction of arrow $a_1$ in FIG. 12 to urge the optical disk 2 from the side of the disk slot 19 to the side of the disk holding unit 23.

Moreover, the loading arm 51 has an engaging projection 64 to be inserted to engage with a first cam groove 66 of the later-described loading cam plate 53. The loading arm 51 is turned while regulating the urging force of the coil spring 62, as the engaging projection 64 moves along the first cam groove 66 of the loading cam plate 53.

Figure 21:
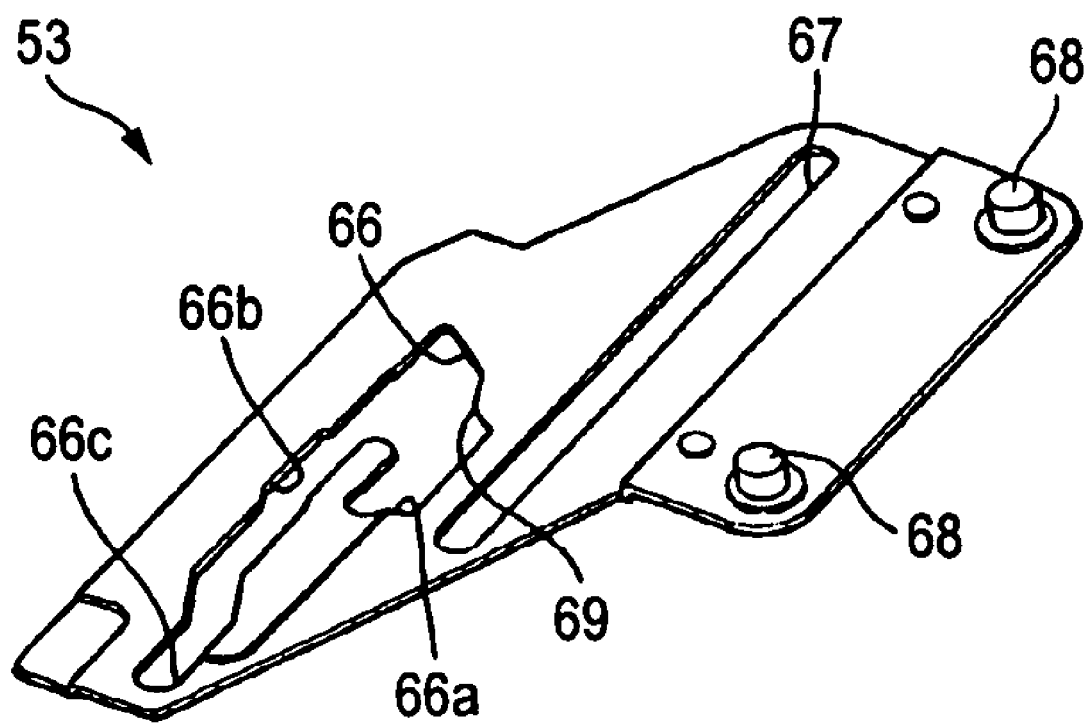
FIG. 21 is a perspective view showing a loading cam plate.

The loading cam plate 53 for turning the loading arm 51 is made of a flat sheet metal, and engages with the slider 122 of the later-described drive mechanism 120 so that it is moved back and forth over the deck portion 4a as the slider 122 moves. Moreover, the loading cam plate 53 is superposed on the loading arm 51 supported over the deck portion 4a and has the engaging projection 64 inserted thereinto, so that it regulates the turning motion of the loading arm 51. The loading cam plate 53 is equipped, as shown in FIG. 21, with the first cam groove 66, into which the engaging projection 64 on the loading arm 51 is inserted, a second cam groove 67, into which a guide projection 65 from the deck portion 4a is inserted, and a pair of engaging projections 68 and 68 for engaging with the slider 122.

The first cam groove 66 regulates, when slid by the engaging projection 64, the turning motion of the loading arm 51 urged in the loading direction of the optical disk 2 by the coil spring 62. The first cam groove 66 is constituted to include: a first guide portion 66a for regulating the engaging projection 64 thereby to regulate the turning motion of the loading arm 51 in the loading direction of the optical disk 2 or in the direction of arrow $a_1$ in FIG. 12; a second guide portion 66b formed adjacent to and continuously from the first guide portion 66a, for turning the loading arm 51 in the loading direction of the optical disk 2; and a third guide portion 66c formed continuously from the second guide portion 66b, for guiding the engaging projection 64 in the direction of arrow $a_2$ in FIG. 16, in which the loading arm 51 leaves the outer circumference of the optical disk 2 held in the disk holding unit 23.

Figure 12:
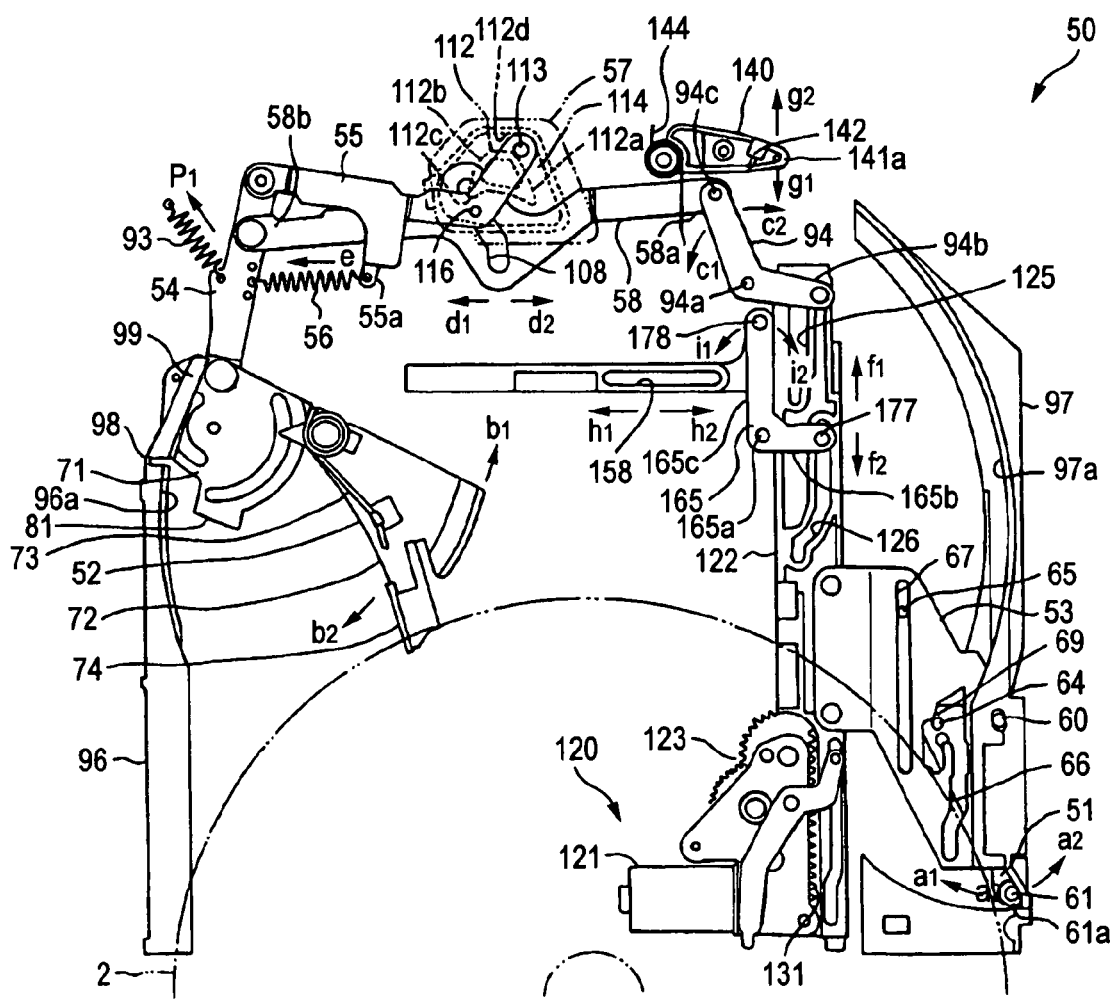
FIG. 12 is a diagram showing a transfer step of an optical disk and a top plan view showing an insertion starting time of the optical disk.

When the loading cam plate 53 is moved backward in the casing 3, the engaging projection 64 moves along the second guide portion 66b so that the loading arm 51 receiving the urging force of the coil spring 62 is turned in the direction of arrow $a_1$ in FIG. 12 or in the loading direction of the optical disk 2 thereby to push the optical disk 2 to the side of the disk holding unit 23. When the optical disk 2 is held in the disk holding unit 23, the engaging projection 64 is moved along the third guide portion 66c, and the loading arm 51 is turned in the direction of arrow $a_2$ of FIG. 16 against the biasing force of the coil spring 62, so that the abutting portion 61 of the loading arm 51 leaves the outer circumference of the optical disk 2 thereby to make the optical disk 2 rotatable.

Figure 18:
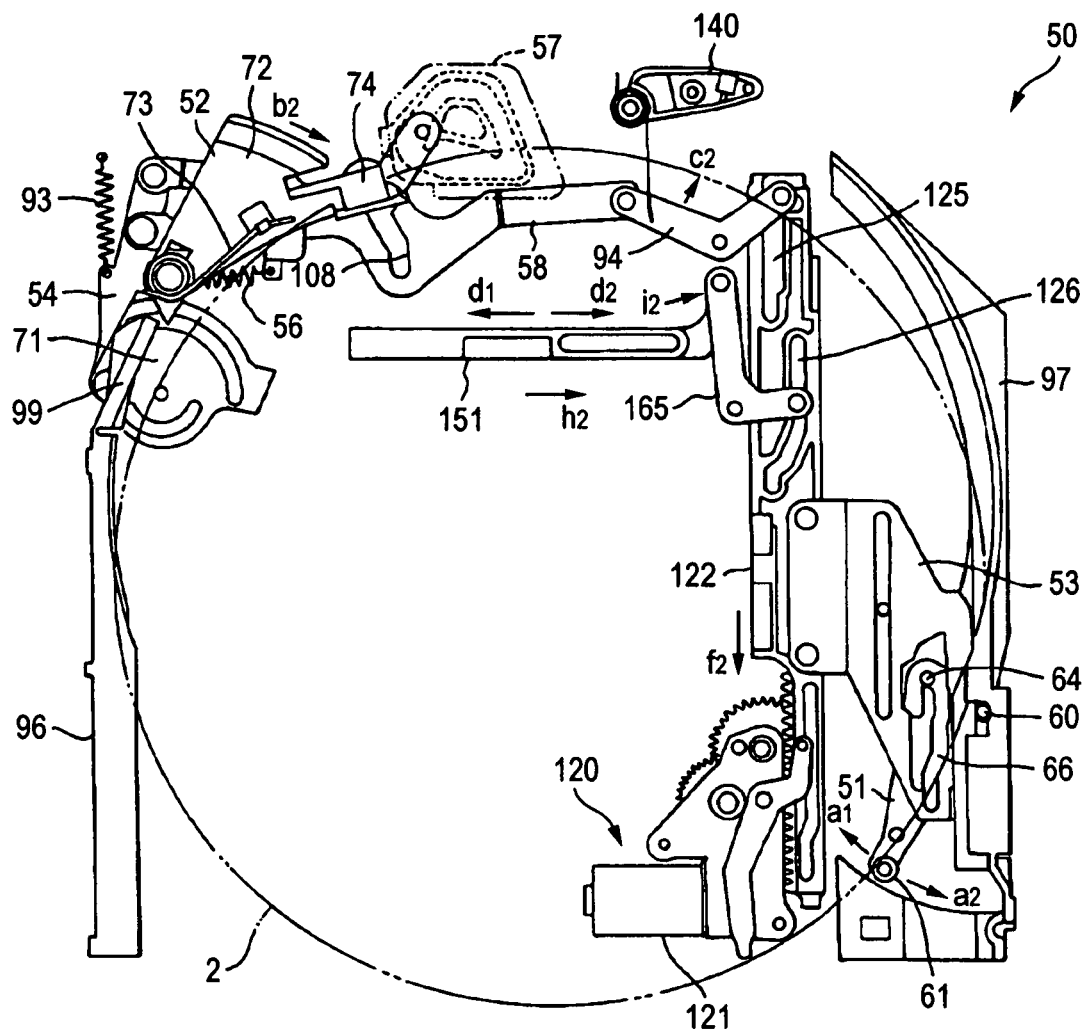
FIG. 18 is a diagram showing the ejecting step of the optical disk and a top plan view showing the state, in which the optical disk is transferred by the individual arms.
Figure 19:
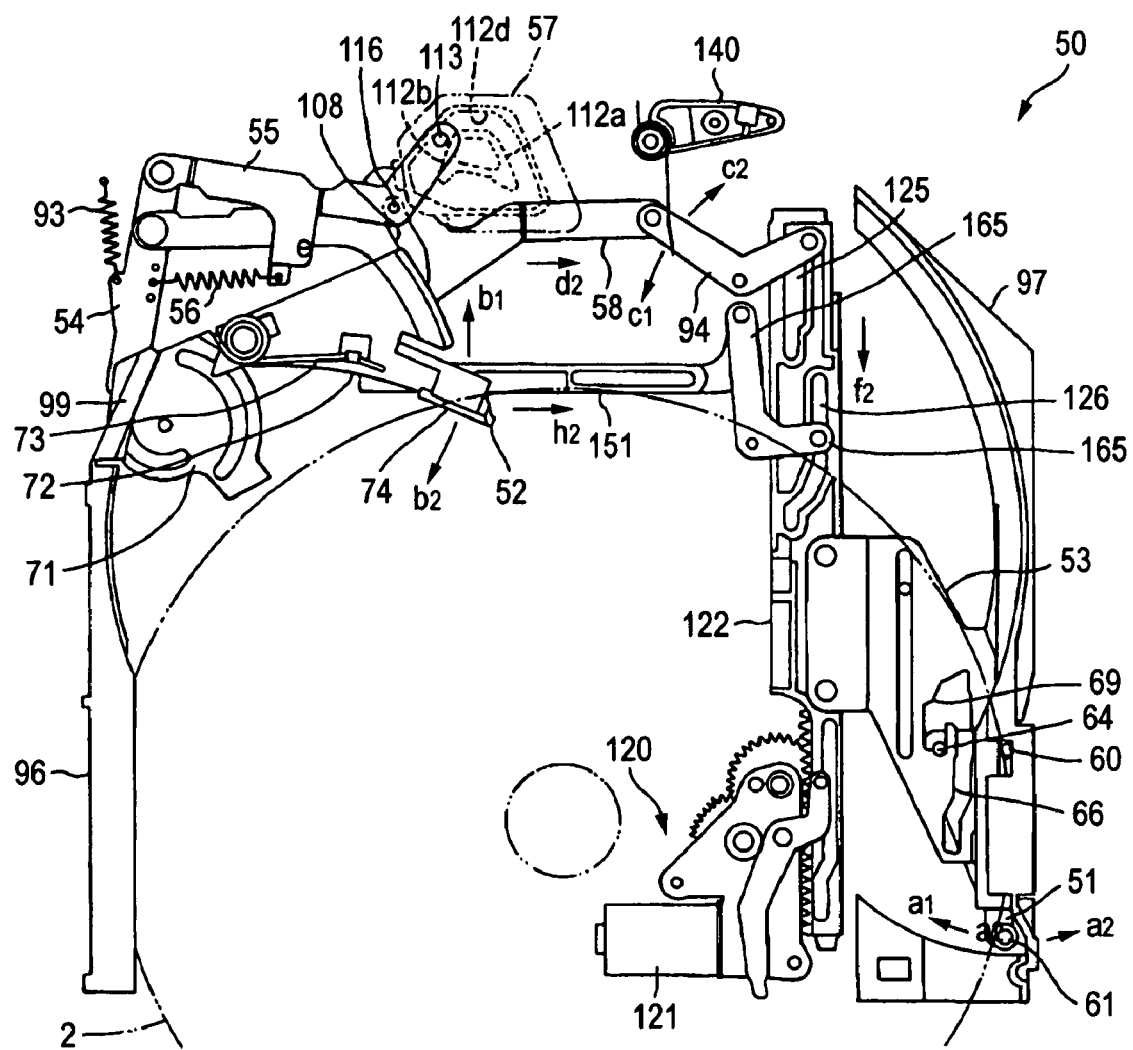
FIG. 19 is a diagram showing the ejecting step of the optical disk and a top plan view showing the state, in which the optical disk is transferred by the individual arms.

At the time of ejecting the optical disk 2, on the other hand, as the slider 122 is moved forward, the loading cam plate 53 is moved backward, and the engaging projection 64 is moved from the second guide portion 66b to the first guide portion 66a, so that the loading arm 51 is turned in the direction of arrow $a_1$ in FIG. 18 and FIG. 19 into abutment against the optical disk 2. At this time, the optical disk 2 is pushed in the ejecting direction by the eject arm 52 receiving the driving force of the drive mechanism 120 and is ejected while being urged in the inserting direction by the loading arm 51 urged by the coil spring 62. In the disk transfer mechanism 50, therefore, at the time of ejecting the optical disk 2, the optical disk 2 is pushed, while being clamped by the loading arm 51 and the eject arm 52, to the predetermined ejecting position so that the optical disk 2 can be prevented by the loading arm 51 from abruptly coming out.

Here, when the ejecting of the optical disk 2 is ended, the engaging projection 64 is retained by a protrusion 69 formed in the first cam groove 66 of the loading cam plate 53, so that it is regulated from the turning motion in the $a_1$ direction and held in the position retracted from the disk transfer area thereby to await the insertion of the optical disk 2.

The second cam groove 67 is fitted on the guide projection 65 formed at the deck portion 4a thereby to guide the movement of the loading cam plate 53. This second cam groove 67 is formed straight in parallel with the moving direction of the slider 122. As the slider 122 moves, the guide protrusion 65 slides to guide the loading cam plate 53 in the moving direction of the slider 122.

The paired engaging projections 68 and 68 to engage with the slider 122 are formed at a spacing on one side of the loading cam plate 53. These engaging projections 68 and 68 are projected downward and on the bottom face side of the bottom case 4, so that they engage with engaging recesses 127 and 127, as arranged along the side face of the bottom case 4, of the slider 122. As a result, the loading cam plate 53 and the slider 122 are integrated so that the loading cam plate 53 is slid as the slider 122 moves.

Here, the other side face of the loading cam plate 53 on the opposite side having those engaging projections 68 and 68 is slidably inserted into the clearance formed between the right guide wall 97 and the deck portion 4a, so that the loading cam plate 53 is prevented from floating from the deck portion 4a.

Figure 22:
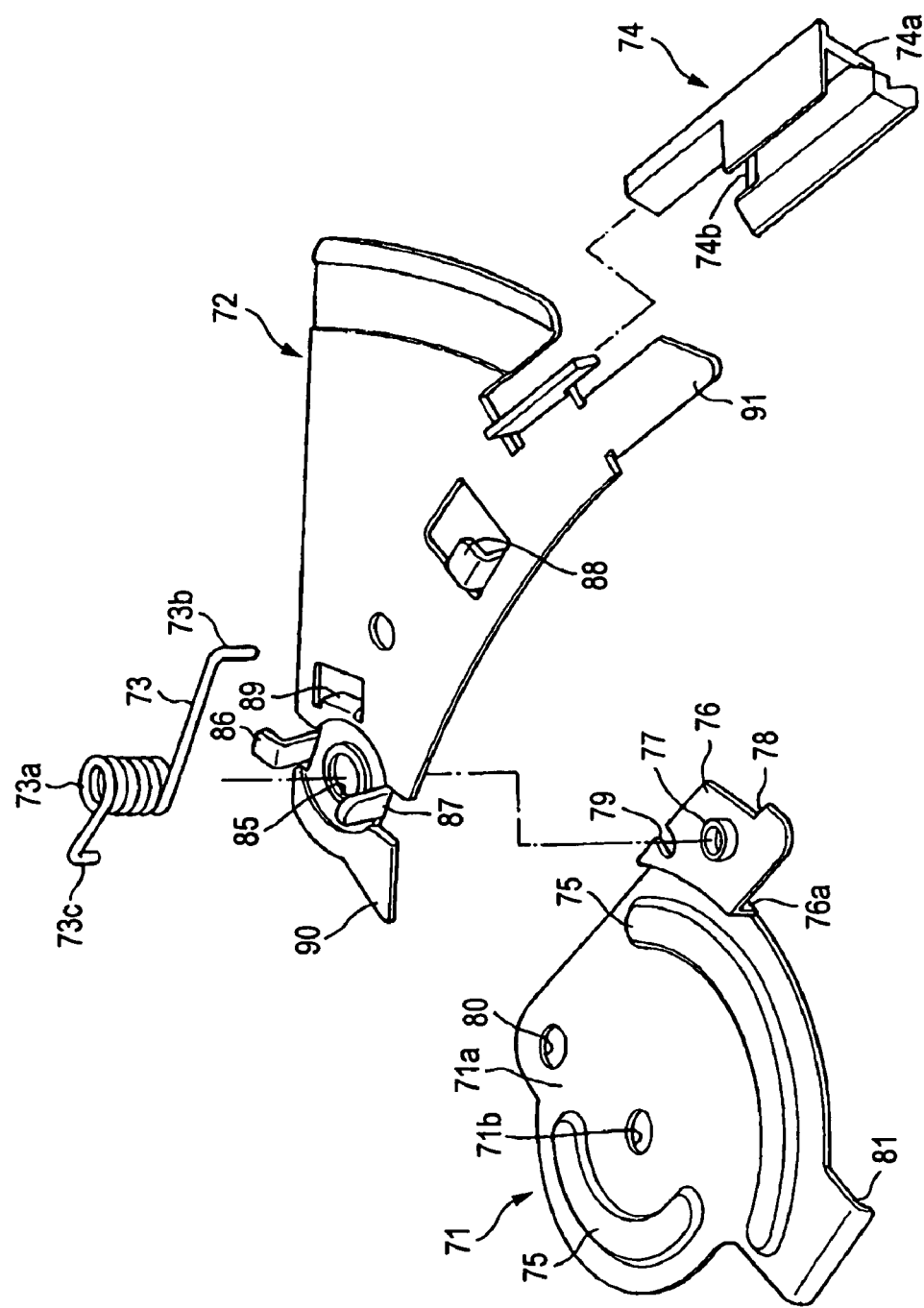
FIG. 22 is an exploded perspective view showing the eject arm.

The eject arm 52 for ejecting the optical disk 2 from the disk holding unit 23 to the outside of the slot 19 is arranged on the side face opposed to the side face, on which the loading arm 51 is formed, and on the back side closer to the casing 3 than the disk holding unit 23. The eject arm 52 is turned, while being operated by the later-described first and second link arms 54 and 55 and the operation arm 58, in the direction of arrow $b_1$ in FIG. 12, in which the optical disk 2 is transferred to the disk holding unit 23, and in the direction of arrow $b_2$ in FIG. 12, in which the optical disk 2 is ejected to the disk slot 19. This eject arm 52 is equipped, as shown in FIG. 22, with a turning support member 71 turnably supported by the main chassis 6, a push arm 72 turnably engaging with the turning support member 71, for pushing out the optical disk 2, a coil spring 73 for urging the push arm 72 in the direction to eject the optical disk 2, and the abutting member 74 carried on the leading end of the push arm 72, for abutting against the side face of the optical disk 2.

The turning support member 71 is made of a generally circular sheet metal, and is rotatably mounted on the upper face 6a of the main chassis 6 and on the opposite side of the disk transfer area of that upper face 6a. A mounting port 71b for the main chassis 6 is formed centrally in the main face 71a of the turning support member 71. From the main face 71a of the support member 71, there bulge sliding contact ridges 75 which come into sliding contact with the main chassis 6. The sliding contact ridges 75 come into sliding contact with the main chassis 6 so that the turning support member 71 is smoothly turned.

Moreover, the turning support member 71 is equipped with an engaging member 76 for engaging with the push arm 72 and the coil spring 73. The engaging member 76 is so formed by folding it from the leading end of a rising wall 76a rising from the main face 71a that it is above the principal face 71a and protrudes closer to the upper face 6a than the eject arm opening 6d of the main chassis 6. The engaging member 76 is constituted to include a cylindrical engaging portion 77 to be inserted into an opening 85 of the push arm 72 and to receive the coil spring 73, a turn regulating portion 78 retained by a retaining member 89 protruded from the push arm 72, for regulating the turning motion of the push arm 72, and a retaining recess 79 for retaining one arm 73c of the coil spring 73.

In the main face 71a of the turning support member 71, moreover, there is formed an engaging hole 80, which is turnably engaged by the later-described first link arm 54. Moreover, the turning support member 71 is equipped with a folded member 81, which is folded from one side face of the main face 71a. This folded member 81 is so folded downward from the main face 71a to constitute an abutting piece which abuts against the sub slider 151 of the later-described base lifting mechanism 150. At the same time, the folded member 81 turns ON a first switch SW1 mounted in the circuit board 59, when turned in the direction of arrow $b_1$ in FIG. 12 to transfer the optical disk 2 loaded. As a result, the disk drive device 1 can detect that the eject arm 52 pushed by the optical disk 2 has turned to the back side of the casing 2, thereby to measure the timing for driving the drive mechanism 120.

The push arm 72 for turnably engaging with the engaging member 76 is made of a flat sheet metal, and is constituted to include: the opening 85 formed at one end portion for inserting and engaging with the engaging portion 77 of the engaging member 76; first to third engaging projections 86 to 88 engaged by the coil spring 73; the retaining member 89 to be retained by the rotation regulating portion 78 of the turning support member 71; a push member 90 for pushing a left guide wall 96 to guide the centering of the optical disk 2, away from the optical disk 2; and a mounting portion 91 formed at the other end portion, for mounting the abutting member 74. When the engaging portion 77 of the turning support member 71 is inserted into the opening 85, the push arm 72 turnably engages with the turning support member 71. The first and second retaining projections 86 and 87, as erected from the circumference of the opening 85, are inserted into the cylindrical portion 73a of the coil spring 73 thereby to hold the coil spring 73. On the other hand, the third retaining projection 88 retains one arm 73b of the coil spring 73. Here, the other arm 73c of the coil spring 73 is retained by a retaining recess 79 of the turning support member 71. As a result, the push arm 72 is urged by a predetermined spring force to turn on the engaging portion 77 of the turning support member 71 toward the disk slot 19.

On the other hand, the retaining member 89 is folded downward from the vicinity of the opening 85, and is brought into abutment against the turn regulating portion 78 of the turning support member 71, when the push arm 72 is turned, thereby to regulate the turning motion of the push arm 72 urged toward the disk slot 19. The push member 90 is urged to the transfer area of the optical disk 2 and to push the left guide wall 96 for guiding the centering of the optical disk 2, so that the push member retrieves the left guide wall 96 at the recording and/or playing time from the optical disk 2.

The abutting member 74 to be mounted on the mounting portion 91 of the push arm 72 is molded of a softer resin than that of the optical disk 2, and is equipped with a recessed disk receiving portion 74a for abutting against the outer circumference of the optical disk 2, an insert hole 74b for inserting the mounting portion 91 of the push arm 72, and a regulating portion 74c for preventing a small-diameter disk, if erroneously inserted, from being inserted into the casing 3. The abutting member 74 is integrated with the push arm 72 by inserting the mounting portion 91 into the insert hole 74b. Here, the abutting member 74 may be equipped with a stopper 100 for preventing the erroneous insertion of the small-diameter optical disk 101. This stopper 100 will be detailed hereinafter.

In this eject arm 52, the turning support member 71 and the push arm 72 turnably engage with each other, and the push arm 72 is urged to turn toward the side of the disk slot 19 by a predetermined spring force of the coil spring 73. Even in case the force in the direction of arrow $b_1$ is applied by an obstacle on the transfer area of the optical disk 2 when the eject arm 52 is turned by the turning operation in the direction of arrow $b_2$ in FIG. 19 to eject the optical disk 2 to the outside of the casing 3 by the first link arm 54 and the operation arm 58 having received the driving force of the later-described drive mechanism 120, the push arm 72 having received the force opposed from the direction to eject the optical disk 2 is turned on the engaging portion 77 in the direction of the arrow $b_1$ against the urging force of the coil spring 73. As a result, there is avoided the situation, in which the driving force to turn the eject arm 52 in the direction of arrow $b_2$ and the force to act in the direction opposed to the driving force are opposed to each other. Therefore, no excessive load is applied to the motor or the like of the drive mechanism 120 for driving the first link arm 54 and the operation arm 58 so as to turn the eject arm 52 in the direction of the arrow $b_2$ in FIG. 19, and the optical disk 2 is clamped by the urging force in the ejecting direction by the eject arm 52 and by the force to act in the opposite direction so that it can be prevented from being broken.

The first link arm 54, as turnably engaging with the turning support member 71 of the eject arm 52, is so operated by the later-described operation arm 58 as to turn the eject arm 52 in the direction of arrow $b_1$ or in the direction of arrow $b_2$ in FIG. 12, or in the direction to insert or extract the optical disk 2. The first link arm 54 is made of a sheet metal having a generally rectangular shape. The first link arm 54 has its one longitudinal end turnably engaging with the engaging hole 80 of the turning support member 71, and its other longitudinal end turnably engaging with the second link arm 55. To the longitudinally intermediate portion of the first link arm 54, there are attached the other end of an urging coil spring 93, the other end 58b of the operation arm 58, and one end of the tensile coil spring 56 extended between the first link arm and the second link arm 55.

The urging coil spring 93 has its one end retained on the retaining portion formed on the upper face 6a of the main chassis 6, and its other end attached to the intermediate portion of the first link arm 54. As a result, the biasing coil spring 93 pulls up the first and second link arms 54 and 55 in the direction $p_1$ in FIG. 12, thereby to turn the guide protrusion 113 of the second link arm 55 around the loop cam 57.

The second link arm 55, as turnably engaging with the other end of the first link arm 54, is made of a long sheet, and is equipped at its one end with the guide projection 113, which is projected toward the guide groove 114 of the loop cam 57 and which engages with the guide groove 114 so that it is guided by a loading guide wall 112a and an eject guide wall 112b thereby to control the distance between the first link arm 54 and the second link arm 55. This second link arm 55 is equipped with a spring retaining member 55a at its longitudinally intermediate portion, and retains one end of the tensile coil spring 56 extended between itself and the first link arm 54.

Moreover, the second link arm 5 is equipped with an engaging projection 116 for engaging with a cam groove 108 formed in the later-described operation arm 58. The disk transfer mechanism 50 is enabled, by the engagement of the engaging projection 116 of the second link arm 55 with the cam groove 108, to turn the eject arm 52 in accordance with the movement of the slider 122 so that the optical disk 2 can be stably ejected to the predetermined ejecting position.

When the panel curtain disposed in the disk slot 19 of the front panel 18 is loaded, while the optical disk 2 is being ejected, by the sliding contact with the optical disk 2, the turning support member 71 and the first link arm 54 of the eject arm 52 are urged in the direction $b_1$. If the second link arm and the operation arm 58 are out of engagement, the first link arm 54 turns on the engaging hole 80 in a direction $d_2$ with respect to the turning support member 71, even if the operation arm 58 is moved in the direction $d_2$ as the slider 122 slides in a direction $f_2$, so that it cannot turn the eject arm 52 in the direction $b_2$. Moreover, the second link arm 55 just turns with respect to the first link arm 54.

When the second link arm 55 comes into engagement with the operation arm 58, on the other hand, the engaging projection 116 abuts, as the operation arm 58 slides in the direction $d_2$, against the side wall of the cam groove 108, so that the second link arm 55 cannot freely turn with respect to the first link arm 54. In short, the first link arm 54 is regulated in its turning motion in the direction $d_2$, as a result that the engaging projection 116 of the second link arm 55 comes into abutment against the side wall of the cam groove 108. Even in case the eject arm 52 is urged in the direction $b_1$ while the optical disk 2 is being ejected, the first link arm 54 is moved in the direction $d_2$, if the operation arm 58 is moved in the direction $d_2$, against the urging force in the direction $b_1$ thereby to turn the eject arm 52 in the direction $b_2$. As a result, the eject arm 52 can realizes its turn of the direction $b_2$ according to the slide of the slider 122 in the direction $f_2$, thereby to eject the optical disk 2 reliably to the predetermined ejecting position.

The loop cam 57 for guiding the movement of the guide projection 113 of the second link arm 55 is retained in the retaining hole formed in the upper face 6a of the main chassis 6, as has been described hereinbefore. From the loop cam 57, there is erected a generally annular cam wall 112 toward the side of the bottom case 4. The cam wall 112 surrounds the guide projection 113 of the second link arm 55 from the loading to the ejection of the optical disk 2. The cam wall 112 is equipped with the loading guide wall 112a for sliding the guide projection 113 at the time of loading the optical disk 2, the eject guide wall 112b for sliding the guide projection 113 at the time of ejecting the optical disk 2, and a projection 112c for prevent the guide projection 113 from moving backward between those loading guide wall 112a and eject guide wall 112b. These components are enclosed by an outer peripheral portion 112d to form the guide groove 114, in which the guide projection 113 moves.

The operation arm 58 is connected to the first link arm 54 and the drive mechanism 120, and operates the eject arm 52. The operation arm 58 is made of a long sheet metal and is provided in its longitudinal center with the cam groove 108, into which the engaging projection 116 formed at the second link arm 55 is inserted. Moreover, the operation arm 58 engages, at its one longitudinal end 58a, with a third link arm 94 connected to the slider 122 of the drive mechanism 120, and, at its other end 58b, with the first link arm 54.

The cam groove 108 is formed into such a slot shape that the eject arm 52 is turned according to the sliding action of the slider 122 because it engages with the engaging projection 116 of the second link arm 55, as has been described hereinbefore, so that the engaging projection 116 can move when the second link arm 55 goes around the loop cam 57. Moreover, the cam groove 108 is formed in the direction substantially perpendicular to the directions of arrows $d_1$ and $d_2$ in FIG. 12 or the moving direction of the operation arm 58. As a result, the cam groove 108 is enabled, by the abutment of the cam groove 108 against the engaging projection 116, to regulate the turning motion of the second link arm 55, i.e., the turning motion of the first link arm 54 in the direction $d_2$.

This operation arm 58 is moved, when the slider 122 is slid, through the third link arm 94 generally rightward and leftward or in the directions of the arrows $d_1$ and $d_2$ in FIG. 12, thereby to turn the first link arm 54 and the eject arm 52. Specifically, the operation arm 58 pushes, when moved in the direction of arrow $d_1$ in FIG. 12 by the third link arm 94, pushes the first link arm 54 in the same direction, thereby to turn the eject arm 52 in the direction of arrow $b_1$ in FIG. 12 or in the direction to insert optical disk 2. Moreover, the operation arm 58 moves, when moved in the direction of arrow $d_2$ in FIG. 12 by the third link arm 94, the first link arm 54 in the same direction, thereby to turn the eject arm 52 in the direction of arrow $b_2$ in FIG. 12 or in the ejecting direction of the optical disk 2.

The third link arm 94, as turnably engaging with one end 58a of the operation arm 58, is made of a generally dogleg sheet metal. The link arm 94 is turnably mounted at its folded portion 94a on the main chassis 6, so that it is supported turnably in the directions of arrow $c_1$ and arrow $c_2$ in FIG. 12. An engaging projection 109, as formed at one end 94b extended from the folded portion 94a, engages with the slider 122, and the other end 94c turnably engages with the operation arm 58. As a result, the third link arm 94 is turned, when the slider 122 is transferred in the direction of arrow $f_1$ in FIG. 12 by the driving force of the drive motor 121 of the drive mechanism 120, in the direction of arrow $c_1$ in FIG. 12 while being guided by a first guide groove 125, thereby to move the operation arm 58 in the direction of arrow $d_1$ in FIG. 12. Moreover, the third link arm 94 is turned in the direction of arrow $c_2$, when the slider 122 is transferred in the direction of arrow $f_2$ in FIG. 12, while being guided by the first guide groove 125, thereby to move the operation arm 58 in the direction of arrow $d_2$ in FIG. 12.

Here, the left and right guide walls 96 and 97, as arranged on the two left and right sides of the disk transfer area, guide the centering while being slid by the side face portion of the optical disk 2, and are made of a synthetic resin or the like softer than the optical disk 2. The right guide wall 97 is arranged over the deck portion 4a, and the left guide wall 96 is arranged over the main chassis 6, so that both are fixed screws or adhesive tapes.

From these left and right guide walls 96 and 97, there are erected side walls 96a and 97a having an arcuate shape according to the shape of the optical disk 2. These side walls 96a and 97a are disposed at positions spaced by a predetermined clearance from the side face of the optical disk 2 transferred to the centering position, so that they do not contact with the rotating drive of the optical disk 2. Of these, the side wall 96a formed in the left guide wall 96 is a centering guide member 99, in which the leading end on the side opposed to the disk slot 19 is made rockable through a hinge portion 98 inside and outside of the disk transfer area. This centering guide member 99 is warped by a leaf spring 95 (as referred to FIG. 6) toward the side of the disk transfer area so that it can abut against the side face of optical disk 2. As a result, the optical disk 2 is urged in the centering direction by the centering guide member 99. Moreover, the centering guide member 99 is pushed, when the optical disk 2 is inserted deeply of the casing so that the eject arm 52 is turned in the direction $b_1$, onto the push member 90 formed in the push arm 72, so that the centering guide member 99 is retracted from the disk transfer area and held during the recording/playing operation at a position apart from the side face of the optical disk 2.

Figure 23:
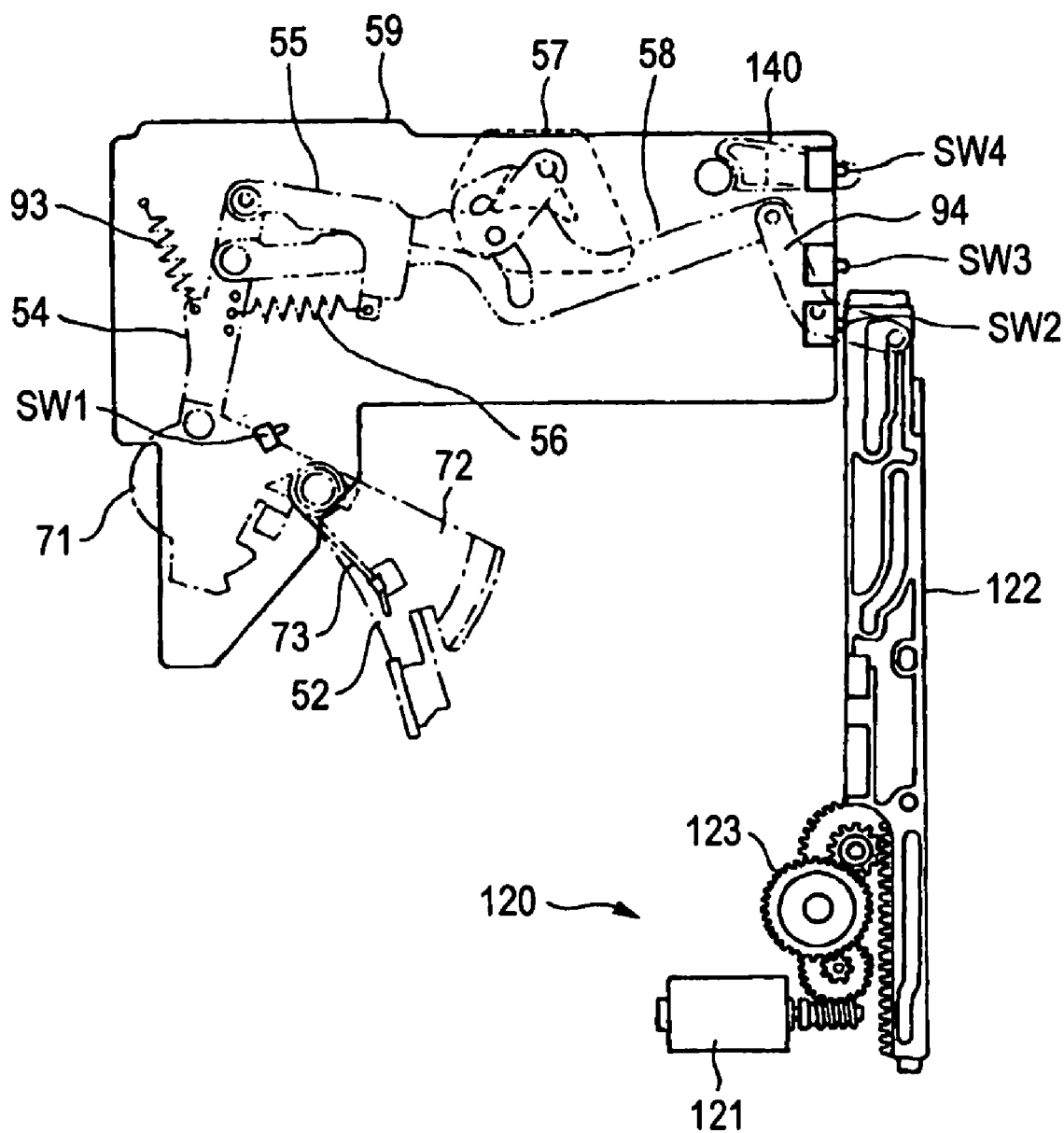
FIG. 23 is a top plan view showing a circuit board, on which first to fourth switches are mounted, and the slider for pushing the switches.

Here are described the inserting operation to the ejecting operation of the optical disk 2 by the disk transfer mechanism 50 thus constituted. The transfer state of the optical disk 2 is monitored by detecting the pushing states of the first to fourth switches SW1 to SW4 mounted in the circuit board 59. The first switch SW1 is arranged in the turning area of the turning support member 71 of the eject arm 52, as shown in FIG. 23, and is changed in H/L when depressed onto the turning support member 71 as the eject arm 52 turns. As shown in FIG. 23, moreover, the second to fourth switches SW2 to SW4 are arrayed in the moving area of the slider 122 so that they are sequentially changed in H/L as the slider 122 is slid in the direction $f_1$ or the direction $f_2$.

Monitoring the depressed states or periods of the first to fourth switches SW1 to SW4 by means of a microcomputer, moreover, the disk drive device 1 detects the transfer state of the optical disk 2 and drives the drive motor 121, the spindle motor 24a, the displacement drive mechanism 36, the optical pickup 25 or the like. According to the timing charts shown in FIGS. 24 and 25, more specifically, the disk drive device 1 detects the transfer state of the optical disk 2 and the output timings of the various motors and so on.

Before the insertion of the optical disk 2, as shown in FIG. 12, the slider 122 is slid in the direction of arrow $f_2$, as located on the side of the disk slot 19. In the loading arm 51, therefore, the engaging projection 64 is retained on the projection 69 of the loading cam plate 53, and the abutting portion 61 is rotationally held at the position which is retracted from the transfer area of the optical disk 2. Moreover, the third link arm 94 engaging with the slider 122 is turned in the direction of arrow $c_2$ in FIG. 12 so that the eject arm 52 having been turned to the operation arm 58 and the first link arm 54 is rotationally biased in the direction of arrow $b_2$ in FIG. 12. Moreover, the sub slider 151 is slid in the direction of allow $h_2$ in FIG. 12, as the slider 122 is slid in the direction $f_2$, so that the sub chassis 29 constituting the base unit 22 is lowered to the side of the bottom case 4 and retracted from the transfer area of the optical disk 2.

Figure 13:
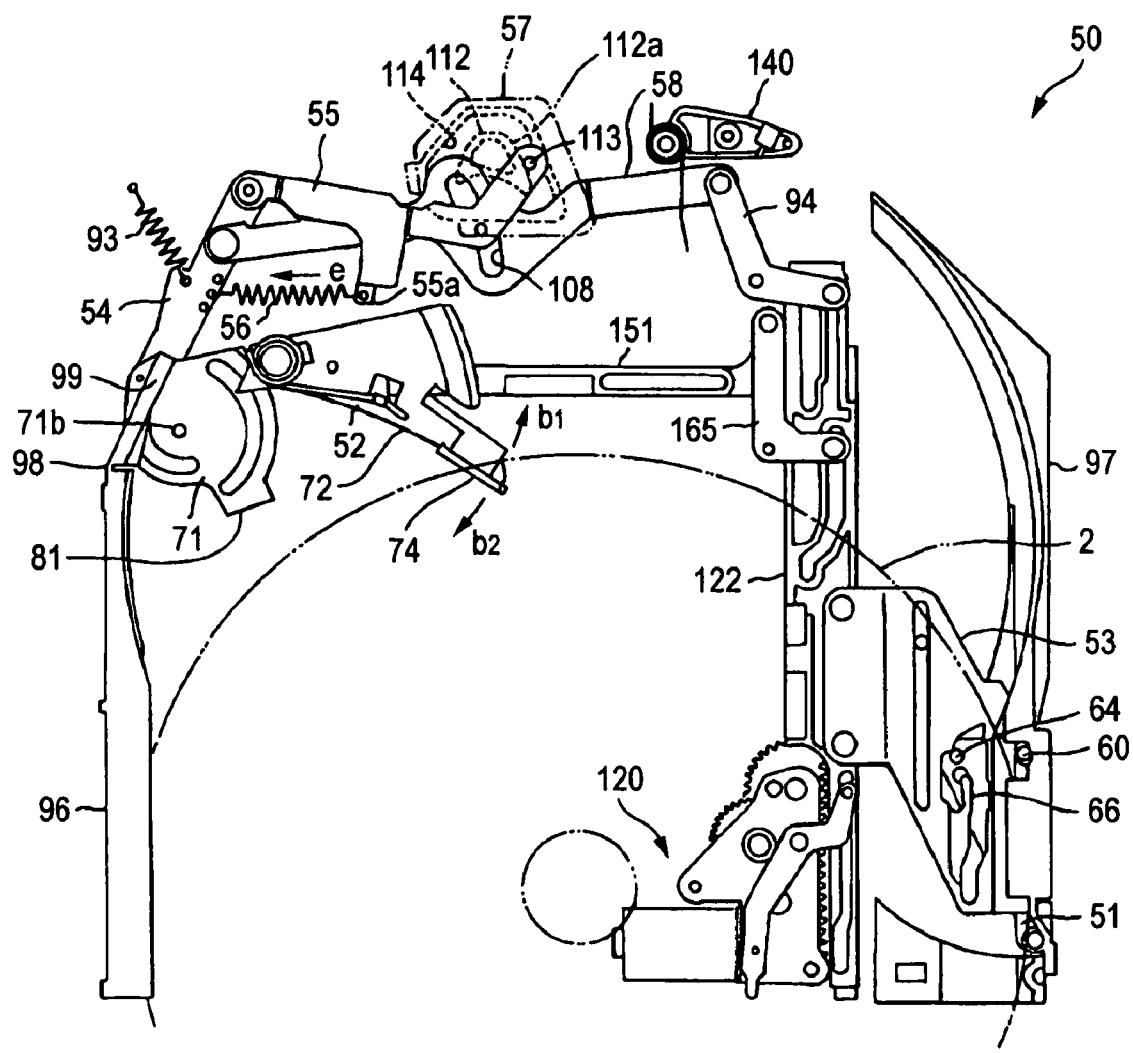
FIG. 13 is a diagram showing an insert step of the optical disk and a top plan view showing the state, in which an eject arm is turned by the optical disk.
Figure 14:
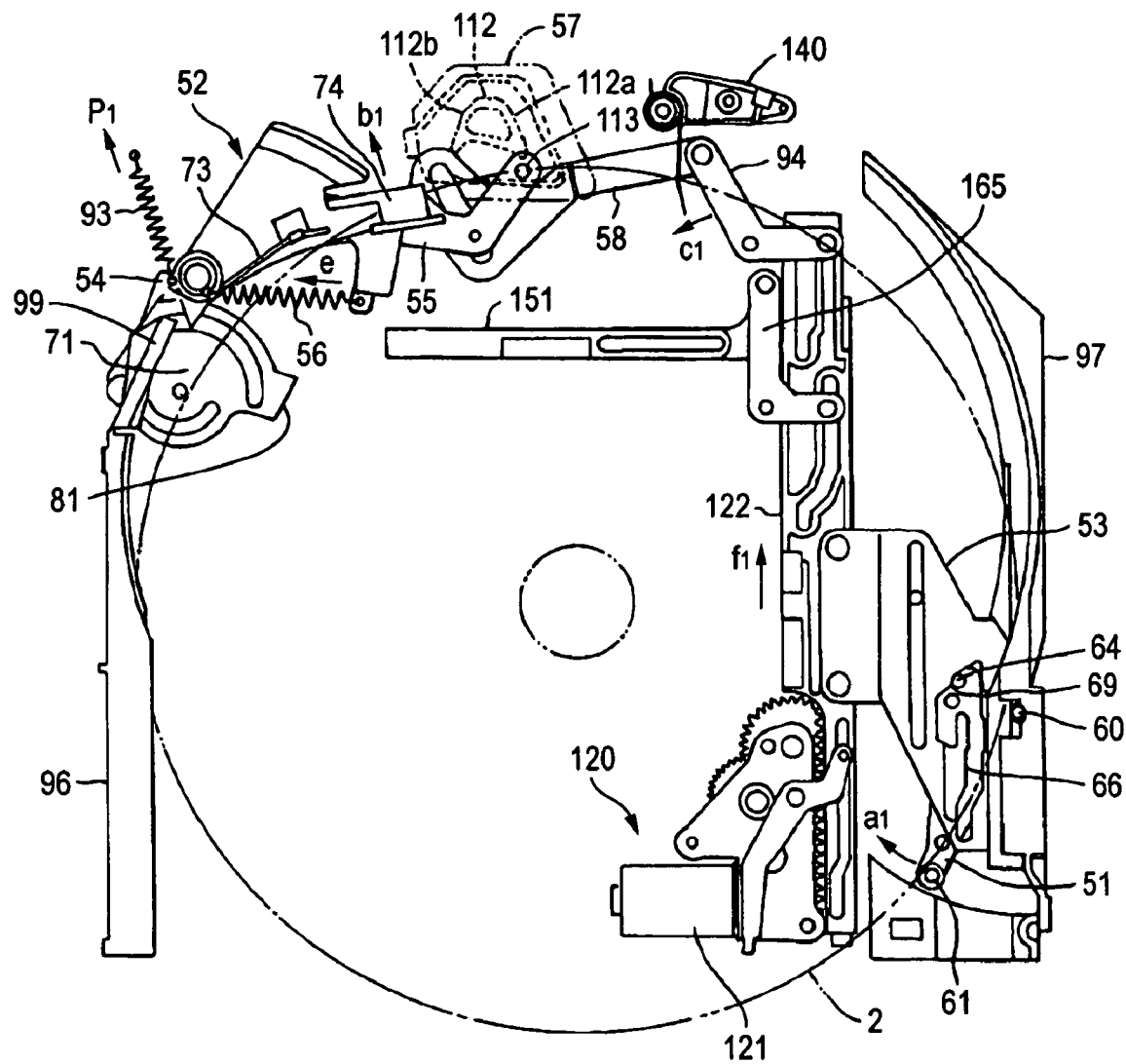
FIG. 14 is a diagram showing an insert step of the optical disk and a top plan view showing the state, in which the eject arm and a loading arm are driven by a slider.

When the optical disk 2 is inserted by the user into the disk slot 19, the abutting portion 61 of the eject arm 52 pushes the inserted end face of the optical disk 2 so that the eject arm 52 is turned, as shown in FIG. 13, in the direction of arrow $b_1$ in FIG. 13. At this time, the turning support member 71 is turned on the mounting port 71b in the direction $b_1$, so that the first link arm 54 engaging with the turning support member 71 is also moved at its one end side to the side of the left guide wall 96. In the second link arm 55 engaging with the first link arm 54, on the other hand, the engaging projection 113 engaging with the guide groove 114 of the loop cam 57 is moved along the loading guide wall 112a. The loading guide wall 112a of the loop cam 57 is extended toward the right guide wall 97, so that the second link arm 55 is guided to leave the first link arm 54 by the loading guide wall 112a. Therefore, the first link arm 54 and the second link arm 55 are so extended by the tensile coil spring 56 inbetween that they are urged to approach each other. In the second link arm 55, the engaging projection 113 abuts against the loading guide wall 112a so that the force to the spring retaining portion 55a of the second link arm 55, i.e., the urging force backward of the turning direction of the turning support member 71 acts on the first link arm 54. As a result, the eject arm 52 is urged in the ejecting direction of the optical disk 2 or in the direction of arrow $b_2$ in FIG. 13.

As a result, the optical disk 2 is inserted against the urging force acting on the eject arm 52 in the ejecting direction. Even in case the insertion of the optical disk 2 is quit midway by the user, the optical disk 2 is ejected to the outside of the casing 3 so that it can be prevented from being left incomplete in the casing 3.

When the optical disk 2 is inserted against such urging force by the user so that the eject arm 52 is turned to a predetermined angle, the first switch SW1 arranged in the circuit board 59 is pushed by the folded member 81 of the turning support member 71 so that the drive mechanism 120 is started. At this time, the depressed states of the first to fourth switches SW1 to SW4 are LHHH in the sequential order and are detected by the microcomputer of the disk drive device 1 (that is, the depressed state is designated by L, and the undepressed state is designated by H). In the drive mechanism 120, the slider 122 is slid in the direction of the arrow $f_1$ in FIG. 14, in response to the driving force of the drive motor 121. As a result, not only the slider 122 but also the loading cam plate 53 is slid in the same direction. Therefore, the loading arm 51, as regulated in its turning motion by the first cam groove, is urged to turn in the direction of arrow $a_1$ in FIG. 14 by the coil spring 62 so that the abutting portion 61 abuts against the back side face of the optical disk 2 thereby to load the optical disk 2.

When the eject arm 52 is turned to the starting position of the drive mechanism 120, the turning projection 113 of the second link arm 55 moves from the loading guide wall 112a of the loop cam 57 to the eject guide wall 112b so that the first link arm 54 and the second link arm 55 approach to shrink the coil spring 56. As a result, the urging force acting on the eject arm 52 in the direction $b_2$ does not act. Since the first link arm 54 is urged in the direction $p_1$ by the third link arm 93, and the second link arm 55 is also moved in the same direction, so that the engaging projection 113 is moved from the loading guide wall 112a to the eject guide wall 112b and is positioned near the projecting portion 112c.

Figure 15:
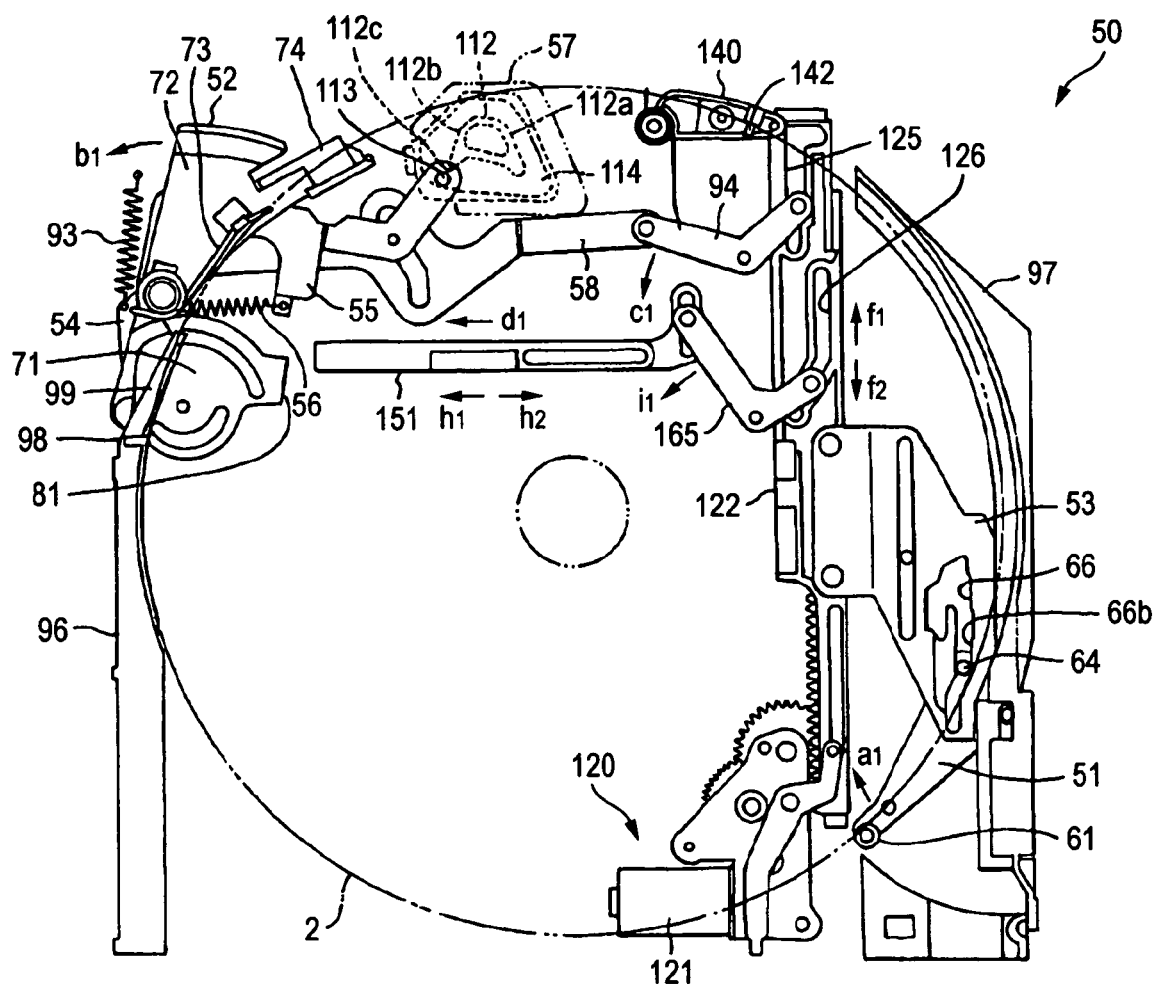
FIG. 15 is a diagram showing the insert step of the optical disk and a top plan view showing the state, in which the optical disk has been transferred to a centering position.

As the slider 122 slides in the direction $f_1$, the engaging projection 64 moves the first cam groove 66 of the loading cam plate 53 from the first guide portion 66a to the second guide portion 66b, as shown in FIG. 15, and the loading arm 51 is accordingly turned in the direction of arrow $a_1$ in FIG.

15, so that the optical disk 2 is transferred onto the disk holding unit 23. At this time, it is detected that the first to fourth switches SW1 to SW4 have the depressed states sequentially in LHLH. Thus, it is found that the base unit 22 has dropped to the chucking release position, and the optical disk 2 can be safely transferred.

Here, the optical disk 2 is centered on the disk holding unit 23 by loading it on the loading arm 51, by guiding it by the left and right guide walls 96 and 97 and by causing it to abut against the later-described stop lever 140.

Moreover, the third link arm 94 is turned in the direction of arrow $c_1$ in FIG. 15 while being guided by the first guide groove 125 of the slider 122 so that the operation arm 58 engaging with the third link arm 94 moves in the direction of arrow $d_1$ in FIG. 15. Therefore, the first link arm 54, as engaging with the other end 58b of the operation arm 58, is pushed by the operation arm 58 and moved to the side of the left guide wall 96. On the other hand, the first link arm 54 is moved by the operation arm 58, and the turning support member 71 is turned in the direction of arrow $b_1$ in FIG. 15, so that the push arm 72 is turned in the same direction. At this time, the push member 90, as formed on the push arm 72, pushes the centering guide member 99 of the left guide wall 96, as extending to over the disk transfer area, is pushed away from the side face of the optical disk 2.

When an engaging arm 165 engaging with the slider 122 is turned, the sub slider 151 is slid in the direction of arrow $h_1$ in FIG. 15, so that the base unit 22 is raised to the chucking position. As a result, the optical disk 2 having been transferred to the centering position is chucked by the turntable 23a such that it is clamped therearound by the turntable 23a and the abutting protrusion 8 formed around the opening 7 of the top plate portion 5a.

At this time, it is detected that the first to fourth switches SW1 to SW4 have the depressed states sequentially in LLHH. Thus, it is found that the base unit 22 has risen to the chucking position, and that the optical disk 2 has been chucked by the turntable 23a. At the loading step of the optical disk 2 of the disk drive device 1, the so-called "double chucking" (as referred to FIG. 24), in which the base unit 22 is raised again to the chucking position, after the optical disk 2 was chucked on the turntable 23a, by driving the spindle motor 24a to give the optical disk 2 one half turn and by turning the drive motor 121 backward. This makes it possible to prevent the situation, in which the optical disk 2 is recorded or played while incompletely engaging with the turntable 23a.

Figure 16:
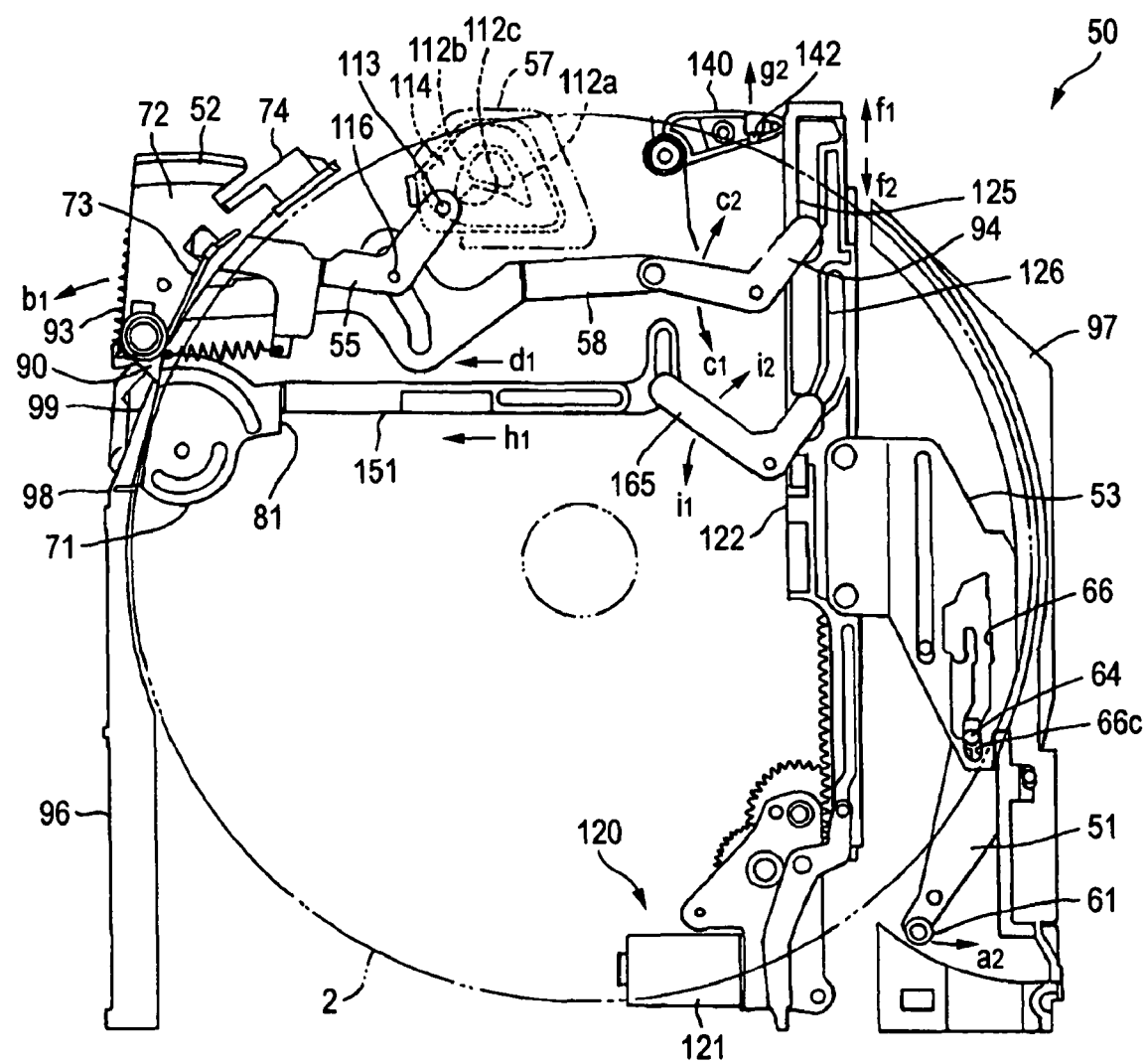
FIG. 16 is a diagram showing the insert step of the optical disk and a top plan view showing the state, in which the optical disk has been released from individual arms so that it can be freely turned.

When the slider 122 is slid in the direction $f_1$, the loading arm 51 is turned in the direction of arrow $a_2$ in FIG. 16, because the engaging projection 64 moves from the second guide portion 66b of the loading cam plate 53 to the third guide portion 66c, so that the abutting portion 61 is brought away from the side face of the optical disk 2.

When the slider 122 moves in the direction $f_1$ so that the sub slider 151 further slides in the direction $h_1$, the base unit 22 is moved down from the chucking position to the record/play position, so that the recording/playing operation by the user is awaited. Moreover, the sub slider 151 abuts at its leading end portion against the folded member 81 of the turning support member 71. As a result, the turning support member 71 is further turned, while extending the urging coil spring 93, in the direction of arrow $b_1$ in FIG. 16, so that the abutting member 74 of the eject arm 52 and the optical disk 2 centered are brought away from each other. Moreover, the first link arm 54 is moved together with the turning support member 71 and is urged in the direction $p_1$ by the urging coil spring 93. In the second link arm 55 engaging with the first link arm 54, therefore, the guide projection 113 rides over the projecting portion 112c for preventing the backward movement to the side of the loading guide wall 112a and moves to the eject guide wall 112b.

As shown in FIG. 16, moreover, the slider 122 pushes the stop lever 140 for centering the optical disk 2, thereby to move the same from the side face of the optical disk 2. As a result, the optical disk 2 leaves the loading arm 51 for the centering, the eject arm 52, the stop lever 140 and the centering guide member 99 of the left guide wall 96, so that it is held in a free state by the turntable 23a and can be driven by the disk rotating drive mechanism 24.

It is detected that the first to fourth switches SW1 to SW4 have the depressed states sequentially in LLLH. Thus, it is found that the base unit 22 has lowered to the record/play position, and that the optical disk 2 can be rotationally driven.

Figure 17:
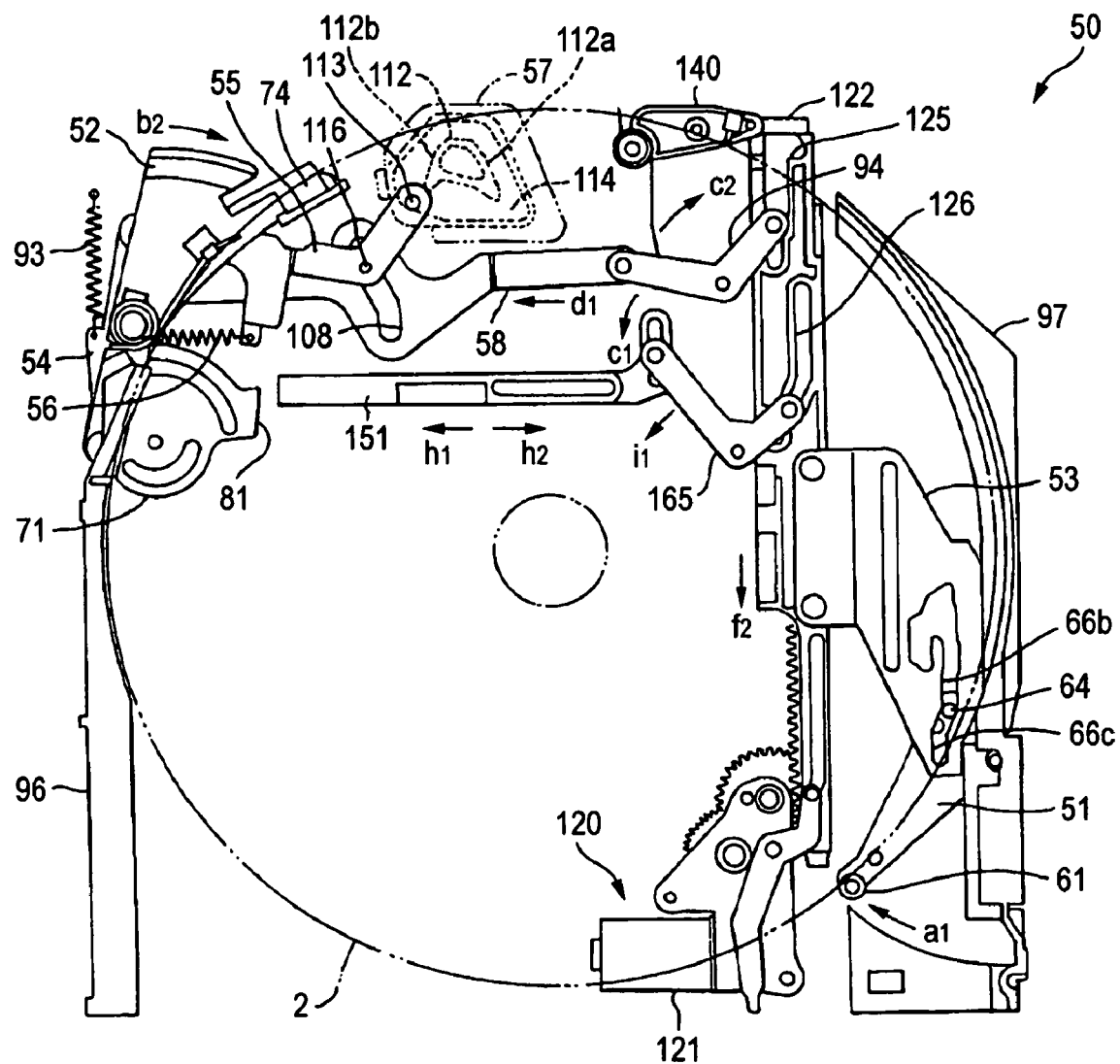
FIG. 17 is a diagram showing an ejecting step of the optical disk and a top plan view showing the state, in which the optical disk is brought into abutment against the individual arms.

When the recording/playing operation is ended so that the ejection of the optical disk 2 is performed by the user, the drive motor 121 of the drive mechanism 120 is at first reversed, and the slider 122 is slid in the direction of arrow $f_2$ in FIG. 17. As a result, the engaging projection 64 moves from the third guide portion 66c to the second guide portion 66b of loading cam plate 53, so that the loading arm 51 is turned in the direction of arrow $a_1$ in FIG. 17, thereby to bring the abutting portion 61 into abutment against the side face of the optical disk 2.

On the other hand, the sub slider 151 is slid in the direction of arrow $h_2$ in FIG. 17, and the pressure on the turning support member 71 is released. As a result, the eject arm 52 is turned in the direction of arrow $b_2$ in FIG. 17 by the urging force of the urging coil spring 93 thereby to bring the abutting member 74 into abutment the side face of the optical disk 2. In the eject arm 52, the first link arm 54, as engaging with the turning support member 71, is moved in the direction $d_1$ by the operation arm 58. Since the urging coil spring 93 is shrunken, the turning motion is only to abut against the optical disk 2 without any force to eject the optical disk 2.

Next, when the slider 122 is slid in the direction $f_2$, the sub slider 151 is slid in the direction of arrow $h_2$ in FIG. 18, thereby to lower the base unit 22. As a result, the optical disk 2 is pushed up by a guide pin 180 erected from the bottom case 4 thereby to release the chucking of the turntable 23a. This guide pin 180 for releasing the chucking of the optical disk 2 is described hereinafter.

When it is detected that the first to fourth switches SW1 to SW4 have the depressed states sequentially in LHLH, it is found that the base unit 22 has lowered to the chucking release position, and that the optical disk 2 can be safely ejected.

After this, the third link arm 94, as engaging with the slider 122, slides in the first guide groove 125 of the slider 122 so that it is turned in the direction of arrow $c_2$ in FIG. 18. Then, the operation arm 58 is moved in the direction of arrow $d_2$ in FIG. 18. When the first link arm 54 is moved in the direction of arrow $d_2$ as the operation arm 58 moves in the same direction, as shown in FIG. 18 and FIG. 19, the eject arm 52 is turned in the direction of arrow $b_2$ in FIG. 18 in accordance with the displacement of the operation arm 58, thereby to eject the optical disk 2.

In the disk transfer mechanism 50, the loading arm 51 is urged by the coil spring 62 to take abutment in the direction of the arrow $a_1$ for urging the optical disk 2 in the inserting direction. The loading arm 51 can be turned according to the slide of the loading cam plate 53 but regulated in the free turning motion, because the engaging projection 64 engages with the first cam groove 66 of the loading cam plate 53. Moreover, the loading cam plate 53 is slid together with the slider 122 in the direction of arrow $f_2$ in FIG. 19, so that the loading arm 51 is accordingly turned in the direction of arrow $a_2$ in FIG. 19 against the urging force of the coil spring 62. As a result, no urging force is applied for blocking the ejection of the optical disk 2. Moreover, the optical disk 2 is ejected while being clamped between the loading arm 51 and the eject arm 52, so that the optical disk 2 can be prevented from abruptly coming out.

When the first link arm 54 is moved in the direction $d_2$ by the operation arm 58, the guide protrusion 113 of the second link arm 55 slides on the eject guide wall 112b of the loop cam 57. At this time, the first link arm 54 and the second link arm 55 are moved in the same direction by the operation arm 58 so that the tensile coil spring 56 is not extended. At the time of inserting the optical disk 2, more specifically, the moving direction of the first link arm 54 resulting from the turning motion of the eject arm 52 in the direction $b_1$ and the moving direction of the second link arm 55 resulting from the guide of the guide protrusion 113 by the loading guide wall 112a of the loop cam 57 are opposed to each other so that the first link arm 54 and the second link arm 55 leave each other thereby to extend the tensile coil spring 56. Thus, an urging force in the ejecting direction is applied to the eject arm 52. At the time of ejecting the optical disk 2, however, the guide protrusion 113 of the second link arm 54 is guided in the same direction as the moving direction of the first link arm 54 by the eject guide wall 112b, so that the first link arm 54 and the second link arm 55 are moved together without leaving each other. As a result, the tensile coil spring 56 is not extended, and the eject arm 52 is not urged but turned in the ejecting direction by the driving force of the drive mechanism 120.

At this time, in the disk transfer mechanism 50, the optical disk 2 is brought into sliding contact with the panel curtain disposed in the disk slot 19 of the front panel 18, so that the urging force in the direction $b_1$ is relatively applied to the eject arm 52 and the first link arm 54. In this case, the engaging projection 116 of the second link arm is brought into abutment against the side wall of the cam groom 108 of the operation arm 58, so that the turning motion of the first link arm 54 in the direction $d_2$ is regulated. As a result, the first link arm 54 and the eject arm 52 are turned according to the operation arm 58 which is moved in the direction $d_2$ by the extent corresponding to the slide of the slider 122 in the direction $f_2$. As a result, the eject arm 52 can be so turned against the urging force in the direction $b_1$ as to correspond to the sliding operation of the slider 122, so that the optical disk 2 can be stably ejected to the predetermined eject position.

Figure 20:
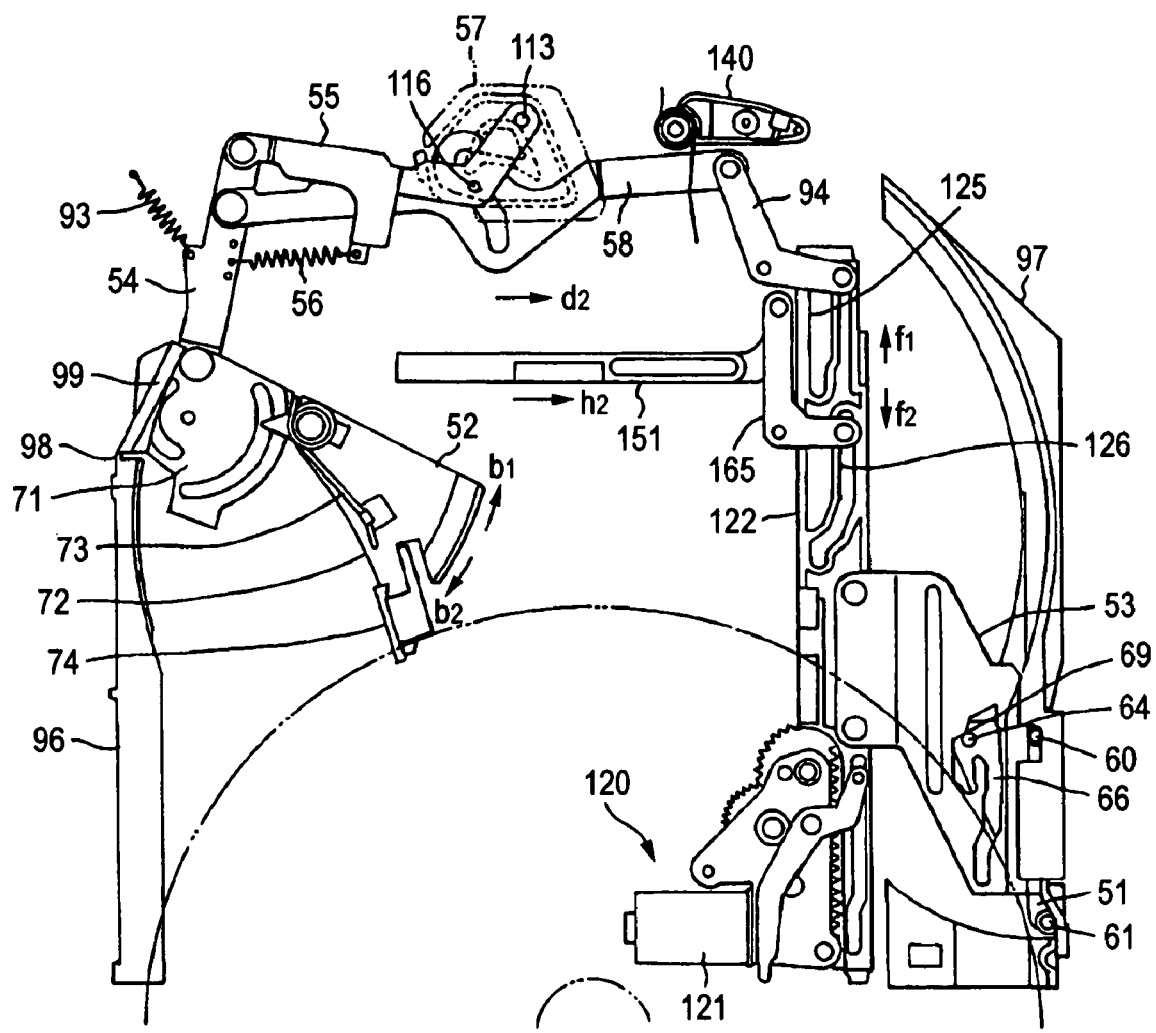
FIG. 20 is a diagram showing the ejecting step of the optical disk and a top plan view showing the state, in which the optical disk has been transferred to and stopped at a predetermined position.

When the slider 122 is moved to the initial position, as shown in FIG. 20, the slide operation is stopped by depressing the detection switch, so that the eject arm 52 is also turned to the initial position by the operation arm 58 and the first link arm 54 thereby to stop the optical disk 2 at the position where the center hole 2a is discharged from the disk slot 19. In the loading arm 51, the engaging projection 64 is retained by the projection 69 formed at the first cam groove 66 of the loading cam plate 53 so that the abutting portion 61 is retracted from the transfer area of the optical disk 2.

At this time, it is detected that the first to fourth switches SW1 to SW4 have the depressed states sequentially in HHHH, and it is found that the optical disk 2 has been transferred by the eject arm 52 to the predetermined eject position, so that the drive of the drive motor 121 is stopped.

Here, the user may notice that the optical disk 2 has been mistaken, after the optical disk 2 was inserted in a predetermined extent but that the drive of the drive motor 121 was started. In this case, the user instantly grips the optical disk 2 and stops the drive motor 121. After this, the user reverses the drive motor 121 to eject the optical disk 2.

Figure 26:
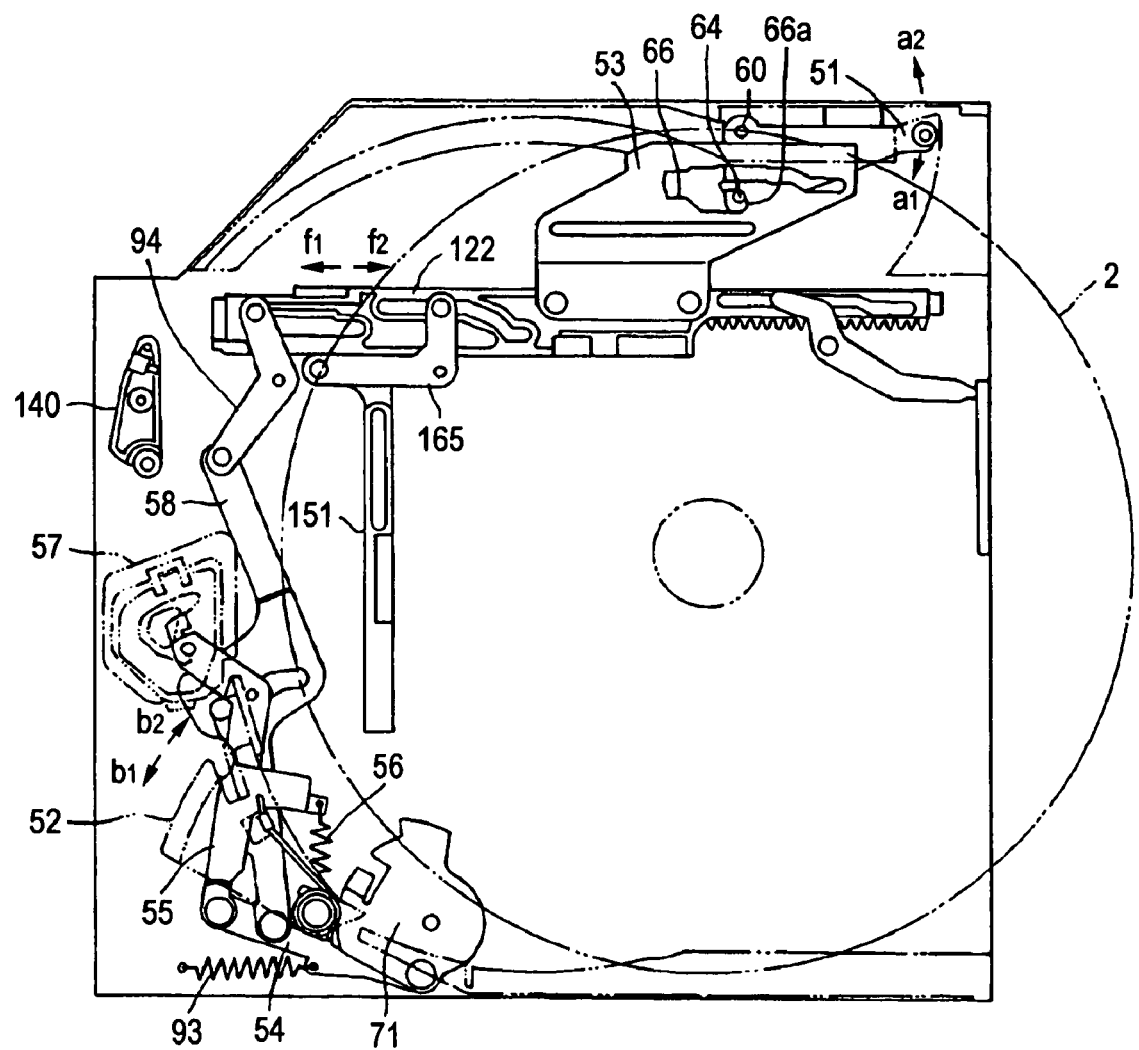
FIG. 26 is a top plan view showing the state, in which the optical disk is gripped at its insert step.

As shown in FIG. 26, more specifically, when the optical disk 2 is inserted a predetermined amount from the disk slot 19, the drive motor 121 is activated. Then, the loading arm 51 is turned in the direction of arrow $a_1$ in FIG. 26 in accordance with the movements of the slider 122 and the loading cam plate 53 in the direction $f_1$. If the optical disk 2 is gripped by the user, the rotation of the loading cam plate 53 is slid together with the slider 122 in the direction $f_1$, so that the engaging projection 64 of the loading arm 51 is retained by the leading end of the first guide portion 66a of the loading cam plate 53. As a result, the slide of the slider 122 in the direction $f_1$ is regulated, and the drive of the drive motor 121 is stopped. When a predetermined time elapses in this state, the drive motor 121 is reversed so that the optical disk 2 is ejected in the procedure reversed from the aforementioned inserting procedure of the optical disk 2.

At this time, the eject arm 52 has been turned a predetermined extent by inserting the optical disk 2 a predetermined extent so that the first and second link arms 54 and 55 are moved away from each other to extend the tensile coil spring 56 inbetween. When the drive motor 121 is reversed to slide the slider 122 fully in the direction $f_2$, the eject arm 52 is turned in the direction of arrow $b_2$ in FIG. 26 as the first link arm 54 having received the biasing force of the tensile coil spring 56 is turned. In the disk drive device 1, therefore, the eject arm 52 is turned by the tensile coil spring 56 in the direction of arrow $b_1$ in FIG. 26, in which the optical disk 2 is ejected to the outside of the disk slot 19. Thus, the optical disk 2 is ejected by the biasing force of the tensile coil spring 56. As a result, the optical disk 2 is gripped at the loading time of the optical disk 2 thereby to stop the drive of the drive motor 121. Thus, it is possible to prevent the situation, in which the optical disk 2 is left while incompletely coming out of the disk slot 19.

Figure 24:
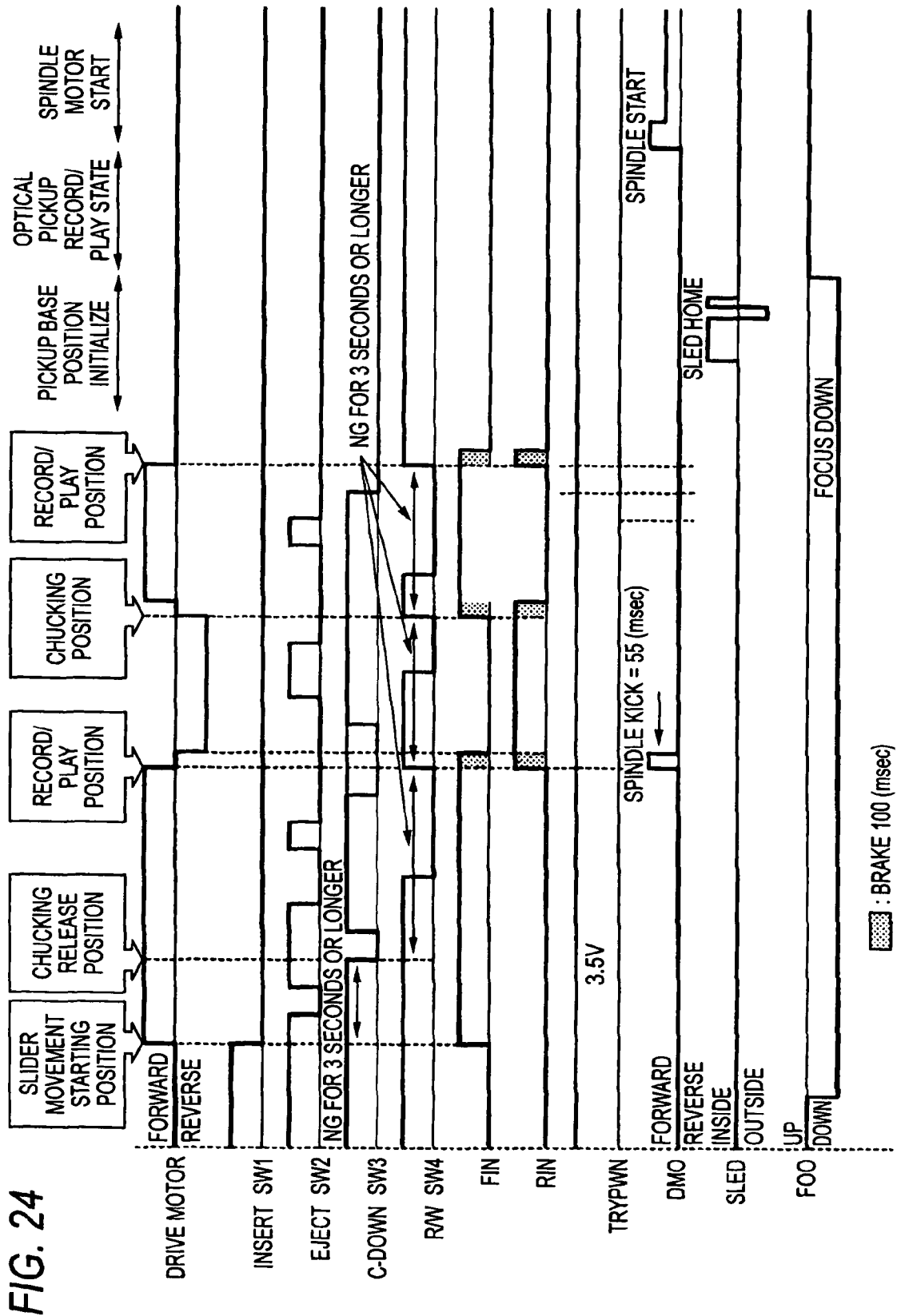
FIG. 24 is a timing chart at the loading time of the optical disk.
Figure 25:
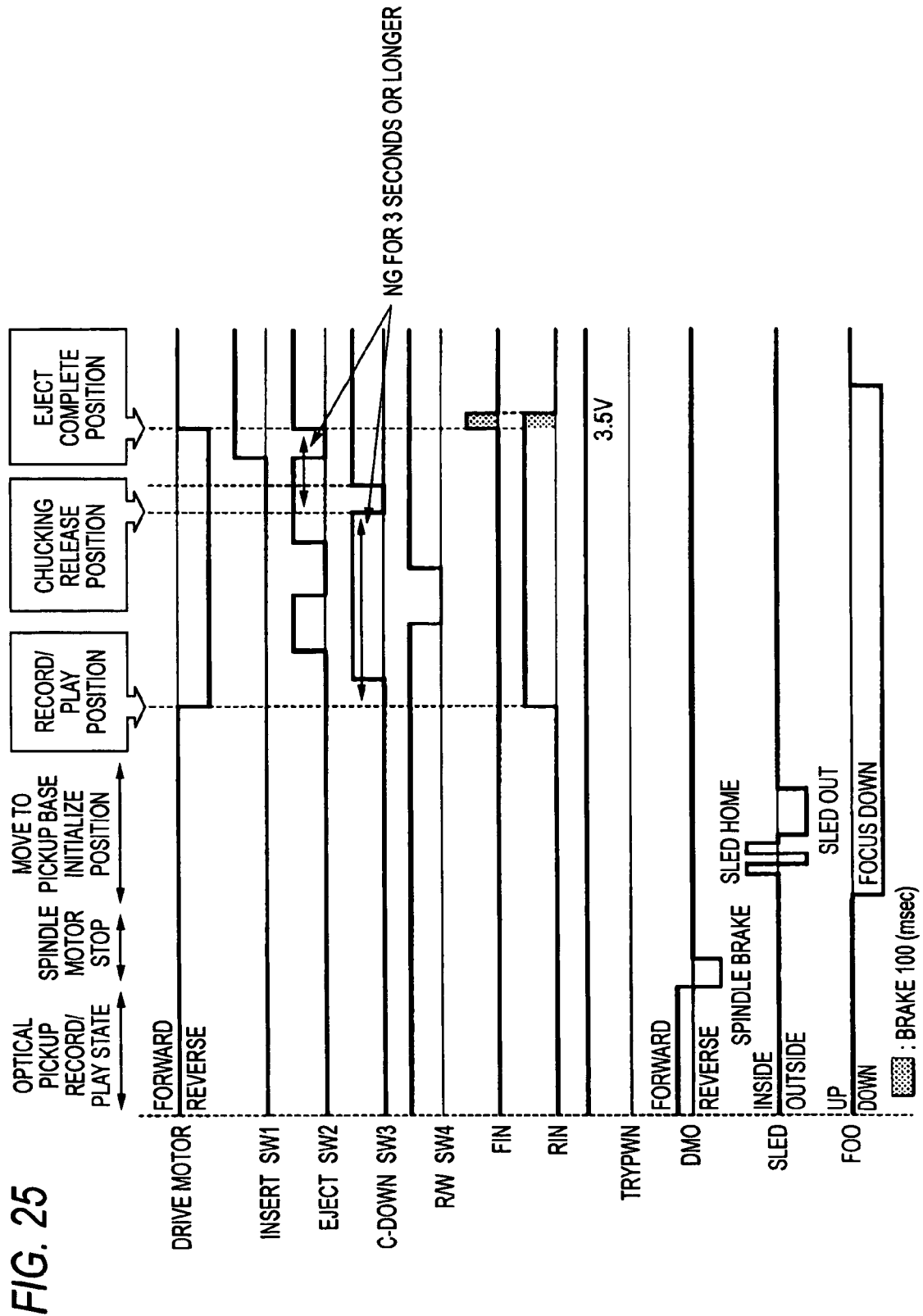
FIG. 25 is a timing chart at the eject time of the optical disk.

Here, these abnormal transfer of the optical disk 2 can be detected such that the microcomputer monitors the depressed states of the first to fourth switches SW1 to SW4 mounted on the circuit board 59. Specifically, as shown in FIG. 24, an abnormal transfer is detected to stop the drive motor 121 or to reverse the drive motor 121 thereby to eject the optical disk 2, in case it takes a predetermined time period such as 3 seconds or longer to detect that the slider 122 moves (LHHH to LHLH) till the base unit 22 is lowered to the chucking release position after the first switch SW1 was depressed by the eject arm 52, or in case it takes a predetermined time or longer that the base unit 22 is moved (LHLH to LLLH) from the chucking release position through the chucking position to the record/play position.

In case an obstruction such as a book is placed in front of the disk slot 19 at the time of ejecting the optical disk 2, the optical disk 2 collides against the obstacle and cannot be ejected so that an excessive load is applied to the drive motor 121 of the drive mechanism 120. Alternatively, the optical disk 2 is clamped between the eject arm 52 turned by the driving force of the drive motor 121 and that obstacle, so that an excessive load is applied to the optical disk 2.

In the disk drive device 1, the turning support member 71 and the push arm 72 of the eject arm 52 engage turnably in the direction $b_1$ on the engaging projection 77 and are urged in the direction $b_2$ by a predetermined force of the coil spring 73. Even if, therefore, an obstacle blocking the ejection of the optical disk 2 is placed at the ejection time of the optical disk 2 so that a force in the direction backward of the ejection direction is applied to the eject arm 52, the push arm 72 receiving that backward force turns in the direction $b_1$ thereby to prevent the situation, in which an excessive load is applied to the drive motor 121 and the optical disk 2.

Figure 27:
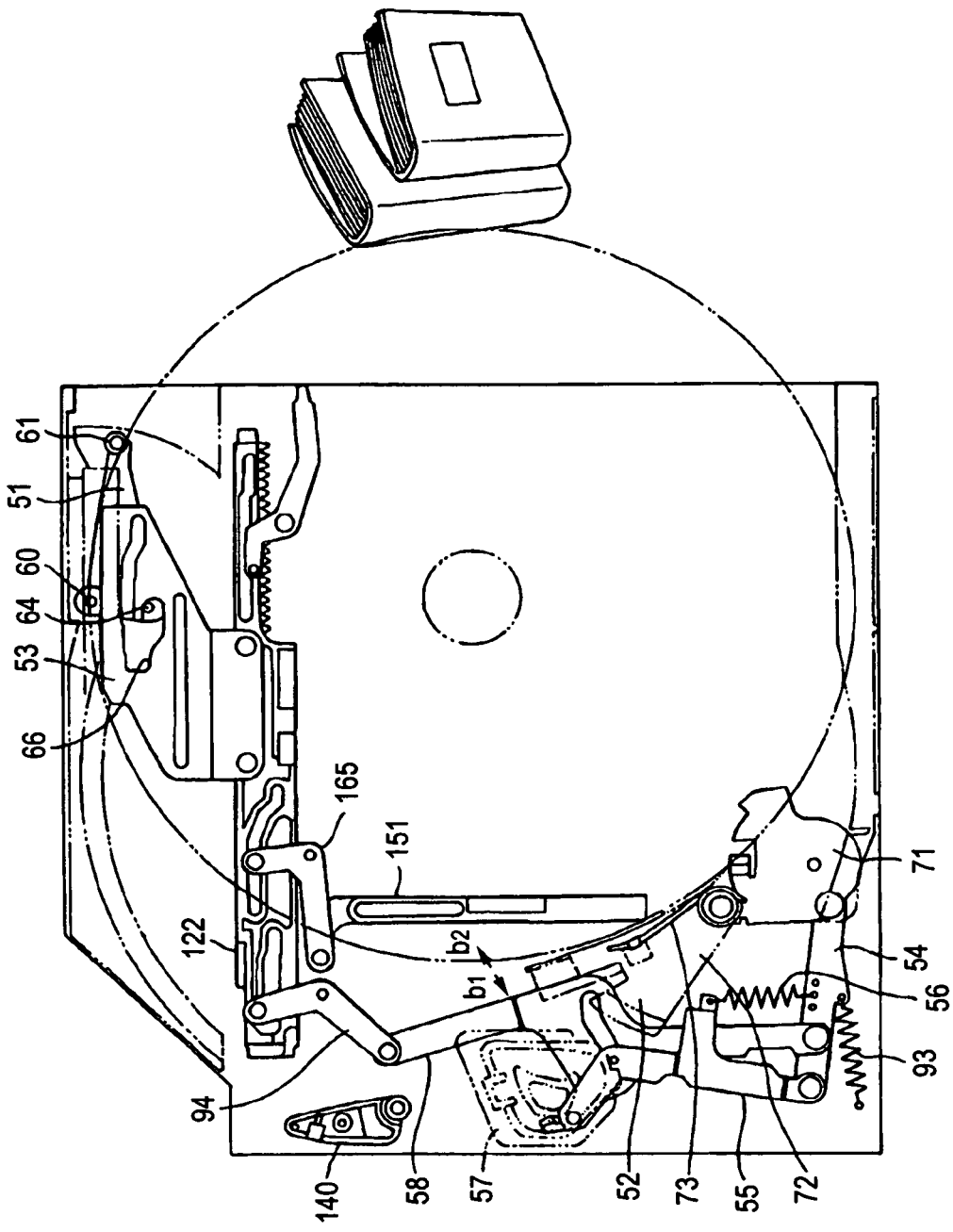
FIG. 27 is a perspective showing the state, in which the transfer is obstructed at the ejecting step of the optical disk by an obstacle on the transfer area of the optical disk.

The disk drive device 1 stops the drive of the drive motor 121 when the push arm 72 of the eject arm 52 is turned in the direction $b_1$. If the obstacle is placed in front of the disk slot 19 to obstruct the ejection of the optical disk 2 for a predetermined time period or longer, the optical disk 2 is pulled again into the loading position. As shown in FIG. 27, specifically, the optical disk 2 is ejected from the disk slot 19 to the outside, and its one side face abuts against the obstacle so that the ejection of the optical disk 2 is stopped for a predetermined time period. Then, the drive motor 121 is reversed to rotate backward. As a result, the aforementioned first and second link arms 54 and 55 and the operation arm 58 are moved backward of the aforementioned direction, thereby to load the optical disk 2. In this case, too, the first and second link arms 54 and 55 are moved without leaving each other so that the tensile coil spring 56 is not extended to exert no urging force in the ejecting direction on the eject arm 52.

As a result, the disk drive device 1 can prevent the optical disk 2 from being left clamped between the eject arm 52 to be turned in the ejecting direction and the obstacle, thereby to prevent an excessive load from being applied to the drive motor 121 and the optical disk 2.

Here, the abnormal transfer of the optical disk 2 can be detected such that the microcomputer monitors the depressed states of the first to fourth switches SW1 to SW4 mounted on the circuit board 59. Specifically, the abnormal transfer is detected to stop the drive motor 121 or to rotate the drive motor 121 forward thereby to load the optical disk 2, in case it takes a predetermined time period such as 3 seconds or longer to detect that the slider 122 moves (LLLH to LHLH) till the base unit 22 is lowered from the record/play position through the chucking position to the chucking release position after the drive motor 121 was reversed by the eject arm 52, or in case it takes a predetermined time or longer that the slider 122 moves (LHLH to HHHH) after the base unit was lowered to the chucking release position and before the first to fourth switches SW1 to SW4 are not depressed.

According to the disk transfer mechanism 50 of the disk drive device 1 according to the embodiment of the invention thus far described, at the time of inserting the optical disk 2, the urging force in the ejecting direction by the tensile coil spring 56 between the first link arm 54 and the second link arm 55 is enabled to act on the eject arm 52 by guiding the first link arm 54 and the second link arm 55 in the direction to leave each other by the loop cam 57. By quitting the insertion of the optical disk 2 by the user, therefore, it is possible to prevent the situation, in which the optical disk 2 is left while being inserted midway into the casing 3.

At the time of ejecting the optical disk 2, on the other hand, the first link arm 54 and the second link arm 55 are moved near each other by the loop cam 57, thereby to eliminate the urging force, as applied to the eject arm 52, in the ejecting direction so that the eject arm 52 is turned according to the operations of the slider 122 and the operation arm 58 having received the driving force of the drive mechanism 120. As a result, the disk transfer mechanism 50 is enabled not by the elastic force but by the driving force of the drive mechanism 120 to eject the optical disk 2 stably to the predetermined stop position, from which the center hole 2a of the optical disk 2 is ejected to the outside of the casing 2.

Moreover, the disk transfer mechanism 50 does not adopt the mechanism which enables to turn the eject lever 52 by the urging force of the tensile coil spring 56 at the time of ejecting the optical disk 2. Thus, the eject lever having received such urging force raises no abutting sound which might otherwise be caused when it abuts against the optical disk 2. As a result, the disk drive device 1 can improve the using feel without any noise at the time of ejecting the optical disk 2.

In the disk drive device 1 according to the embodiment of the invention, moreover, the abutting member 74 of the eject arm 52 may be provided with the stopper 100 for preventing the small-diameter optical disk 101 from being erroneously inserted. Specifically, the disk drive device 1 is designed especially for the large-diameter optical disk 2 (having the diameter of 12 cm, for example). It is, however, imagined that the user may accidentally insert the small-diameter (e.g., 8 cm) optical disk 101. In case the small-diameter disk 101 comes into abutment against the abutting member 74 so that the eject arm 52 is pushed in the direction $b_1$, it is not turned till the position, at which the drive mechanism 120 is driven, so that the small-diameter disk 101 can be ejected by the urging force in the direction $b_2$. In case, on the other hand, the small-diameter disk 101 is inserted without abutting against the abutting member 74 of the eject arm 52, while being offset to the side of the loading arm 51, the disk 101 may be inserted deeply of the casing 3 and left out of the turning area of the eject arm 52.

Figure 28:
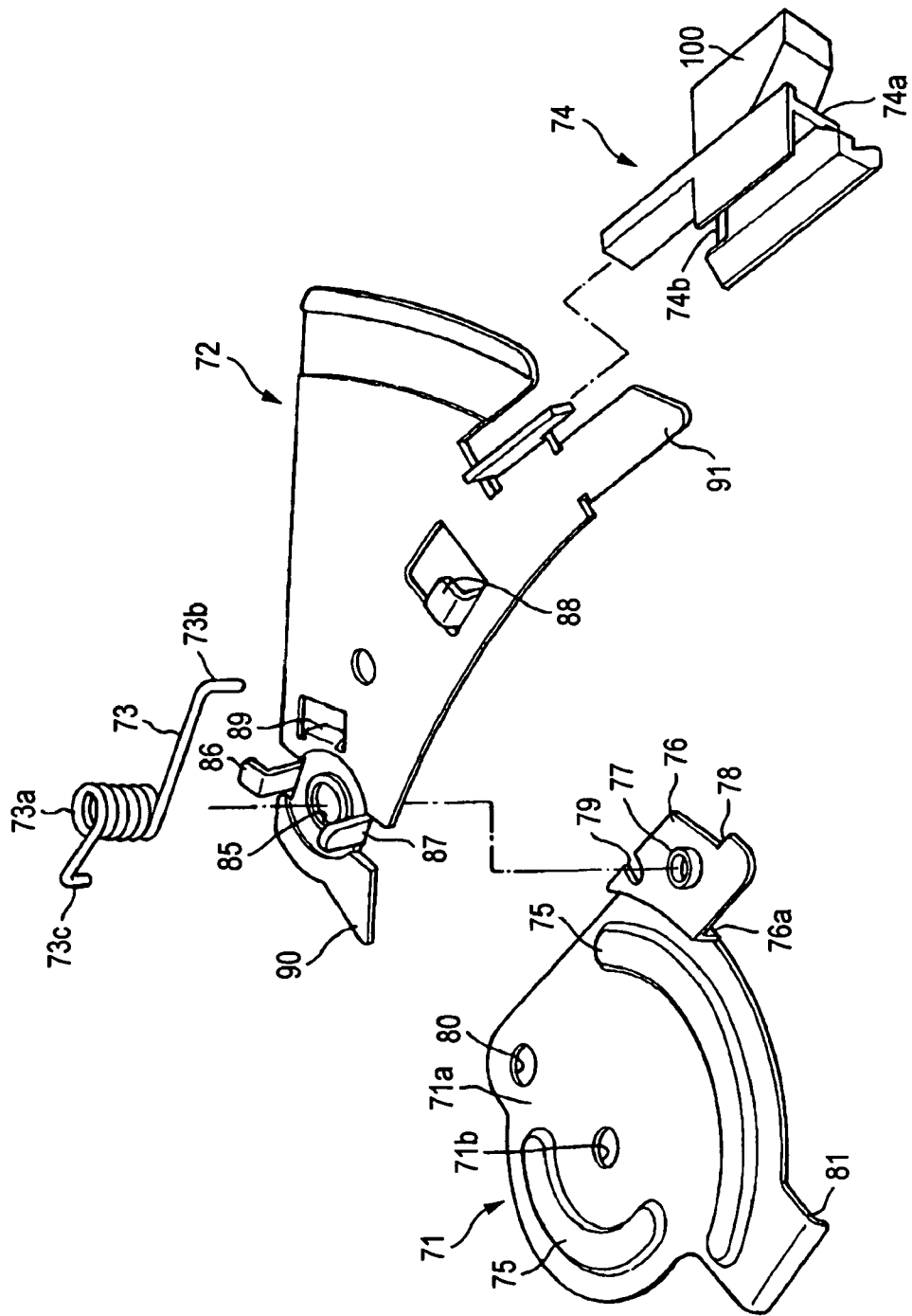
FIG. 28 is a perspective view showing the eject arm having a stopper.

As shown in FIG. 28, therefore, the eject arm 52 is equipped in the abutting member 74 with the stopper 100 for preventing the small-diameter disk 101 from being inserted, so that the small-diameter disk 101 may be prevented, even if inserted with an offset toward the side of the loading arm 51, from being inserted deeply into the casing 3.

This stopper 100 is extended more to the side of the loading arm 51 than the abutting member 74, so that it is enabled to inhibit any farther insertion of the small-diameter disk 101, even if inserted with an offset on the side of the loading arm 51, by a partial abutment.

Figure 29:
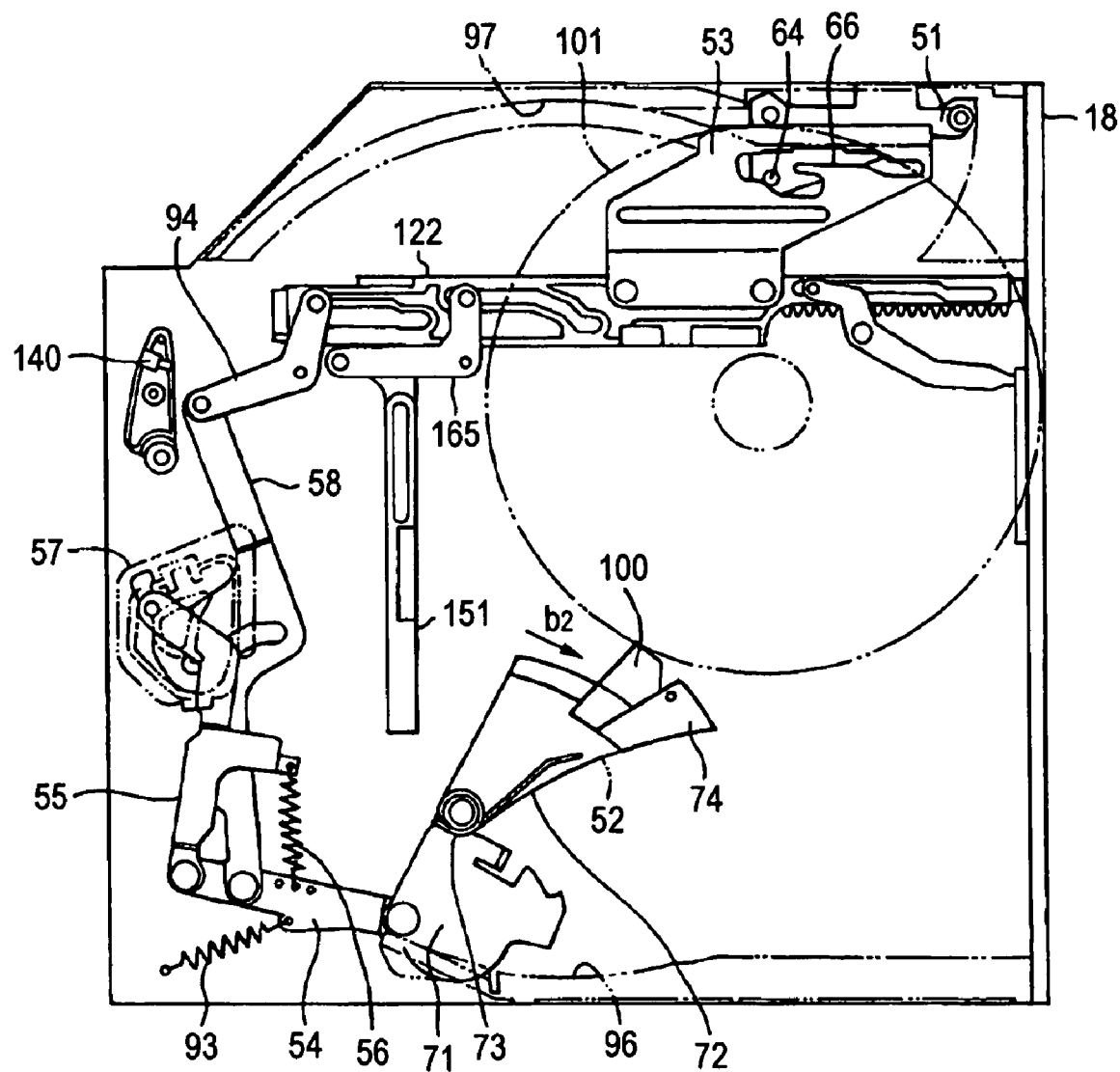
FIG. 29 is a top plan view showing the state, in which an optical disk of a small diameter is prevented from being erroneously inserted.

In the stopper 100, moreover, in the insertion awaiting state of the optical disk 2 where the eject arm 52 is turned in the direction of arrow $b_2$ in FIG. 29, the clearance from the end portion of the disk slot 19 on the side of the loading arm 51 is made shorter than the diameter of the small-diameter disk 101. Therefore, the stopper 100 can prevent the erroneous insertion reliably even in case the small-diameter disk 101 is inserted with an offset to the side of the loading arm 51.

Moreover, the stopper 100 is turned, while the eject arm 52 is awaiting the insertion of the optical disk 2, to the position, at which it abuts against the inserted end face of the small-diameter disk 101 inserted substantially in its entirety from the disk slot 19. In short, the stopper 100 abuts when the small-diameter disk 101 is inserted substantially in its entirety. Therefore, the small-diameter disk 101 comes into abutment, while having its little portion pushed in from the outer side of the disk slot 19, against the stopper 100, and is restricted in its further insertion, so that the user cannot insert the small-diameter disk 101 any more into the casing 3.

Here, this stopper 100 is turned together with the eject arm 52 in the directions $b_1$ and $b_2$ within the disk transfer area. If the eject arm 52 is then formed to have such a length that it does not turn over the disk holding unit 23 of the base unit 22, in which the stopper 100 confronts the disk transfer area, it is possible to prevent the situation, in which the stopper 100 might otherwise rock during the turning motion of the eject arm 52 thereby to collide against the turntable 23a of the disk holding unit 23 or the engaging protrusion 33a.

Figure 30:
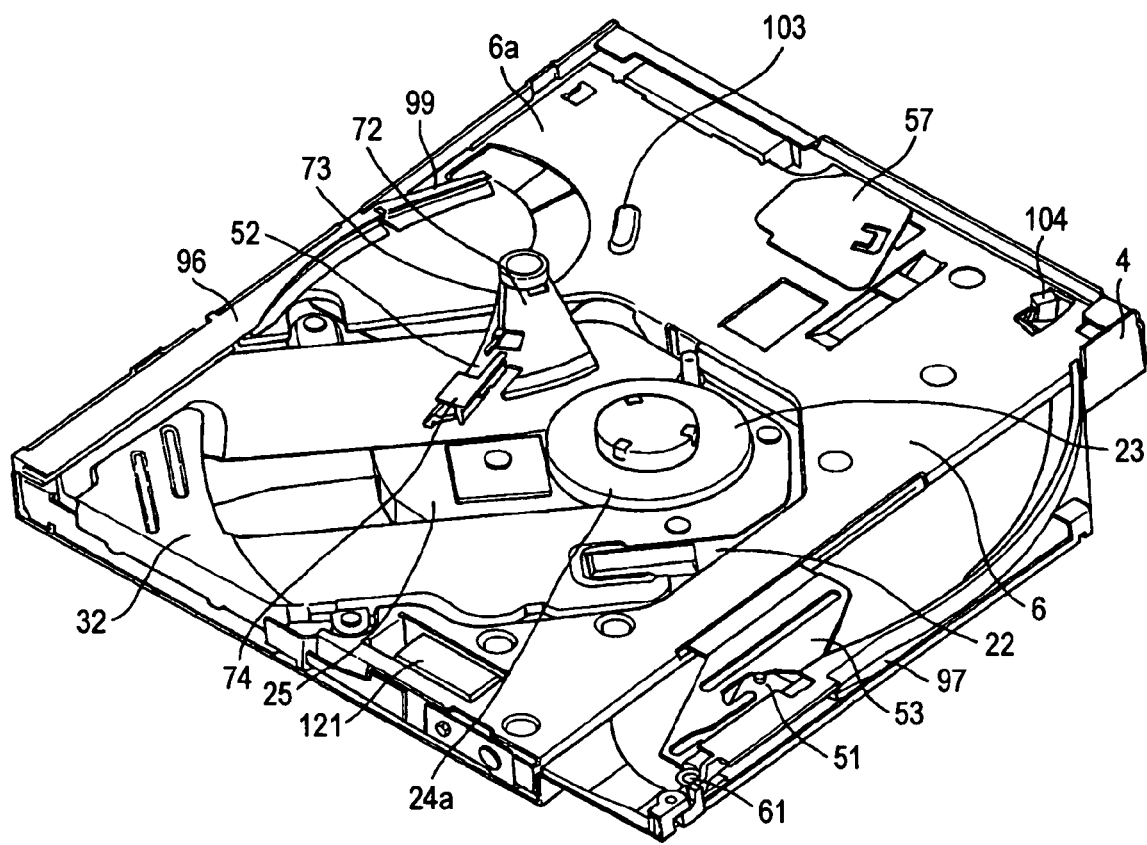
FIG. 30 is a perspective view showing a disk drive device, in which a guide protrusion for guiding the turning motion of the eject arm is disposed on the upper face of the main chassis.

Moreover, as shown in FIG. 30, the disk drive device 1 according to the embodiment of the invention may be equipped, on the upper face 6a of the main chassis 6, with a protrusion 103 for turning motions to avoid the collision against the eject arm 52 and the disk holding unit 23. This protrusion 103 is formed at such a position in the upper face 6a of the main chassis 6 and in the area, where the push arm 72 of the eject arm 52 turns, that the abutting member 74 of the eject arm 52 rides thereon when it passes over or near the disk holding unit 23.

Figure 31A:
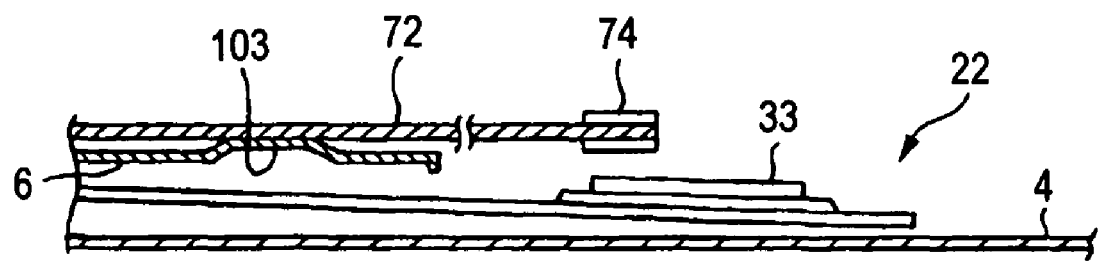
FIGS. 31A and 31B are schematic diagrams showing the turning loci of the eject arm guided by the guide protrusion.

When the optical disk 2 is inserted so that the eject arm 52 is turned in the direction $b_1$, the push arm 72 rides on the protrusion 103 so that the abutting member 74 is raised. As shown in FIG. 31A, therefore, the abutting member 74 and the turning locus of the optical disk 2 supported on the abutting member 74 can rise to avoid the collision against the turn table 23a of the disk holding unit 23 or the engaging projection 33a.

Moreover, the protrusion 103 is formed exclusively at the position where the push arm 72 rises when the abutting member 74 of the eject arm 52 passes over or near the disk holding unit 23. Therefore, the turning locus of the eject arm 52 does not rise except the portion where the protrusion 103 is formed. Unlike the case in which the protrusion is formed on the side of the eject arm 52, it is unnecessary to keep the turning height of the eject arm 52 all over the turning area. In case a downward protrusion is formed on the eject arm 52, the protrusion always rises on the upper face 6a of the main chassis 6, so that the track of the eject arm 52 is always high. In the area other than the main chassis 6, on the other hand, the track of the eject arm 52 has to be so high as to avoid the collision between the downward protrusion and the other components. Therefore, the casing 3 is made so high that the disk drive device cannot be made small and thin. In case the eject arm 52 is rocked by disturbances or the like during the turning motions, there may occur a danger that the protrusion slide or collide against another lower component such as the optical pickup 25.

Figure 31B:
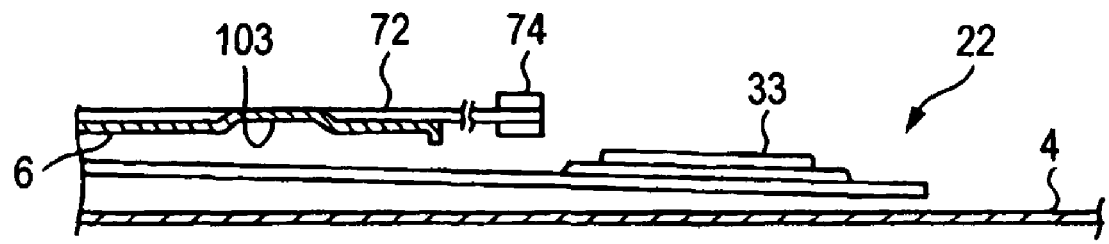

In this respect, the disk drive device 1 according to the embodiment of the invention has the protrusion 103 formed on the upper face 6a of the main chassis 6 so that the track of the eject arm 52 is turned highly only at the portion to rise on the protrusion 103 and lowly in the remaining area. As shown in FIG. 31B, there is no downward protrusion thereby to cause no danger of the collision against another component positioned below the turning area of the eject arm 52. As a result, the casing 3 can be made small and thin.

The drive mechanism 120 for feeding the driving force to the disk transfer mechanism 50 is constituted to include the drive motor 121, the slider 122 for receiving the driving force of the drive motor 121 to slide in the bottom case 4, and a gear train 123 for transmitting the driving force of the drive motor 121 to the slider 122. These components are arranged in the main chassis 6. The drive mechanism 120 drives the disk transfer mechanism 50 and the base lifting mechanism 150 by sliding the slider 122 with the drive motor 121.

When the optical disk 2 is inserted to the predetermined position, the first switch SW1 is pushed by the turning support member 71 of the eject arm 52 so that the drive motor 121 drives the slider 122 forward in the direction $f_1$. In the ejecting operation, on the other hand, the drive motor 121 drives the slider 122 backward in the direction $f_2$. In response to the loading and ejecting operations of the optical disk 2, the slider 122 is moved in the direction $f_1$ or the direction $f_2$ in FIG. 12, thereby to drive the individual arms of the disk transfer mechanism 50 or the base lifting mechanism 150. The gear train 123 transmits the driving force of the drive motor 121 to the slider 122 through a rack unit 131.

The slider 122 is made of a resin member formed generally in a box shape, as shown in FIG. 32A, and is equipped with: the first guide groove 125 formed in an upper face 122a for engaging with the engaging projection 109 formed on the third link arm 94; a second guide groove 126 engaging with the connecting arm 165 for driving the sub slider 151 of the later-described base lifting mechanism 150; the paired engaging recesses 127 and 127 for engaging with the paired engaging projections formed on the loading cam plate 53; and a third guide groove 128 for engaging with one end of an opening/closing arm 191 of the later-described disk insertion regulating mechanism 190.

In the side face 122b of the slider 122 on the side of the base unit 22, moreover, there are formed the first cam slit 130, in which the first pivot pin 47 projecting from the sub chassis 29 to the base unit 22 is inserted, and the rack unit 131 for engaging with the gear train 123. With the first cam slit 130, there is assembled a first guide plate 152 for operating the disk rotating drive mechanism 24 stably while preventing the looseness of the first pivot pin 47 of the sub chassis 29. In the lower face 122c of the slider 122, there is longitudinally formed a slide guide groove 129, the sliding direction of which is guided by the paired guide projections 124 and 124 projected from the bottom case 4 (as referred to FIG. 10).

This slider 122 is arranged in the bottom face portion of the bottom case 4 between one side face of the bottom case 4 and the base unit 22. Moreover, the slider 122 is positioned below the optical disk 2 to be inserted from the disk slot 19 into the inside of the casing 3, and has its upper face slightly lower than the deck portion 4a. Moreover, the slider 122 is covered with the main chassis 6, and is driven to slide back and forth through the drive motor 121 or the gear train 123 disposed on the bottom face portion of the bottom case 4.

In the drive mechanism 120, moreover, in association with the sliding operation of the slider 122, the third link arm 94 and the operation arm 58 engaging with the third link arm 94 are moved to regulate the turning motion of the eject arm 52, and the loading cam plate 53 is moved back and forth to turn the loading arm 51. In response to the slide of the slider 122, therefore, the drive mechanism 120 performs the loading operation to pull the optical disk 2 from the disk slot 19 into the casing 3, and the eject operation to eject the optical disk 2 from the disk holding unit 23 to the outside of the disk slot 19.

Next, the description is made on the stop lever 140 for performing the centering operation to position the loaded optical disk 2 on the disk holding unit 23. The stop lever 140 is provided, as shown in FIG. 6, with: a lever body 141 turnably supported on the main chassis 6; a stopping projection 142 projected from one end of the lever body 141 for stopping the optical disk 2 at the centering position; a supporting projection 143 threaded at the other end side of the lever body 141 by the annular portion of a coil spring 144 for supporting the lever body 141 turnably on the main chassis 6; and a regulating projection 145 inserted in a guide hole 146 formed in the main chassis 6, for regulating the turning motion of the lever body 141 so that the stopping projection 142 may stop at the centering position of the optical disk 2.

The lever body 141 is made of a resin member to have one generally arcuate end portion 141a with the stopping projection 142, and the supporting projection 143 is supported by the main chassis 6 so that the one end portion 141a is arranged to extend into the slide area of the slider 122. As a result, the leading end of the slider 122 and the lever body 141 abut against each other according to the slide operation of the slider 122 so that the slider the stop lever 140 can turn on the supporting projection 143.

The stopping projection 142 is so projected from one end of the lever body 141 as to extend over the upper face 6a of the main chassis 6 from a turning hole 147 formed in the main chassis 6, so that it can abut against the outer circumference of the optical disk 2. The stopping projection 142 performs, when the side face of the inserted end of the optical disk 2 pulled into the loading arm 51, the centering operation to stop the optical disk 2 on the disk holding unit 23. The turning hole 147 for projecting the stopping projection 142 over the main chassis 6 is formed in a generally arcuate shape so that the stopping projection 142 can be retracted from the stop position, at which the optical disk 2 is centered.

The supporting projection 143 is a generally column-shaped member having a threaded hollow portion, and is projected from the other end portion of the lever body 141. This supporting projection 143 is screwed at its hollow portion continuously from the threaded hole formed in the main chassis 6, so that it is rotatably supported by the main chassis 6 in the directions of arrow $g_1$ and arrow $g_2$ in FIG. 12. On the outer circumference of the supporting projection 143, moreover, there is mounted the annular portion of the coil spring 144. This coil spring 144 has its one end retained on the lever body 141 and its other end retained on the circuit board 59 arranged in the bottom case 4, so that the coil spring 144 urges the stop lever 140 to turn on the supporting projection 143 in the direction of arrow $g_1$ in FIG. 12.

The regulating projection 145 regulates the turning area of the lever body 141 urged to turn by the coil spring 144, and is so projected upward from the lever body 141 as to confront the upper face of the main chassis 6 through the guide hole 146 formed in the main chassis 6, as shown in FIG. 3. The guide hole 146 regulates the rotating area of the regulating projection 145, thereby to stop the lever body 141, as urged to turn in the direction $g_1$ by the coil spring 144, at the predetermined position for centering the optical disk 2. Moreover, the guide hole 146 is formed into such an arcuate shape as can retract the lever body 141 from the stop position for centering the optical disk 2.

In this stop lever 140, the lever body 141 is urged by the coil spring 144, and the regulating projection 145 is retained on one end of the guide hole 146 on the side of the arrow $g_1$, so that the stopping projection 142 is rotated to the stop position, at which the stopping projection 142 stops the optical disk 2 at the centering position. Moreover, the stop lever 140 abuts, at its side face on the insertion end of the optical disk 2, when loaded, against the stopping projection 142. As a result, the stop lever 140 positions the optical disk 2 over the disk holding unit 23. After the end of the centering operation, one end 141a of the lever body 141 is pushed onto the leading end of the slider 122 transferred in the direction $f_1$, so that the stop lever 140 is turned in the direction of arrow $g_2$. As a result, the stopping projection 142 is separated from the outer circumference of the optical disk 2 thereby to set the optical disk 2 freely rotatable. When the optical disk 2 is ejected, the slider 122 is slid in the direction $f_2$, and the stopping projection 142 is urged by the coil spring 144 to the stop position, at which the stopping projection 142 stops the optical disk 2 at the centering position, so that the stop lever 140 is prepared for loading the optical disk 2.

Next, here is described the base lifting mechanism 150 for operating to move the base unit 22 upward and downward in response to the aforementioned sliding actions of the slider 122. The base lifting mechanism 150 moves the base unit 22 upward and downward among the chucking position, at which the optical disk 2 positioned at the disk loading position by lifting the base unit 22 is loaded on the turntable 23a of the disk holding unit 23, the chucking release position, at which the optical disk 2 is released from the turntable 23a of the disk holding unit 23 is released by lowering the base unit 22, and the record/play position, at which the signals are recorded in or played from the optical disk 2 by positioning the base unit 22 between the chucking position and the chucking release position.

Specifically, the base lifting mechanism 150 moves the base unit 22 upward and downward such that the first pivot pin 47 and the second pivot pin 48, as formed in the base unit 22, are moved upward and downward by the slider 122 and the sub slider 151 to be slid in response to the sliding operation of the slider 122. In the side face of the slider 122 to confront the base unit 22, as shown in FIG. 32A, there is longitudinally formed the first cam slit 130 for moving the base unit 22 up and down over the aforementioned chucking release position and the aforementioned record/play position. The first cam slit 130 is provided with a lower horizontal face portion 130a corresponding to the chucking release position, an upper horizontal face portion 130b corresponding to the record/play position, and a slope face portion 130c for connecting the lower side horizontal face portion 130a and the upper horizontal face portion 130b. In the first cam slit 130, there is slidably fitted the first pivot pin 47, which is projected from the sub chassis 29 of the base unit 22.

In the first cam slit 130, as shown in FIG. 32A, there is arranged the first guide plate 152, which guides the movement of the first pivot pin 47 and which prevents the chattering of the first pivot pin 47 at the record/play position thereby to operate the disk rotating drive mechanism 24 stably. The first guide plate 152 is made of a leaf spring member, and has its one end retained on a retaining member 153 formed in the upper portion of the first cam slit 130 and its other end retained in a retaining recess 154 formed on the lower side of the first cam slit 130. In the first guide plate 152, moreover, the first pivot pin 47 moves when the base unit 22 is lifted to the chucking position above the contact between the upper horizontal face portion 130b and the slope face portion 130c. In the first guide plate 152, moreover, there is folded a projecting portion 155, which projects to the side of the upper face 122a of the slider 122 when the pivot pin 47 is moved to the upper side horizontal face portion 130b.

On the other hand, the lower side horizontal face portion 130a of the first cam slit 130 is formed to have a slightly larger height than the diameter of the pivot pin 47, and is made slidable. On the other hand, the upper side horizontal face portion 130b is formed to have such a height, from the first guide plate 152, as is equal to or smaller than the diameter of the pivot pin 47. Therefore, the pivot pin 47 is pressed-fitted, when moved to the upper side horizontal face portion 130b, between the first guide plate 152 and the upper side horizontal face portion 130b. As a result, the first guide plate 152 suppresses the vibrations coming from the spindle motor 24a of the disk rotating drive mechanism 24 disposed in the base unit 22, so that it can turn the optical disk 2 stably.

Moreover, the first guide plate 152 clamps the pivot pin 47 between itself and the upper side horizontal face portion 130b, so that the projecting portion 155 projects over the upper face 122a of the slider 122 and is pushed onto the upper face 6a of the main chassis 6. As a result, the slider 122 can be pushed to the side of the bottom case 4 by the first guide plate 152 thereby to suppress the vibrations due to the drive of the base unit 22 or the influences of disturbances.

The sub slider 151 supports the second pivot pin 48 projected from the sub chassis 29 of the base unit 22, and engages with the slider 122. The sub slider 151 is so arranged as to slide in the direction $h_1$ or direction $h_2$ perpendicular to the loading direction of the optical disk 2 in accordance with the slide operation of the slider 122.

As shown in FIG. 32B, the sub slider 151 is made of an elongated flat plate member of a synthetic resin. In the upper face 151a of the sub slider 151, there is longitudinally formed an upper guide groove 158, which engages with a guide projection 157 projected from the main chassis 6. In the sub slider 151, at the position of a lower face 151b offset from the upper guide groove 158, there is longitudinally formed a lower guide groove 160, which engages with a guide protrusion 159 protruded from the bottom case 4 (as referred to FIG. 10). In the sub slider 151, the guide projection 157 projected from the main chassis 6 engages with the upper guide groove 158 and slides in the upper guide groove 158, and the guide protrusion 159 protruded from the bottom chassis 4 engages with the lower guide groove 160 and slides in the lower guide groove 158, so that the sub slider 151 is slid in the direction of arrow $h_1$ or arrow $h_2$, in association with the sliding motion of the slider 122.

In the sub slider 151 and at one longitudinal end portion positioned on the side of the slider 122, there is formed an engaging groove 166, with which the connecting arm 165 to be connected to the slider 122 engages. The engaging groove 166 is formed in the engaging member 167, which is extended in a direction perpendicular to the longitudinal direction of the sub slider 151. In the sub slider 151, moreover, the other end portion on the side opposed to one end portion having the engaging member 167 is an abutting protrusion 168 to be brought into abutment of the turning support member 71 of the eject arm 52 at the loading time of the optical disk 2. The abutting protrusion 168 is brought, when the optical disk 2 is loaded, into abutment against the folded member 81 of the turning support member 71. As a result, the guide protrusion 113 of the second link arm 55, which is connected to the first link arm 54 through the first link arm 54 connected to the turning support member 71, is moved to ride over the projecting portion 112c of the loop cam 57, and the eject arm 54 is turned until the abutting member 74 is released from the side face of the optical disk 2.

This sub slider 151 is equipped, on the side face 151b on the side of the disk slot 19, with not only the first cam slit 130 but also the second cam slit 170, which extends in the longitudinal direction for moving the base unit 22 upward and downward over the aforementioned chucking position, chucking release position and record/play position. The second cam slit 170 is equipped with a lower side horizontal face portion 170a corresponding to the chucking release position, an upper side horizontal face portion 170b corresponding to the record/play position, and a slope face portion 170c for connecting the lower side horizontal face portion 170a and the upper side horizontal face portion 170b. The second pivot pin 48, projected from the sub chassis 29 of the base unit 22, is slidably inserted in that second cam slit 170.

The slope face portion 170c of the second cam slit 170 is formed to a position higher than the position of the upper side horizontal face portion 170b, and is slightly lowered to guide the base unit 22 to the upper side horizontal face portion 170b. In the base unit 22 to be guided by the second cam slit 170, therefore, the sub slider 151 is slid in the direction $h_1$ so that the second pivot pin 48 rises on the slope face portion 170c from the lower side horizontal face portion 170a and moves from the chucking release position to the chucking position. In the base unit 22, the optical disk 2 is chucked by clamping the circumference of the center hole 2a of the optical disk 2 transferred to the disk holding unit 23, between the turntable 23a and the abutting protrusion 8 formed at the top plate portion 5a of the top cover 5. When the sub slider 151 is slid in the direction $h_1$, the second pivot pin 48 moves down from the slope face portion 170c to the upper side horizontal face portion 170b so that the base unit 22 is moved from the chucking position to the record/play position.

In the second cam slit 170, as in the aforementioned first cam slit 130, moreover, there is arranged a second guide plate 171 for guiding the movement of the second pivot pin 48 and for preventing the chattering of the second pivot pin at the record/play position thereby to operate the disk rotating drive mechanism 24 stably, as shown in FIG. 32B. The second guide plate 171 is made of a leaf spring member, which has one end retained by a retaining member 173 formed in the upper portion of the second cam slit 170 and its other end retained in a retaining recess 174 formed on the lower side of the second cam slit 170. In the second guide plate 171, moreover, the second pivot pin 48 moves over the contact point between the upper side horizontal face portion 170b and the inclined face portion 170c when the base unit 22 is raised to the chucking position. There is formed a projecting portion 175, which is folded and protrudes to the side of the upper face 151a of the sub slider 151 when the second pivot pin 48 moves to the upper side horizontal face portion 170b.

Moreover, the lower side horizontal face portion 170a of the second cam slit 170 is made slidable to have a rather larger height than the diameter of the second pivot pin 48. On the other hand, the upper side horizontal face portion 170b is made to have a height, from the second guide plate 171, equal to or slightly smaller than the diameter of the second pivot pin 48. Therefore, the second pivot pin 48 is pressed-fitted, when moved to the upper side horizontal face portion 170b, between the second guide plate 171 and the upper side horizontal face portion 170b. As a result, the second guide plate 171 suppresses the vibrations coming from the spindle motor 24a of the disk rotating drive mechanism 24 disposed in the base unit 22, so that it can turn the optical disk 2 stably.

Moreover, the second guide plate 171 clamps the second pivot pin 48 between itself and the upper side horizontal face portion 170b, so that the projecting portion 175 projects over the upper face 151a of the sub slider 151 and is pushed onto the upper face 6a of the main chassis 6. As a result, the sub slider 151 can be pushed to the side of the bottom case 4 by the second guide plate 171 thereby to suppress the vibrations due to the drive of the base unit 22 or the influences of disturbances.

The connecting arm 165, as engaging with the engaging groove 166 of the sub slider 151 and connecting the slider 122 and the sub slider 151, is formed generally in an L-shape. A folded portion 165a is turnably attached to the main chassis 6. An engaging protrusion 177 formed at one end 165b of the shorter side extending from that folded portion 165a engages movably with the second guide groove 126 of the slider 122, and an engaging protrusion 178 formed at the other end 165c of the longer side engages movably with the engagement groove 166 of the sub slider 151.

When the slider 122 is moved in the direction $f_1$, the engaging protrusion 177 moves in the second guide groove 126 of the slider 122, and the connecting arm 165 is turned on the folded portion 165a in the direction $i_1$ so that the engaging 178 slides the sub slider 151 in the direction $h_1$ while moving in the engaging groove 166. When the slider 122 is moved in the direction $f_2$, the engaging protrusion 177 moves in the second guide groove 126, and the connecting arm 165 is turned on the folded portion 165a in the direction $i_2$ so that the engaging protrusion 178 slides the sub slider 151 in the direction $h_2$ while moving in the engaging groove 166.

Figure 33:
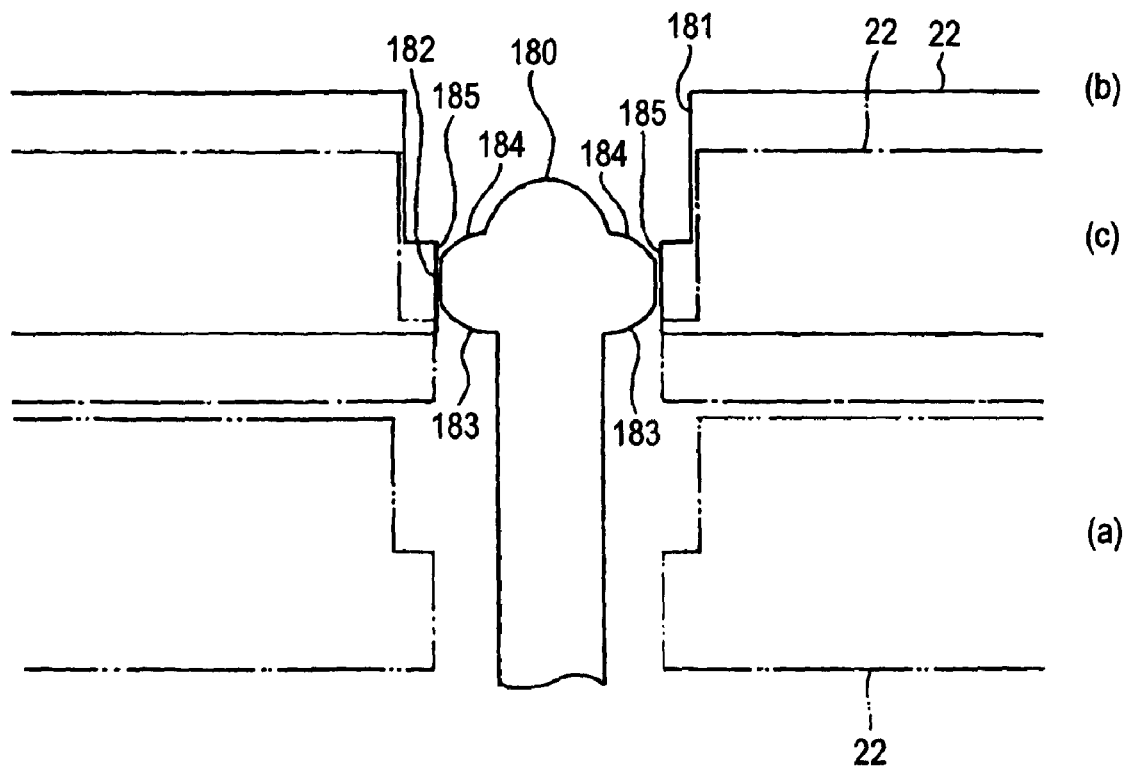
FIG. 33 is a sectional view showing the positional relations between a guide pin and a guide hole, wherein (a) is a chucking release position, (b) is a disk holding position, and (c) is a record/play position.

This disk drive device 1 is provided, as shown in FIG. 3, FIG. 6 and FIG. 33, with the guide pin 180, which guides the base unit 22 to position the center hole 2a of the optical disk 2, which has been transferred to the centering position by the disk transfer mechanism 50, and the turn table 23a of the disk holding unit 23 disposed in the base chassis 27, when the base unit 22 is raised to the chucking position.

The guide pin 180 is erected from the bottom face portion of the bottom case 4, and has a flange portion 182 formed in the upper portion, as shown in FIG. 33, and adapted to be inserted into a guide hole 181 formed in the base chassis 27.

The flange portion 182 is formed to have a diameter rather larger than that of the guide hole 181 of the base chassis 27, and is provided with a first guide portion 183 having a slope face radially expanded to the upper end portion, and a second guide portion 184 having a slope face radially constricted toward the upper end portion. The flange portion 182 is inserted, when the base chassis 27 is moved up and down, to have its first and second guide portions 183 and 184 sliding to contact with a guide wall 185 formed on the guide hole 181 thereby to guide the base unit 22 to the chucking position or the chucking release position.

The guide hole 181 of the base chassis 27, into which the guide pin 180 is inserted, is formed near the turntable 23a which is spaced from the third pivot pin 49 acting as the pivot for the base unit 22. In the guide hole 181, as shown in FIG. 33, the guide wall 185 is formed to bulge in the lower portion of the base chassis 27. In the guide wall 185, there is formed the clearance which is slightly larger than the diameter of the flange portion 182 of the guide pin 180, and the base unit 22 is so guided by inserting the flange portion 182 into that clearance as to position the center hole 2a of the optical disk 2 and the turntable 23a of the disk holding unit 23.

Figure 34:
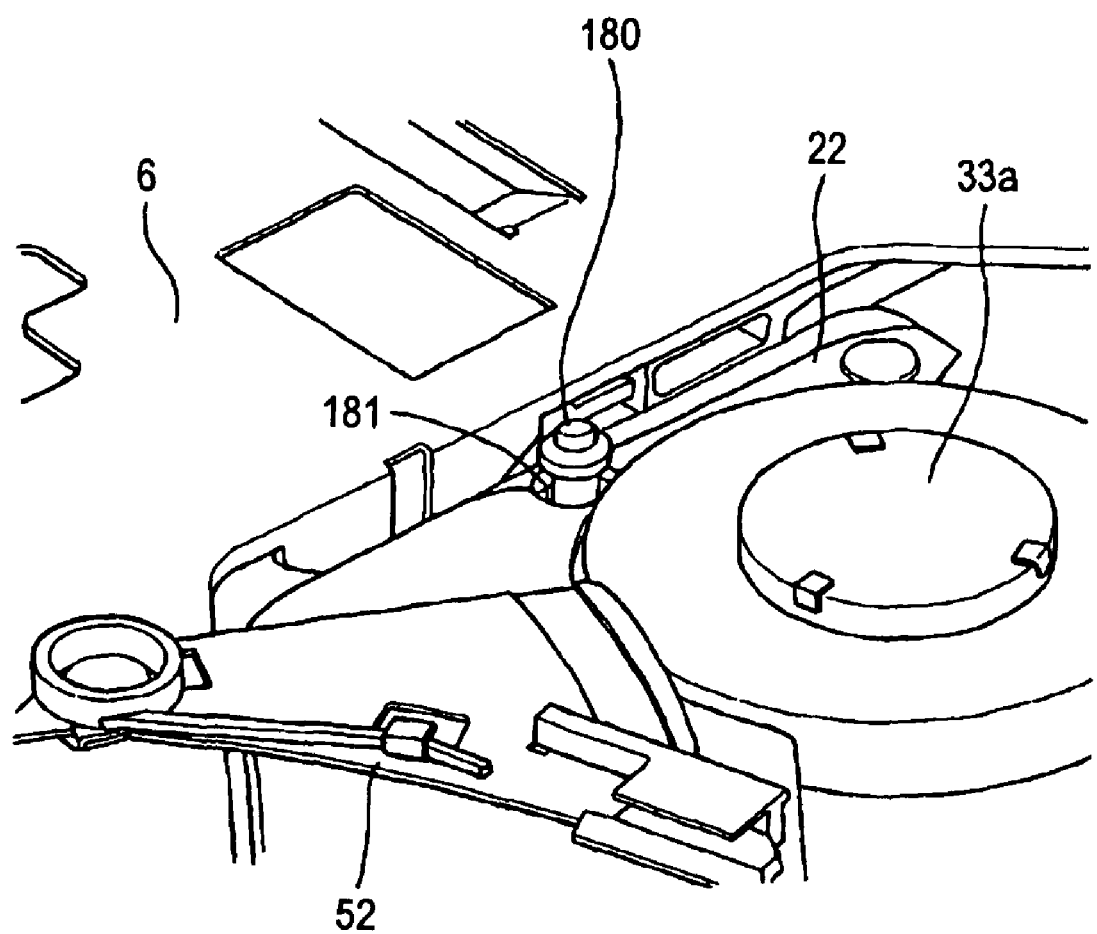
FIG. 34 is a perspective view showing the guide pin and the guide hole of the state, in which the base unit has been lowered to the chucking release position.
Figure 35:
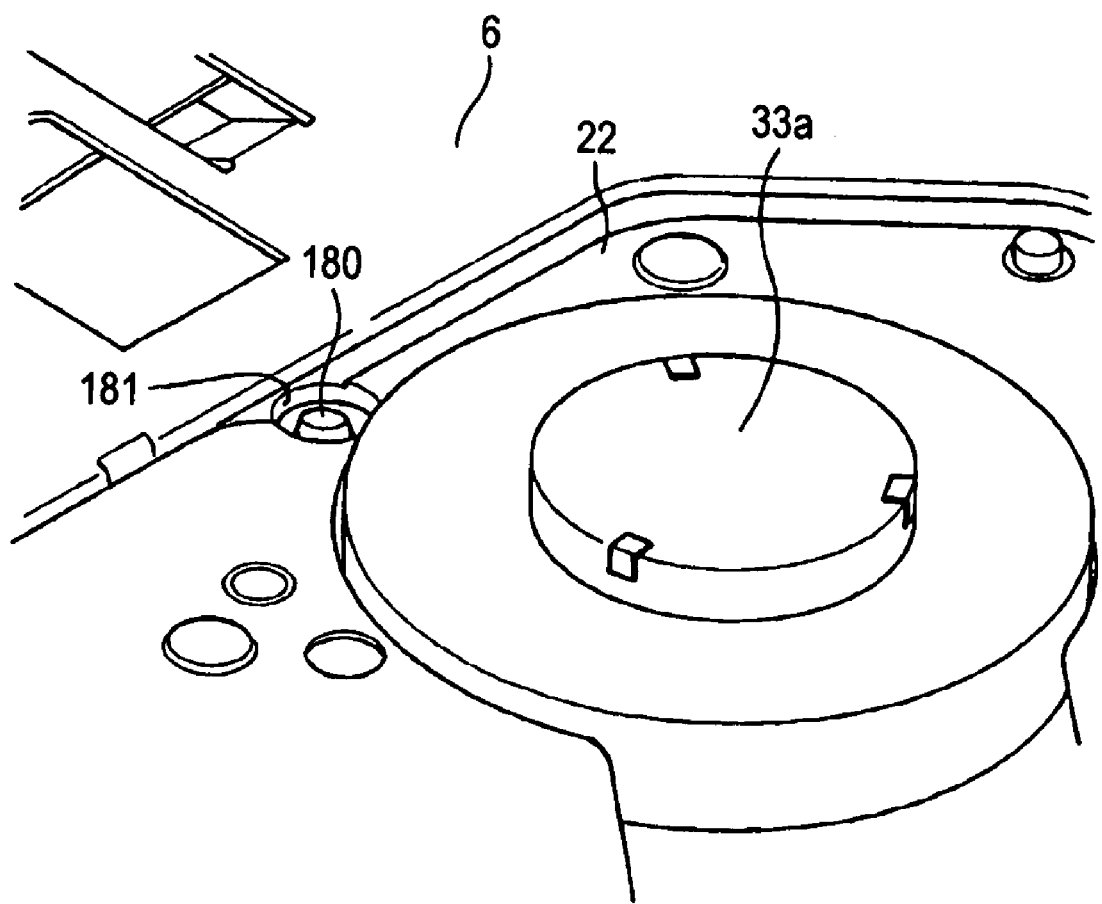
FIG. 35 is a perspective view showing the guide pin and the guide hole of the state, in which the base unit has been raised to the chucking position.

As indicated by double-dotted lines in FIG. 34 and (a) in FIG. 33, more specifically, when the base unit 22 is lowered to the chucking release position, the guide pin 180 has its flange portion 182 positioned above the guide hole 181. As the optical disk 2 is transferred to the centering position, the base chassis 27 is raised so that the flange portion 182 is inserted into the guide hole 181. When the base chassis 27 is raised to the chucking position of the optical disk 2, the guide wall 185, as formed to bulge into the guide hole 181, slides on the first guide portion 183 of the guide pin 180, as shown by solid lines in FIG. 35 and (b) in FIG. 33, so that the flange portion 182 is inserted into the clearance in the guide wall 185. Thus, the base chassis 27 rise while being guided by the guide pin 180, so that the turntable 23a of the disk holding unit 23 is positioned with respect to the center hole 2a of the optical disk 2 transferred to the centering position. As a result, the chucking can be smoothly performed without burdening excessive loads on the optical disk 2 or the turntable 23a.

Moreover, the guide pin 180 and the guide hole 181 are formed on the other end side opposed to one longitudinal end, on which the third pivot pin 49 for supporting the rotation of the base unit 22 is formed, and near the disk holding unit 23. As a result, the deviation between the optical disk 2 transferred to the centering position and the turntable 23a can be most efficiently corrected to position the center hole 2a of the optical disk 2 and the engaging projection 33a of the turntable 23 reliably.

Figure 36:
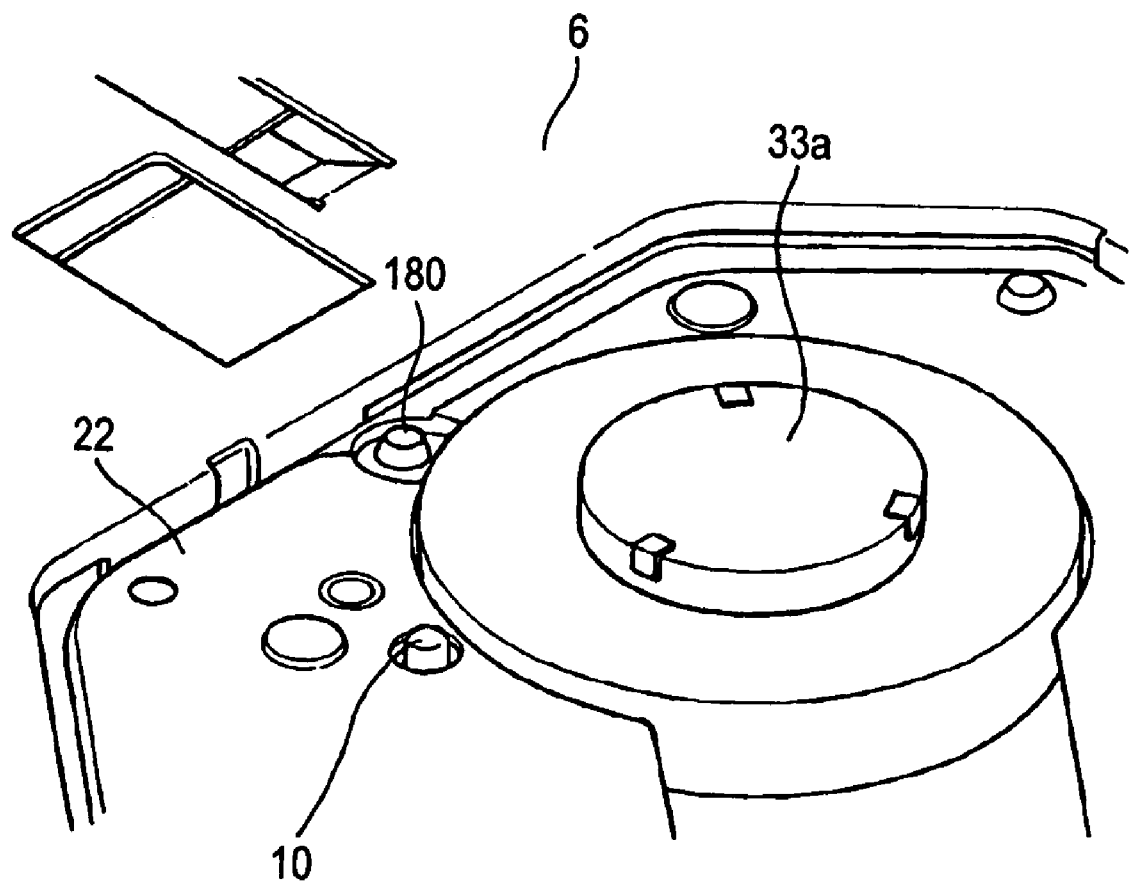
FIG. 36 is a perspective view showing the guide pin and the guide hole of the state, in which the base unit has been raised to the record/play position.

Next, when the base unit 22 is lowered to the record/play position, as indicated by a single-dotted line in FIG. 36 and (c) in FIG. 33, the guide wall 185 of the guide hole 181 of the base chassis 27 slides on the second guide portion 184 of the flange portion 182 so that the flange portion 182 is so guided as can be inserted into the guide hole 181. After this, the guide wall 185 is lowered to the position apart from the flange portion 182. Thus, in the state where the base unit 22 is lowered to the record/play position, the guide pin 180 and the guide hole 181 do not contact, thereby to prevent the disturbances such as vibrations from being transmitted from the bottom case 4 through the guide pin 180 to the base chassis 27. As a result, it is possible to prevent the disturbances from being transmitted through the guide pin 180 to the disk rotating drive mechanism 24 or the optical pickup 25 to affect the recording/playing characteristics adversely.

Here, the guide pin 180 is formed at such as height as does not abut against the lower face of the optical disk 2 which is rotationally driven by the disk rotating drive mechanism 24, so that the optical disk 2 does not have its information recording face damaged.

When the recording/playing operation is ended to shift to the step of ejecting the optical disk 2, the base unit 22 is lowered to the chucking release position, and the optical disk 2 is pushed up from the turntable 23 by the guide pin 180, so that the chucking operation is released. In the base chassis 27, the guide hole 181 is then positioned below the guide pin 180.

In the disk drive device 1 according to the embodiment of the invention, the guide pin 180 also functions as a chucking release pin for releasing the chucking of the optical disk 2. Specifically, the guide pin 180 and the guide hole 181 of the base chassis 27 are formed to correspond to the non-recording area, which is formed near the center hole 2a of the optical disk 2 held on the turntable 23a. When the base unit 22 is lowered to the chucking release position of the optical disk 2, the optical disk 2 is pushed up by the upper end portion of the guide pin 180 so that it is released from the chucking state of the turntable 23a. According to this constitution, the chucking please pin for releasing the chucking of the optical disk 2 need not be used in addition to the guide pin 180, so that the number of parts and the weight of the disk drive device 1 can be reduced.

It should be understood by those skilled in the art that various modifications, combinations, sub-combinations and alterations may occur depending on design requirements and other factors insofar as they are within the scope of the appended claims or the equivalents thereof.

What is claimed is:

1. A recording medium drive device comprising:
    a holding unit configured to hold a recording medium;
    a link mechanism including a plurality of arms;
    an eject lever activated in response to the link mechanism for ejecting the recording medium;
    a drive source configured to supply a drive force for the link mechanism;
    an urging spring disposed in the link mechanism for applying an urging force in the ejecting direction to the recording medium when the recording medium is inserted; and
    further comprising a cam member having a cam engaging groove;
    wherein the link mechanism includes:
    a first arm turnable with respect to the eject lever;
    a second arm connected to the first arm; and
    a third arm having a cam pin engaged with a cam groove of the cam member,
    wherein the second arm has a slot, and
    wherein the third arm has an engaging projection inserted into the slot of the second arm,
    whereby the positions of the individual arms of the link mechanism are regulated according to the engaging state of the engaging projection of the third arm with the slot of the second arm and the engaging state of the cam pin of the third arm with the cam groove of the cam member.

2. A recording medium drive device according to claim 1,
    wherein the cam engaging groove of the cam member has a first passage and a second passage,
    wherein the cam pushing pin of the third arm moves in a first passage at the loading time of the recording medium, and
    wherein the cam pushing pin of the third arm moves in a second passage at the ejecting time of the recording medium.

3. A recording medium drive device according to claim 2,
wherein the cam engaging groove of the cam member is
formed into a loop shape having the first passage and the
second passage,
wherein the starting point of the first passage and the ending point of the second passage are made identical whereas the ending point of the first passage and the starting point of the second passage are made identical,
wherein, at the loading time of the recording medium, the cam pushing pin of the third arm moves on the first passage from the starting point of the first passage to the starting point of the second passage, and
wherein, at the ejecting time of the recording medium, the cam pushing pin of the third arm moves on the second passage from the starting point of the second passage to the starting point of the first passage.

4. A recording medium drive device according to claim 3, further comprising a spring member for urging the third arm in the direction, in which the cam pushing pin does not move to the starting point side of the second passage, in the state where the cam pushing pin of the third arm is inserted into the second passage in the cam engaging groove.

5. A recording medium drive device according to claim 3,
wherein, when the drive source is turned in one direction, the cam pushing pin of the third arm is moved on the first passage or the second passage toward the starting point of the second passage, and
wherein, when the drive source is turned in the other direction, the cam pushing pin of the third arm is moved on the first passage or the second passage toward the starting point of the first passage.

6. An electronic device having a recording medium drive device for recording and/or playing information signals in and from a recording medium, comprising:
a holding unit configured to hold a recording medium;
a link mechanism including a plurality of arms;
an eject lever activated in response to the link mechanism for pushing the recording medium to eject the recording medium;
a drive source configured to supply a drive force for the link mechanism;
an urging spring disposed in the link mechanism for applying an urging force in an ejecting direction to the recording medium when the recording medium is inserted; and
position regulating means for regulating the arms of the link mechanism at an ejecting time at a position to suppress the urging spring for the recording medium; and
further comprising a cam member having a cam engaging groove;
wherein the link mechanism includes:
a first arm turnable with respect to the eject lever;
a second arm connected to the first arm; and
a third arm having a cam pin engaged with a cam groove of the cam member,
wherein the second arm has a slot, and
wherein the third arm has an engaging projection inserted into the slot of the second arm,
whereby the positions of the individual arms of the link mechanism are regulated according to the engaging state of the engaging projection of the third arm with the slot of the second arm and the engaging state of the cam pin of the third arm with the cam groove of the cam member.

7. A recording medium drive device comprising:
an eject arm turnably supported on a device body having a loadable/unloadable recording medium, for ejecting the recording medium;
a first link arm turnably supported at its one end portion by the eject arm;
a second link arm turnably engaging with the other end portion of the first link arm and adapted to be moved according to the movement of the first link arm;
an elastic member retained at its one end by the first link arm and at its other end by the second link arm and extended when its portions retained by the first and second link arms move apart from each other, for urging the first link arm in the direction where the eject arm turns in the eject direction of the recording medium;
a loop cam which includes a loading guide wall for guiding the guide projection projected from the second link arm, to bring portions of the second link arm away from the first link arm against the urging force of the elastic member, at the time of loading the recording medium, and an eject guide wall for bringing the portions of the second link arm toward the first link arm at the time of ejecting the recording medium, and forms a guide groove, in which the guide projection moves, continuously in an annular shape, with the loading guide wall and the eject guide wall; and
an operation arm engaging with the first link arm for moving the eject arm through the first link arm in the loading direction and the ejecting direction of the recording medium; and a drive mechanism for driving the operation arm.

8. A recording medium drive device according to claim 7, wherein the drive mechanism is started when the recording medium is inserted into the device body and when the eject arm is turned to a predetermined position.

9. A recording medium drive device according to claim 7, wherein, at the loading time of the recording medium, the first link arm is turned in a direction different from the guide direction of the loading guide wall of the loop cam, when the eject arm pushed onto the recording medium is turned, so that the elastic member is extended.

10. A recording medium drive device according to claim 7, wherein the loop cam has a guide projection formed between the loading guide wall and the eject guide wall, for preventing the backward movement of the engaging projection, and wherein an elastic member for applying an urging force for the engaging projection of the second link arm to ride over the guide projection engages with the first link arm.

11. A recording medium drive device according to claim 7, wherein a loading arm is turnably supported on the device body and urged in the loading direction of the recording medium, and wherein the loading arm is turned in the ejecting direction at the ejecting time while urging the recording medium in the loading direction.

12. An electronic device having a recording medium drive device for recording and/or playing information signals in and from a recording medium, comprising:
an eject arm turnably supported on a device body having a loadable/unloadable recording medium, for ejecting the recording medium;
a first link arm turnably supported at its one end portion by the eject arm;
a second link arm turnably engaging with the other end portion of the first link arm and adapted to be moved according to the movement of the first link arm;
an elastic member retained at its one end by the first link arm and at its other end by the second link arm and extended when its portions retained by the first and second link arms move apart from each other, for urging the first link arm in the direction where the eject arm turns in the eject direction of the recording medium;

a loop cam which includes a loading guide wall for guiding the guide projection projected from the second link arm, to bring portions of the second link arm away from the first link arm against the urging force of the elastic member, at the time of loading the recording medium, and an eject guide wall for bringing the portions of the second link arm toward the first link arm at the time of ejecting the recording medium, and forms a guide groove, in which the guide projection moves, continuously in an annular shape, with the loading guide wall and the eject guide wall; and an operation arm engaging with the first link arm for moving the eject arm through the first link arm in the loading direction and the ejecting direction of the recording medium; and a drive mechanism for driving the operation arm.

13. A recording medium drive device comprising:

a holding unit configured to hold a recording medium; a link mechanism including a plurality of arms turnably connected to each other an eject lever activated in response to motions of the link mechanism for pushing the recording medium to eject the recording medium;

a drive source configured to supply a drive force for the turning operations of the link mechanism;

an urging spring disposed in the link mechanism for applying an urging force in the ejecting direction to the recording medium when the recording medium is inserted; and further comprising a cam member having a cam engaging groove;

wherein the link mechanism includes:

a first arm turnable with respect to the eject lever;

a second arm connected to the first arm; and a third arm having a cam pin engaged with a cam groove of the cam member, wherein the second arm has a slot, and wherein the third arm has an engaging projection inserted into the slot of the second arm, whereby the positions of the individual arms of the link mechanism are regulated according to the engaging state of the engaging projection of the third arm with the slot of the second arm and the engaging state of the cam pin of the third arm with the cam groove of the cam member.

14. An electronic device having a recording medium drive device for recording and/or playing information signals in and from a recording medium, comprising:

a holding unit configured to hold a recording medium;

a link mechanism including a plurality of arms turnably connected to each other;

an eject lever activated in response to motions of the link mechanism for pushing the recording medium to eject the recording medium;

a drive source configured to supply a drive force for the link mechanism;

an urging spring disposed in the link mechanism for applying an urging force in an ejecting direction to the recording medium when the recording medium is inserted; and further comprising a cam member having a cam engaging groove;

wherein the link mechanism includes:

a first arm turnable with respect to the eject lever;

a second arm connected to the first arm; and a third arm having a cam pin engaged with a cam groove of the cam member, wherein the second arm has a slot, and wherein the third arm has an engaging projection inserted into the slot of the second arm, whereby the positions of the individual arms of the link mechanism are regulated according to the engaging state of the engaging projection of the third arm with the slot of the second arm and the engaging state of the cam pin of the third arm with the cam groove of the cam member.

15. An electronic device having a recording medium drive device for recording and/or playing information signals in and from a recording medium, comprising:

a holding unit configured to hold a recording medium;

a link mechanism including a plurality of link arms;

an eject lever activated in response to motions of the link mechanism for pushing the recording medium to thereby provide an outward force on the recording medium and eject the recording medium;

a drive source configured to supply a drive force for the link mechanism;

an urging spring disposed in the link mechanism for applying an urging force in an ejecting direction to the recording medium when the recording medium is inserted; wherein a first link arm is directly coupled to the eject lever, a second link arm and a third link arm connected to the first link arm, and wherein at least one of the second and third link arms is mechanically connected to a loop cam member that controls the motion of the link arms, and wherein the loop cam member has an annular shape and includes a loading guide wall and an ejecting guide wall for guiding at least one of the second and third link arms when loading and ejecting the recording medium respectively.

* * * * *